(12) United States Patent
Yasui et al.

(10) Patent No.: US 9,304,717 B2
(45) Date of Patent: Apr. 5, 2016

(54) PRINTER FOR DETERMINING WHETHER THE CONNECTABILITY OF A USB DEVICE IS SUITABLE

(71) Applicants: Junichi Yasui, Nagoya (JP); Takahiro Miwa, Konan (JP); Yuichiro Suzuki, Komaki (JP)

(72) Inventors: Junichi Yasui, Nagoya (JP); Takahiro Miwa, Konan (JP); Yuichiro Suzuki, Komaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/254,992

(22) Filed: Apr. 17, 2014

(65) Prior Publication Data

US 2014/0307279 A1    Oct. 16, 2014

Related U.S. Application Data

(62) Division of application No. 12/785,961, filed on May 24, 2010, now abandoned.

(30) Foreign Application Priority Data

Jun. 3, 2009  (JP) ................................ 2009-133586
Jun. 8, 2009  (JP) ................................ 2009-137507
Aug. 5, 2009  (JP) ................................ 2009-182039

(51) Int. Cl.
*G06F 3/12* (2006.01)
*G06K 15/00* (2006.01)

(52) U.S. Cl.
CPC ............ *G06F 3/1204* (2013.01); *G06F 3/1226* (2013.01); *G06F 3/1285* (2013.01); *G06F 3/1294* (2013.01); *G06K 15/007* (2013.01); *G06K 15/4045* (2013.01)

(58) Field of Classification Search
CPC ... G06F 3/1204; G06F 3/1294; G06F 3/1226; G06F 3/1285; G06K 15/007
USPC ........................................................ 358/1.13
See application file for complete search history.

(56) References Cited

U.S. PATENT DOCUMENTS 5,758,980 A    6/1998  Takenaka
5,809,167 A *  9/1998  Al-Hussein ........ G06K 9/00463
                                                      382/176

(Continued)

FOREIGN PATENT DOCUMENTS

CN    1807105     7/2006
JP    08142440    6/1996

(Continued)

OTHER PUBLICATIONS

Office Action issue in European Application No. 10161721.5 on Sep. 4, 2014.

(Continued)

*Primary Examiner* — Benjamin O Dulaney
(74) *Attorney, Agent, or Firm* — McCarter & English, LLP

(57) ABSTRACT

This disclosure discloses a printer comprising: a host communication device that performs information transmission and reception by wired or wireless communication for the functioning as a host device of a target device; and a target processing portion that performs predetermined processing in accordance with target device information acquired from said target device when said host communication device performs information transmission and reception with said target device.

4 Claims, 28 Drawing Sheets

(56) References Cited

U.S. PATENT DOCUMENTS

| | | | |
|---|---|---|---|
| 5,885,100 A | 3/1999 | Talend et al. | |
| 6,473,811 B1 * | 10/2002 | Onsen | H04N 1/00278 709/223 |
| 6,697,073 B1 | 2/2004 | Kadota | |
| 2005/0269980 A1 * | 12/2005 | Hongo | B41J 19/202 318/66 |
| 2006/0083572 A1 | 4/2006 | Block et al. | |
| 2007/0262141 A1 | 11/2007 | Ito et al. | |
| 2008/0003043 A1 | 1/2008 | Fukui | |
| 2008/0194119 A1 | 8/2008 | Mori | |
| 2009/0002730 A1 * | 1/2009 | Yamada | G06F 3/1204 358/1.9 |
| 2009/0006874 A1 * | 1/2009 | Fujiwara | G06F 1/266 713/310 |
| 2012/0201058 A1 * | 8/2012 | Harrison | H02J 7/0044 363/53 |

FOREIGN PATENT DOCUMENTS

| | | |
|---|---|---|
| JP | 8-197781 | 8/1996 |
| JP | 11-97114 | 4/1999 |
| JP | 2000-138465 | 5/2000 |
| JP | 2000-242454 | 9/2000 |
| JP | 2003076679 | 3/2003 |
| JP | 2003-248534 | 9/2003 |
| JP | 2005-102034 | 4/2005 |
| JP | 2006-338287 | 12/2006 |
| JP | 2007317157 | 12/2007 |
| JP | 2006-209235 | 8/2008 |
| JP | 2008-181230 | 8/2008 |
| JP | 2008-250991 | 10/2008 |
| JP | 2009-110862 | 5/2009 |

OTHER PUBLICATIONS

Office Action issued in Chinese Application No. 201010196186.4 on Dec. 12, 2013.

Office Action issued in EPO Application No. 10161721.5 on Nov. 5, 2013.

European Search Report issued in EPO Application No. 10161721.5 on Mar. 4, 2013.

Office Action issued in Japanese Application No. 2009-182039 on Feb. 14, 2013.

Partial European Search Report issued in EPO Application No. 10161721.5 on Dec. 6, 2012.

Office Action issue in European Application No. 10161721.5 on Jul. 9, 2015.

* cited by examiner

| CLASS CODE | CLASS NAME | CLASS INFORMATION |
|---|---|---|
| 1 | Audio | 0x01 |
| 2 | Communication | 0x02 |
| 3 | Human Interface Device (HID) | 0x03 |
| 4 | Monitor | 0x04 |
| 5 | Physical Interface | 0x05 |
| 6 | Power | 0x06 |
| 7 | Printer | 0x07 |
| 8 | Storage | 0x08 |
| 9 | Hub | 0x09 |

|  | CLASS INFORMATION | SUB-CLASS INFORMATION | PROTOCOL INFORMATION |
|---|---|---|---|
| KEYBOARD | 0x03 (HID) | 0x01 | 0x01 |
| MOUSE | 0x03 (HID) | 0x01 | 0x02 |

| CLASS INFORMATION | SUB-CLASS INFORMATION | PROTOCOL INFORMATION |
|---|---|---|
| 0x03 (HID) | 0x01 | 0x01 |

PRINTER FOR DETERMINING WHETHER THE CONNECTABILITY OF A USB DEVICE IS SUITABLE

CROSS-REFERENCE TO RELATED APPLICATIONS

This application claims priority from Japanese Patent Application No. 2009-133586, which was filed on Jun. 3, 2009, No. 2009-137507, which was filed on Jun. 8, 2009, and No. 2009-182039, which was filed on Aug. 5, 2009, the disclosure of which are incorporated herein by reference in its entirety.

BACKGROUND

1. Field

The present disclosure relates to a printer and printing system connectable to a variety of target devices.

2. Description of the Related Art

In the past, a printer was connected to a host device, such as a PC, and printing was performed based on the control information from the host device. As a result, when an operator wanted to use the printer, the operator needed to connect the PC and printer using a cable or the like, and suitably operate the PC keyboard, mouse, or other device to set up various print settings and provide print execution instructions. Such operations have been burdensome to the operator, especially those without a thorough understanding of office automation equipment, such as the elderly and children.

In prior art, there has been proposed a printer designed with the objective of resolving the above-described problem and achieving ease of use for all (refer to JP, A, 8-142440, for example). With this printer of prior art, the printer itself comprises a host function rather than the above-described PC, etc., making it possible to perform printing independently. Additionally, the printer made it possible to connect an image scanner or barcode reader as a target device (hereinafter suitably "target device") of this host function, and perform print operations in accordance with the reading result of the image scanner or barcode reader.

On the other hand, as one printer, a label producing apparatus that produces print labels by printing desired characters on a label tape for label production (a roll sheet of undefined length) rolled into a roll shape while feeding the label tape from the roll is known. In prior art, there has been proposed a label producing system that connects a plurality of such label producing apparatuses on a network (refer to JP, A, 2007-317157).

In the prior art of the above-described JP, A, 8-142440, interfaces (image scanner interface and barcode reader interface) corresponding to target devices are prepared in advance within the printer for cases where the printer host function is utilized and a target device is connected to the printer. Since it is difficult to provide interfaces corresponding to all models of each target device, however, there are inevitably bootable models for which a corresponding interface has been provided, and unbootable models for which a corresponding interface has not been provided. Nevertheless, the operator is unable to distinguish between the bootable and unbootable target devices based on outward appearances. For this reason, the operator must suffer the extreme inconvenience of connecting each arbitrary target device to the printer using a USB cable or the like, and testing each device one by one to see if the device is bootable.

On the other hand, in the prior art described in JP, A, 2007-317157, a plurality of label producing apparatuses is connected to operation terminals via a network. Each label producing apparatus detects its type of label tape and outputs the detection result to an operation terminal. When the operator performs an operation to produce labels of a desired form on the operation terminal, the operation terminal determines which label producing apparatus is suitable based on the detection result of the label tape type of each of the above-described label producing apparatuses. Then, an instruction signal corresponding to the label production operation performed by the above-described operator is inputted via the network into the above-described label producing apparatus thus identified. The label producing apparatus then produces the labels in accordance with the above-described label production operation, based on the above-described inputted instruction signal.

Nevertheless, in the above-described prior art, in order to suitably use the plurality of label producing apparatuses to produce labels of a form intended by the operator, the plurality of label producing apparatuses and the operation terminal must be connected in advance to a network using a LAN cable or wireless LAN. However, to construct a fixed system with such extensive network connections is extremely cumbersome for the operator. Additionally, the network connections may result in recognition errors or communication errors as a result of the effects of the communication environment or the like, and prompt recovery from such errors is not easy for an operator having a normal skill level. As a result, from the viewpoint of making the plurality of label producing apparatuses easier to use, the above-described prior art shows room for improvement. Further, depending on the environment, network construction itself may be difficult and, in such a case, the above-described prior art does not particularly take that into consideration.

Thus, as described above, each of the aforementioned prior arts increases the labor burden of the operator, decreasing operator convenience.

SUMMARY

It is therefore a first object of the present disclosure to provide a printer and printing system capable of improving operator convenience.

It is a second object of the present disclosure to provide a printer that makes it possible to visually recognize at a glance whether or not the target device is bootable.

It is a third object of the present disclosure to provide a printing system capable of producing desired labels from a plurality of printers in a system simply and easily constructed without use of a network.

In order to achieve the above-described object, according to the first aspect, there is provided a printer comprising: a printer comprising: a host communication device that performs information transmission and reception by wired or wireless communication for the functioning as a host device of a target device; and a target processing portion that performs predetermined processing in accordance with target device information acquired from the target device when the host communication device performs information transmission and reception with the target device.

The first aspect of the present disclosure for achieving the above-described object is a printer that transmits and receives information with a target device by host communication device, thereby functioning as a host-side device of the target device. When the host communication device transmits and receives information with the target device, target processing portion performs predetermined processing in accordance with the information on the target device side acquired by the target device side. With this arrangement, the printer which serves as a host-side device determines the connectability with the target device, notifies the operator in accordance with the determination result and, in a case where the target device is another printer that differs from the host, acquires the printing related information of the other printer, thereby making it possible to execute printing using the appropriate printer in accordance with the print form intended by the operator. Thus, operator convenience is improved.

In order to achieve the above-described object, according to the second aspect, there is provided a printing system comprising: a printer which is a host device of a target device, and the target device, wherein: the printer comprises: a host communication device that performs information transmission and reception by wired or wireless communication for the functioning as a host device of the target device; and a target processing portion that performs predetermined processing in accordance with target device information acquired from the target device when the host communication device performs information transmission and reception with the target device; and the target device comprises a target communication device that performs information transmission and reception by wired or wireless communication for the functioning as a target device of the printer.

The second aspect of the present disclosure for achieving the above-described objects is a printing system that is connected to a printer and target device in a manner that enables information transmission and reception by wired or wireless communication, wherein the printer performs information transmission and reception with the target device by host communication device, thereby functioning as a host-side device of the target device. In the printer, when the host communication device transmits and receives information with the target device, the target processing portion performs predetermined processing in accordance with the information on the target device side acquired by the target device side. With this arrangement, the printer which serves as a host-side device determines the connectability with the target device, notifies the operator in accordance with the determination result and, in a case where the target device is another printer that differs from the host, acquires the printing related information of the other printer, thereby making it possible to execute printing using the appropriate printer in accordance with the print form intended by the operator. Thus, operator convenience is improved.

DETAILED DESCRIPTION OF THE PREFERRED EMBODIMENTS

The following describes embodiment 1 of the present disclosure with reference to accompanying drawings.

The configuration of the label producing system of this embodiment will now be described with reference to FIGS. 1A and 1B.

Figure 1A:
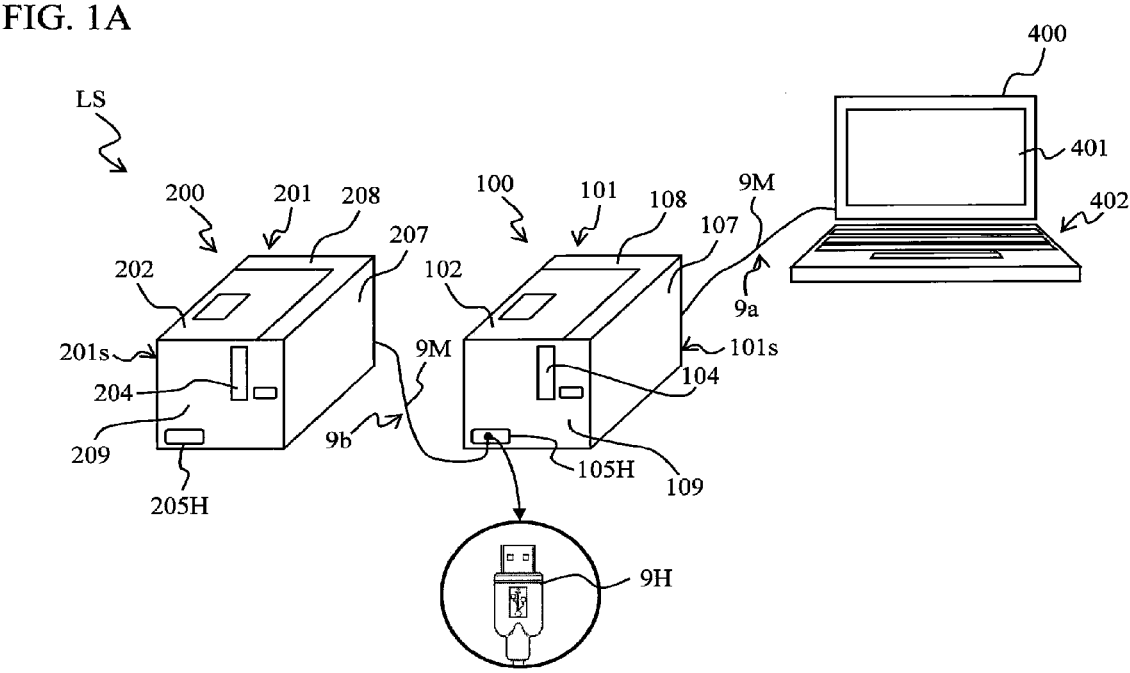
FIGS. 1A and 1B are system configuration diagram illustrating a label producing system of embodiment 1 of the present disclosure.
Figure 1B:
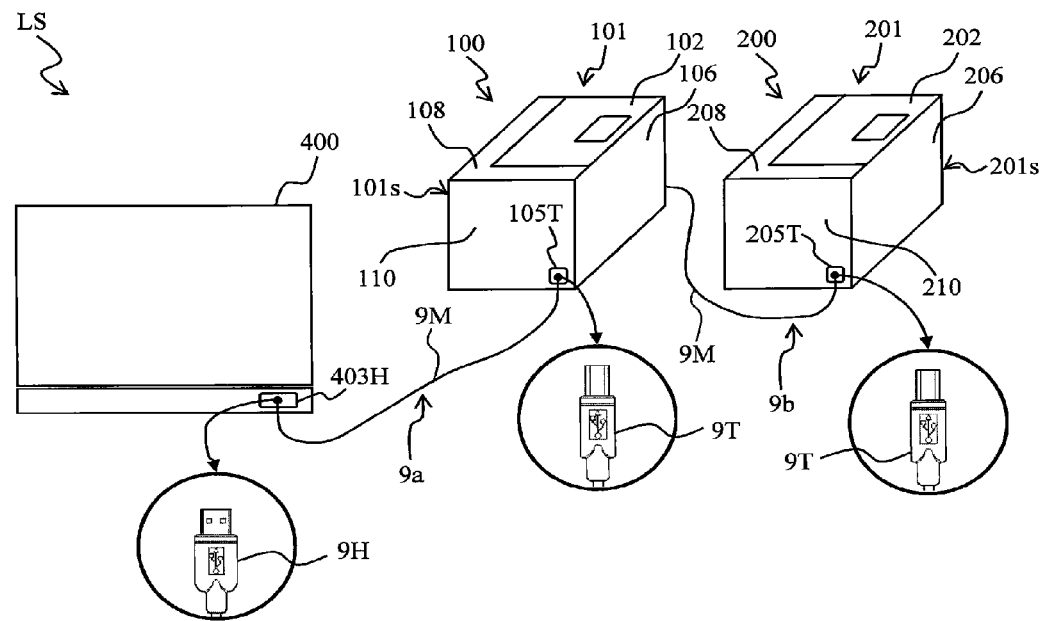

In FIG. 1A and FIG. 1B, a label producing system LS comprises a label producing apparatus 100 and a label producing apparatus 200 capable of producing a print label L (refer to FIG. 5 described later) on which desired printing was performed, an operation terminal 400 for operating the above-described label producing apparatus 100, and a plurality of communication cables 9 (in this example, two communication cables 9a and 9b) comprising a USB cable, in this example.

The label producing apparatus 100 comprises an apparatus main body 101, and a housing 101s of an overall rectangular shape as an outer shell comprising an upper surface part 108, a lower surface part (not shown), a front surface part 109, a rear surface part 110, and both left and right side surface parts 106 and 107.

On the upper surface part 108 is provided an opening/closing lid 102 provided in a manner that enables opening and closing (or in a detachable manner).

On the front surface part 109 (refer to FIG. 1A) are provided a tape discharging exit 104, and a first host socket 105H that detachably mounts a first connector 9H (described later) of the above-described communication cable 9. The tape discharging exit 104 discharges a formed label tape 23 with print (refer to FIG. 3 described later).

On the rear surface part 110 (refer to FIG. 1B) is provided a first target socket 105T that detachably mounts a second connector 9T (described later) of the above-described communication cable 9.

The label producing apparatus 200 comprises an apparatus main body 201, and a housing 201s of an overall rectangular shape as an outer shell comprising an upper surface part 208, a lower surface part (not shown), a front surface part 209, a rear surface part 210, and both left and right side surface parts 206 and 207.

On the upper surface part 208 is provided an opening/closing lid 202 provided in a manner that enables opening and closing (or in a detachable manner).

On the front surface part 209 (refer to FIG. 1A) are provided a tape discharging exit 204 (similar to the above-described tape discharging exit 104), and a second host socket 205H (which can be omitted in this embodiment) that detachably mounts the first connector 9H (described later) of the communication cable 9.

On the rear surface part 210 (refer to FIG. 1B) is provided a second target socket 205T that detachably mounts the second connector 9T (described later) of the above-described communication cable 9.

The operation terminal 400 is a general-purpose personal computer generally available on the market, and comprises a display part 401 of a liquid crystal display or the like, an operation part 402 (refer to FIG. 1A) such as a keyboard or mouse, and a third host socket 403H (refer to FIG. 1B) that detachably mounts the first connector 9H of the above-described communication cable 9.

The plurality of communication cables 9a and 9b each comprise the first connector 9H (a USB connector which is a so-called series A plug) that makes the connected device function as a host, the second connector 9T (a USB connector which is a so-called series B plug) that makes the connected device function as a target, and a cable main body 9M disposed between the first connector 9H and the second connector 9T (refer to each of the enlarged views in FIG. 1A and FIG. 1B).

In this example, the communication cable 9a is designed so that the second connector 9T is mounted (connected) to the first target socket 105T of the above-described label producing apparatus 100, and the first connector 9H is mounted to the third host socket 403H of the above-described operation terminal 400. Thus, the functional relationship between the label producing apparatus 100 and the operation terminal 400 is one wherein the label producing apparatus 100 functions as the target device, and the operation terminal 400 functions as the host device.

In this example, the communication cable 9b is designed so that the first connector 9H is mounted (connected) to the first host socket 105H of the above-described label producing apparatus 100, and the second connector 9T is mounted to the second target socket 205T of the above-described label producing apparatus 200. Thus, the functional relationship between the label producing apparatus 100 and the label producing apparatus 200 is one wherein the label producing apparatus 100 functions as the host device, and the label producing apparatus 200 functions as the target device.

Note that the communication cable 9a may be designed so that it is integrated with the operation terminal 400. In such a case, the communication cable 9a forms an integrated structure with the operation terminal 400, with the first connector 9H omitted and the second connector 9T provided at the end thereof detachably installable to the first target socket 105T of the label producing apparatus 100. Conversely, the communication cable 9a may be designed so that it is integrated with the label producing apparatus 100. In such a case, the communication cable 9a forms an integrated structure with the label producing apparatus 100, with the second connector 9T omitted and the first connector 9H provided at the end thereof detachably installable to the third host socket 403H of the operation terminal 400. In either case, the communication cable 9a connects the operation terminal 400 as a host and the label producing apparatus 100 as a target.

Additionally, the communication cable 9b may be designed so that it is integrated with the label producing apparatus 100. In such a case, the communication cable 9b forms an integrated structure with the label producing apparatus 100, with the first connector 9H omitted and the second connector 9T provided at the end thereof detachably installable to the second target socket 205T of the label producing apparatus 200. Conversely, the communication cable 9b may be designed so that it is integrated with the label producing apparatus 200. In such a case, the communication cable 9b forms an integrated structure with the label producing apparatus 200, with the second connector 9T omitted and the first connector 9H provided at the end thereof detachably installable to the first host socket 105H of the label producing apparatus 100. In either case, the communication cable 9b connects the label producing apparatus 100 as a host and the label producing apparatus 200 as a target.

Note that the second host socket 205H of the above-described label producing apparatus 200 and a third target socket 305T provided by another second label producing apparatus may be connected via the communication cable 9 so that the label producing apparatus 200 functions as the host device for the other second label producing apparatus [refer to the exemplary modification (1-1) described later].

Figure 2:
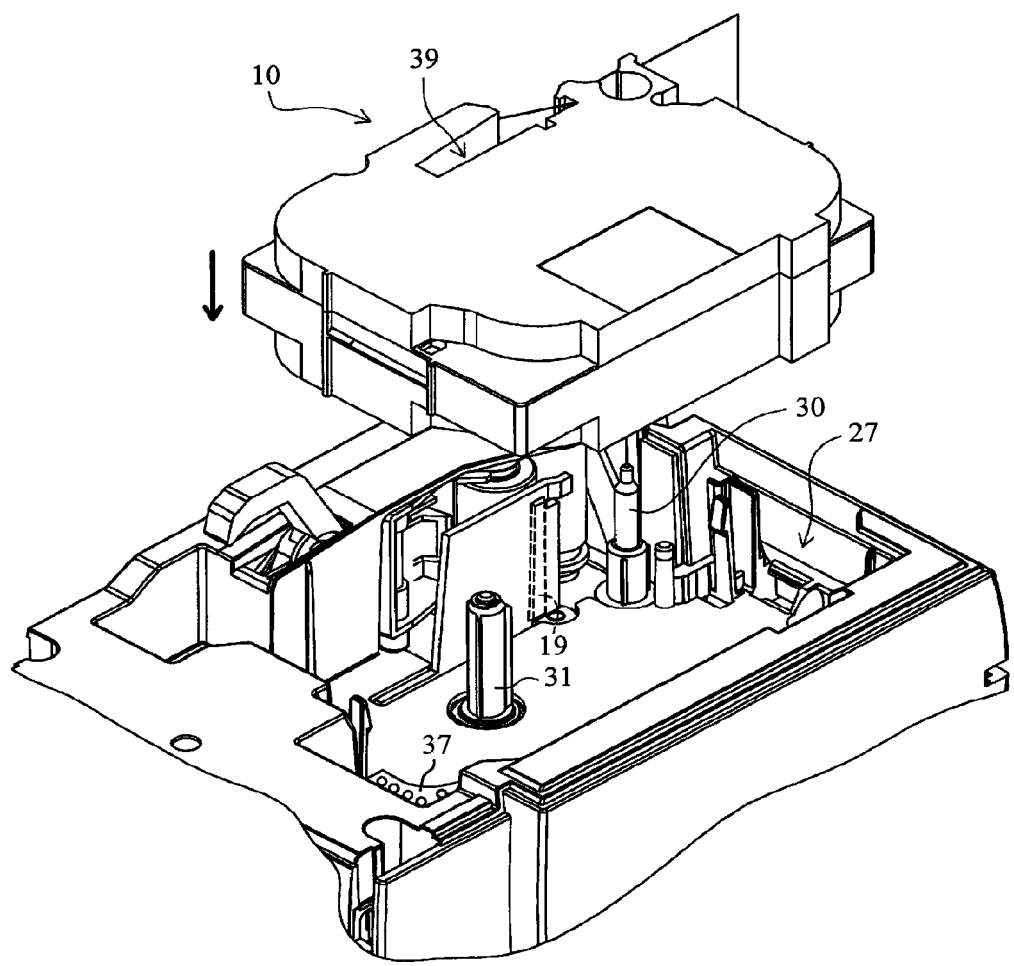
FIG. 2 is a perspective view illustrating the outer appearance configuration of a cartridge holder inside the label producing apparatus main body and a cartridge mounted thereto, with the opening/closing lid of the apparatus open.

The outer appearance configuration of the cartridge holder inside the apparatus main body 101 and the cartridge mounted thereto with the opening/closing lid 102 of the label producing apparatus 100 open will now be described with reference to FIG. 2. In FIG. 2, the illustration of the opening/closing lid 102 opened upward has been omitted to avoid illustration complexities.

In FIG. 2, a cartridge holder 27, a print head 19, a feeding roller driving shaft 30, a ribbon take-up roller driving shaft 31, and a cartridge sensor 37 are provided in the interior of the apparatus main body 101 of the label producing apparatus 100.

The cartridge holder 27 is detachably provided with a cartridge 10 that supplies a cover film 11 (refer to FIG. 3 described later). Note that, in this example, this cartridge holder 27 enables selective mounting and removal of a plurality of types of the cartridges 10 having different types of the cover films 11 (or different types of base tapes described later; hereinafter the same) of, for example, different tape widths, tape thicknesses, or tape material.

The print head 19 performs desired printing on the cover film 11 fed out from the above-described feeding roller driving shaft 30, etc.

The feeding roller driving shaft 30 and the ribbon take-up roller driving shaft 31 provide feeding driving power to a used ink ribbon 13 and the label tape 23 with print (for both, refer to FIG. 3 described later), and are rotationally driven in coordination.

In this example, when the cartridge 10 is mounted, the cartridge sensor 37 indirectly detects (described in detail later) the type of cover film 11 (tape width, tape thickness, tape material, etc.) provided to the cartridge 10 by detecting a detected part 24 (refer to FIG. 3 described later) formed on the mounted cartridge 10.

On the other hand, the cartridge 10, in this example, has a box shape that is generally formed into a rectangular solid, with a head insertion opening 39 that passes through the front and rear surfaces formed on a part thereof.

The configuration of the area surrounding the cartridge holder 27 with the cartridge 10 mounted thereto will now be described with reference to FIG. 3.

Figure 3:
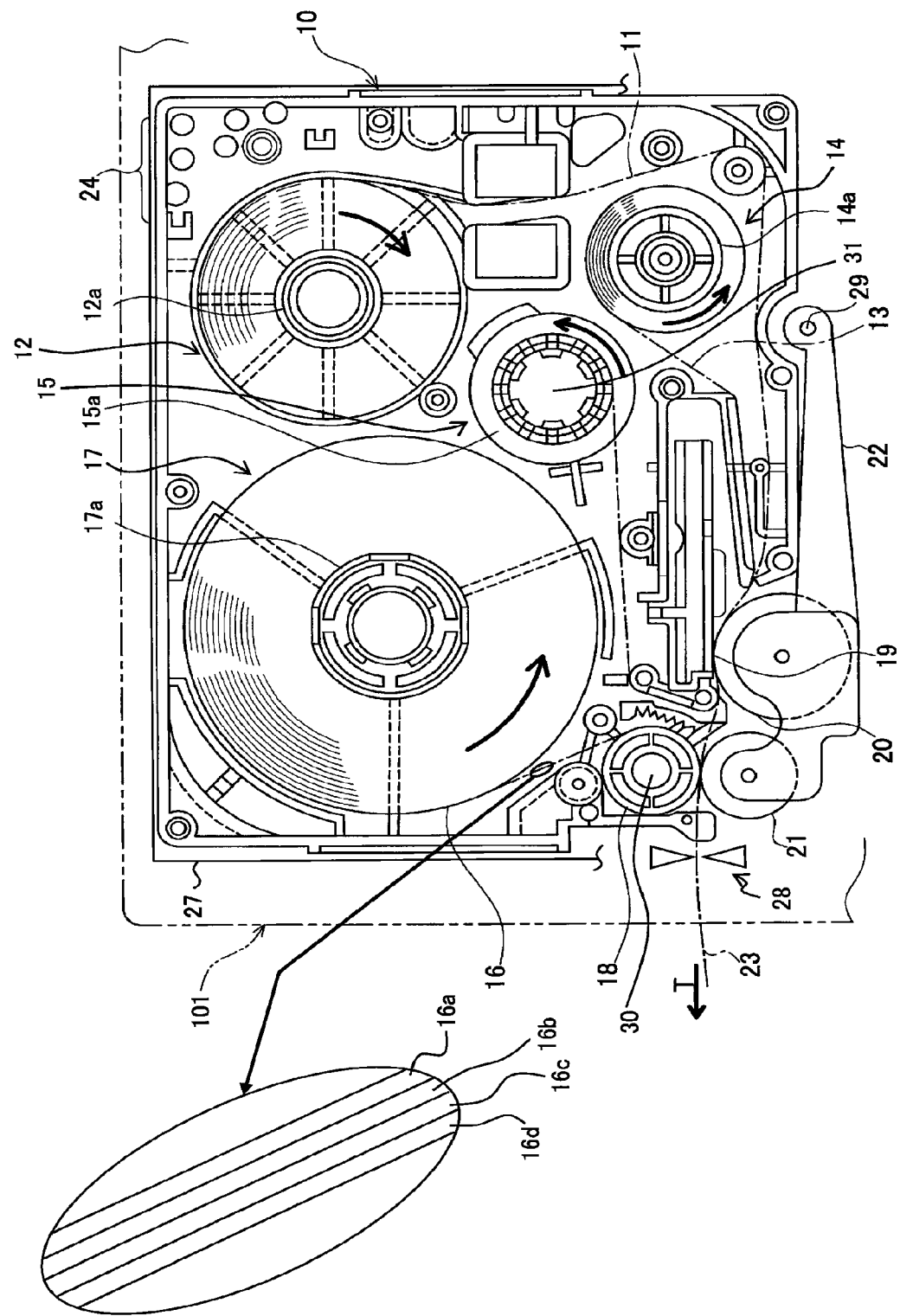
FIG. 3 is a diagram illustrating the area surrounding the cartridge holder with a cartridge mounted, along with the cartridge.

In FIG. 3, the cartridge 10 is detachably housed in the above-described cartridge holder 27, which is a recess within the apparatus main body 101. The cartridge 10 comprises a base tape roll 17 around which a base tape 16 is wound, a cover film roll 12 around which the cover film 11 is wound as a first label tape, a ribbon supply side roll 14 configured to feed out the ink ribbon 13 for printing (not required in a case of employing a thermal tape as the print-receiving medium), a ribbon take-up roller 15 configured to rewind the ink ribbon 13 after the printing, and a feeding roller 18.

The base tape roll 17 stores the above-described base tape 16 in such a manner that it is wound around a base tape spool 17a (a spool comprising a shaft orthogonal to the tape longitudinal direction).

The base tape 16 comprises a layered structure of a plurality of layers (four layers in this example; refer to the partially enlarged view in FIG. 3). That is, the base tape 16 is designed with layers comprised of an adhesive layer 16a made of a suitable adhesive for bonding the above-described cover film 11, a tape base layer 16b made of PET (polyethylene terephthalate) or the like, an adhesive layer 16c made of a suitable adhesive, and a separation sheet 16d, which are layered from the side wrapped on the inside (the right side in FIG. 3) to the opposite side (the left side in FIG. 3).

The separation sheet 16d is peeled off when the print label L eventually formed is to be affixed to an object such as a predetermined article, thereby making it possible to adhere the print label L to the article or the like by the adhesive layer 16c.

The cover film roll 12 is provided with a cover film 11 having a width substantially the same as the above-described base tape 16 in this example, that is wound around a cover film spool 12a (a spool comprising a shaft orthogonal to the tape longitudinal direction).

The ribbon supply side roll 14 is provided with the ink ribbon 13 that is wound around a ribbon supply side spool 14a (a spool comprising a shaft that is orthogonal to the longitudinal direction of the ink ribbon 13).

The ribbon take-up roller 15 comprises a ribbon take-up spool 15a (a spool comprising a shaft orthogonal to the longitudinal direction of the ink ribbon 13), and is configured to take up and wind the printed (used) ink ribbon 13 around the ribbon take-up spool 15a when driven by the above-described ribbon take-up roller driving shaft 31 on the side of the cartridge holder 27.

The feeding roller 18 is configured to affix the above-described base tape 16 and the above-described cover film 11 to each other by applying pressure, and feeds the label tape 23 with print thus formed in the direction of an arrow T in FIG. 3 (i.e. functioning as a pressure roller as well), when driven by the above-described feeding roller driving shaft 30 on the side of the cartridge holder 27.

The above-described ribbon take-up roller 15 and the feeding roller 18 are rotationally driven in coordination by the driving power of a feeding motor 33 (refer to FIG. 4 described later), which is a pulse motor, for example, provided on the outside of each of the cartridges 10. This driving power is transmitted to the above-described ribbon take-up roller driving shaft 31 and the feeding roller driving shaft 30 via a gear mechanism (not shown).

The detected part 24 is formed on the cartridge 10 in the corner (the upper right corner in FIG. 3) that is opposite the above-described feeding roller 18. On this detected part 24 is provided a plurality of switch holes in a predetermined pattern that indicates the type (for example, tape width, tape thickness, tape material, etc.) of the cover film 11 inside the cartridge 10. The cartridge 10 is provided in a variety of different types in accordance with the differences in the types of the above-described cover films 11, and is selectively mountable to the cartridge holder 27.

The aforementioned cartridge sensor 37 (refer to FIG. 2) detects the pattern of the switch holes which differs according to the type of the cartridge 10 as described above, making it possible to detect the type of the cartridge 10. The cartridge sensor 37, in this example, thus detects the type of the cartridge 10 and indirectly detects the type of the above-described cover film 11. Note that the cartridge sensor 37 may be configured to directly detect the type of the above-described cover film 11. Additionally, sometimes the type of the mountable cartridge 10 is uniquely defined as a single specific type. In such a case, the cartridge sensor 37 need not perform the function of detecting the type of the cartridge 10 as described above, but rather may simply perform the function of detecting that the cartridge 10 is mounted to the cartridge holder 27.

On the other hand, the cartridge holder 27 comprises the above-described print head 19, the above-described ribbon take-up roller driving shaft 31, the above-described feeding roller driving shaft 30, and a roller holder 22.

The print head 19 comprises a plurality of heat emitting elements, and performs printing in a print area of the cover film 11 fed out from the above-described cover film roll 12.

The feeding roller driving shaft 30 feeds the cover film 11 fed out (supplied) from the cover film roll 12 of the cartridge 10 mounted to the cartridge holder 27, and the base tape 16 fed out from the base tape roll 17 when driven by the above-described feeding roller 18.

The roller holder 22 is rotatably supported by a support shaft 29 and can switch between a print position and a release position via a switching mechanism. On this roller holder 22 are rotatably provided a platen roller 20 and a tape pressure roller 21. When the roller holder 22 switches to the above-described print position, the platen roller 20 and the tape pressure roller 21 press against the above-described print head 19 and the feeding roller 18.

Furthermore, on the cartridge holder 27 is provided a cutter 28 that is adjacent to a discharging exit (not shown) of the cartridge 10. This cutter 28 operates when a cutter driving button 38 (refer to FIG. 4 described later) is pressed, cutting the label tape 23 with print at a predetermined length to produce the print label L.

With the above-described configuration, once the cartridge 10 is mounted to the above-described cartridge holder 27, the ribbon take-up roller driving shaft 31 and the feeding roller driving shaft 30 are simultaneously rotationally driven by the driving power of the feeding motor 33 (refer to FIG. 4 described later). The feeding roller 18, the platen roller 20, and the tape pressure roller 21 rotate in accordance with the drive of the feeding roller driving shaft 30, thereby feeding out the base tape 16 from the base tape roll 17 and supplying the base tape 16 to the feeding roller 18 as described above. On the other hand, the cover film 11 is fed out from the cover film roll 12 and power is supplied to the plurality of heat emitting elements of the print head 19 by a print-head driving circuit 32 (refer to FIG. 4 described later). At this time, the ink ribbon 13 is pressed against the above-described print head 19, coming in contact with the rear surface of the cover film 11. As a result, the desired printing (reflected-image printing) is performed in the print area on the rear surface of the cover film 11. Then, the above-described base tape 16 and the above-described printed cover film 11 are affixed to each other by the feeding roller 18 and the tape pressure roller 21 so as to form a single tape, thereby forming the label tape 23 with print, which is then fed to outside the cartridge 10 via the above-described discharging exit. The label tape 23 with print is then cut by the cutter 28 to form the print label L on which desired printing was performed.

The functional configuration of the label producing apparatus 100 will now be described with reference to FIG. 4.

Figure 4:
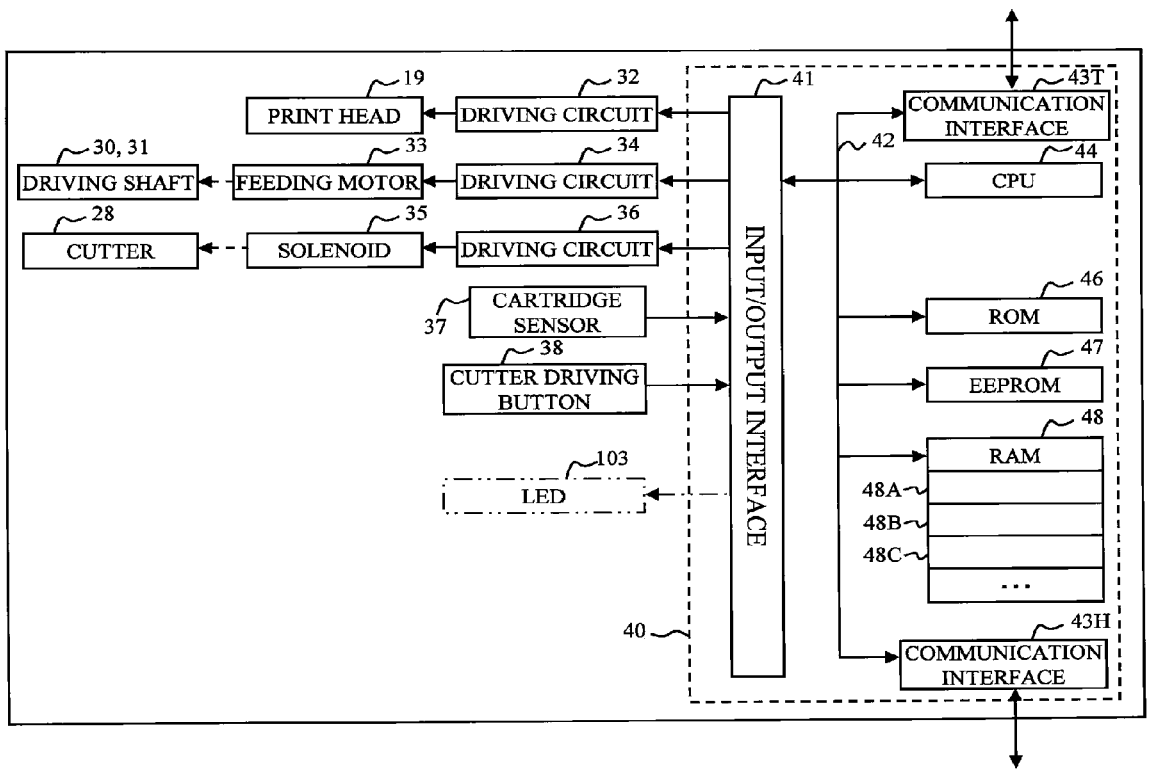
FIG. 4 is a functional block diagram illustrating the functional configuration of the label producing apparatus.

In FIG. 4, a control circuit 40 is disposed on a control board (not shown) of the label producing apparatus 100. The control circuit 40 is provided with a CPU 44, which is connected to an input/output interface 41, a ROM 46, a flash memory (EEPROM) 47, a RAM 48, and communication interfaces (communication I/F) 43T and 43H, via a data bus 42.

The ROM 46 stores various programs required for control, such as a print-head driving control program configured to read the data of a print buffer 48B described later and drive the above-described print head 19 and the feeding motor 33 described later, and a cutter driving control program configured to drive the feeding motor 33 so that the label tape 23 with print is fed to a cutting position after printing is completed, and drive a solenoid 35 described later to cut the label tape 23 with print. The CPU 44 performs various operations based on such programs stored in the ROM 46.

The RAM 48 temporarily stores the results of various operations performed by the CPU 44. This RAM 48 is provided with devices such as a text memory 48A, the print buffer 48B, and a work memory 48C that stores various operation data and the like. The text memory 48A stores print data such as document data.

The communication I/F 43T comprises, for example, a USB (Universal Serial Bus), etc., and performs information communication (serial communication, for example) via the above-described communication cable 9 with the host device. The communication I/F 43H comprises, for example, a USB, etc., and performs information communication (serial communication, for example) via the above-described communication cable 9 with the target device.

The input/output interface 41 is connected to the print-head driving circuit 32 for driving the above-described print head 19, a feeding motor driving circuit 34, a solenoid driving circuit 36, the above-described cartridge sensor 37, and the cutter driving button 38.

The feeding motor driving circuit 34 drives the feeding motor 33, thereby driving the aforementioned feeding roller driving shaft 30 and ribbon take-up roller driving shaft 31, feeding the base tape 16, the cover film 11, and the label tape 23 with print.

The solenoid driving circuit 36 drives the solenoid 35 configured to drive the above-described cutter 28 to perform the cutting operation.

The cutter driving button 38 activates the above-describe cutter 28 when manually operated by the operator, producing the print label L at a desired length.

Note that the functional components of the label producing apparatus 200 other than those shown in the aforementioned FIG. 1 are the same as those in the above-described FIGS. 2 to 4, and descriptions thereof will be omitted.

The following suitably collectively describes the label producing apparatus 100 and the label producing apparatus 200, which have the same configuration as described above. In this case, the apparatuses are suitably referred to as "label producing apparatuses 100 and 200."

In the control system having the control circuit 40 shown in FIG. 4 at its core, print data are consecutively stored in the text memory 48A when the print data are inputted to the label producing apparatus 100 from the operation terminal 400 via the communication cable 9a and the communication I/F 43T (or when print data are inputted to the label producing apparatus 200 from the label producing apparatus 100 via the communication I/F 43H, the communication cable 9b, and the communication I/F 43T). Then, the stored print data are read once again and subjected to predetermined conversion by the converting function of the control circuit 40, thereby generating dot pattern data. These data are then stored in the print buffer 48B. The print head 19 is driven via the print-head driving circuit 32 and the above-described heat-emitting elements are selectively driven to emit heat in accordance with the print dots of one line, thereby printing the dot pattern data stored in the print buffer 48B. At the same time, the feeding motor 33 controls the feeding of the above-described cover film 11, etc., via the feeding motor driving circuit 34, eventually producing the print label L.

An example of the print label L thus produced by the label producing apparatuses 100 and 200 will now be described with reference to FIG. 5A, FIG. 5B, and FIG. 6.

Figure 5A:
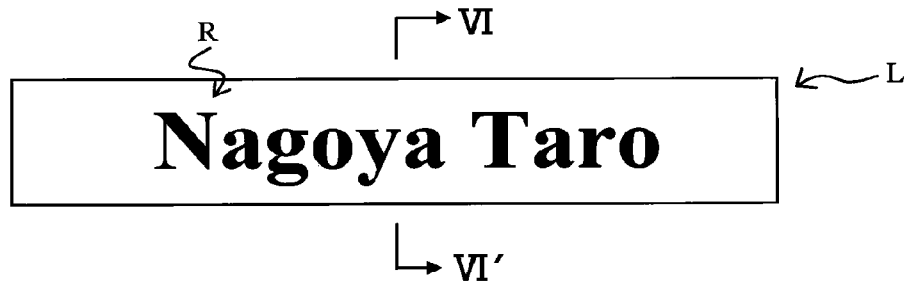
FIGS. 5A and 5B are a top plan view and a bottom plan view illustrating the appearance of an exemplary print label.
Figure 5B:
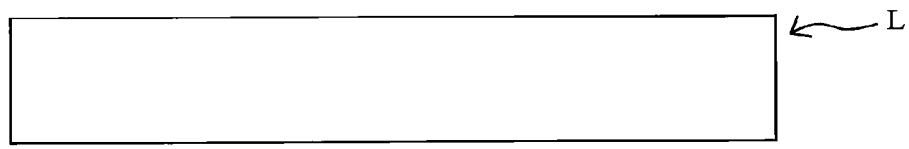
Figure 6:
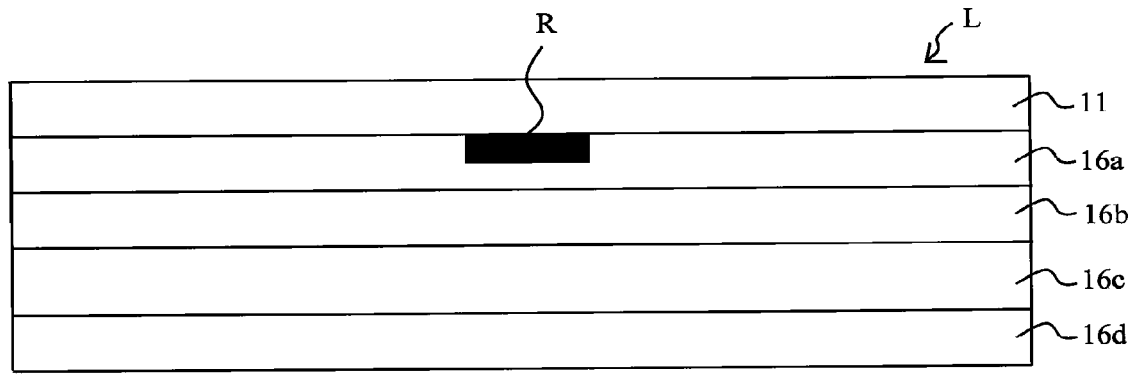
FIG. 6 is a diagram illustrating the cross-sectional view of cross-section VI-VI' turned 90°.

In FIG. 5A, FIG. 5B, and FIG. 6, the print label L has a five layer structure with the cover film 11 added to the base tape 16 shown in the aforementioned FIG. 3. That is, the print label L is designed with layers comprised of the cover film 11, the adhesive layer 16a, the tape base layer 16b, the adhesive layer 16c, and the separation sheet 16d, which are layered from the front surface (upper side in FIG. 6) to the opposite side (lower side in FIG. 6).

On the rear surface of the cover film 11, the print characters R (the characters "Nagoya Taro" in this example) of the content corresponding to the print data inputted via the operation part 402 of the operation terminal 400 by the operator are printed by mirror-image printing.

Subsequently, the control procedure for executing each operation performed by the operation terminal 400, the label producing apparatus 100, and the label producing apparatus 200 will be described with reference to FIG. 7, FIG. 8, FIG. 9, and FIG. 10.

The control contents executed by the control circuit (not shown) of the operation terminal 400 will now be described with reference to FIG. 7.

Figure 7:
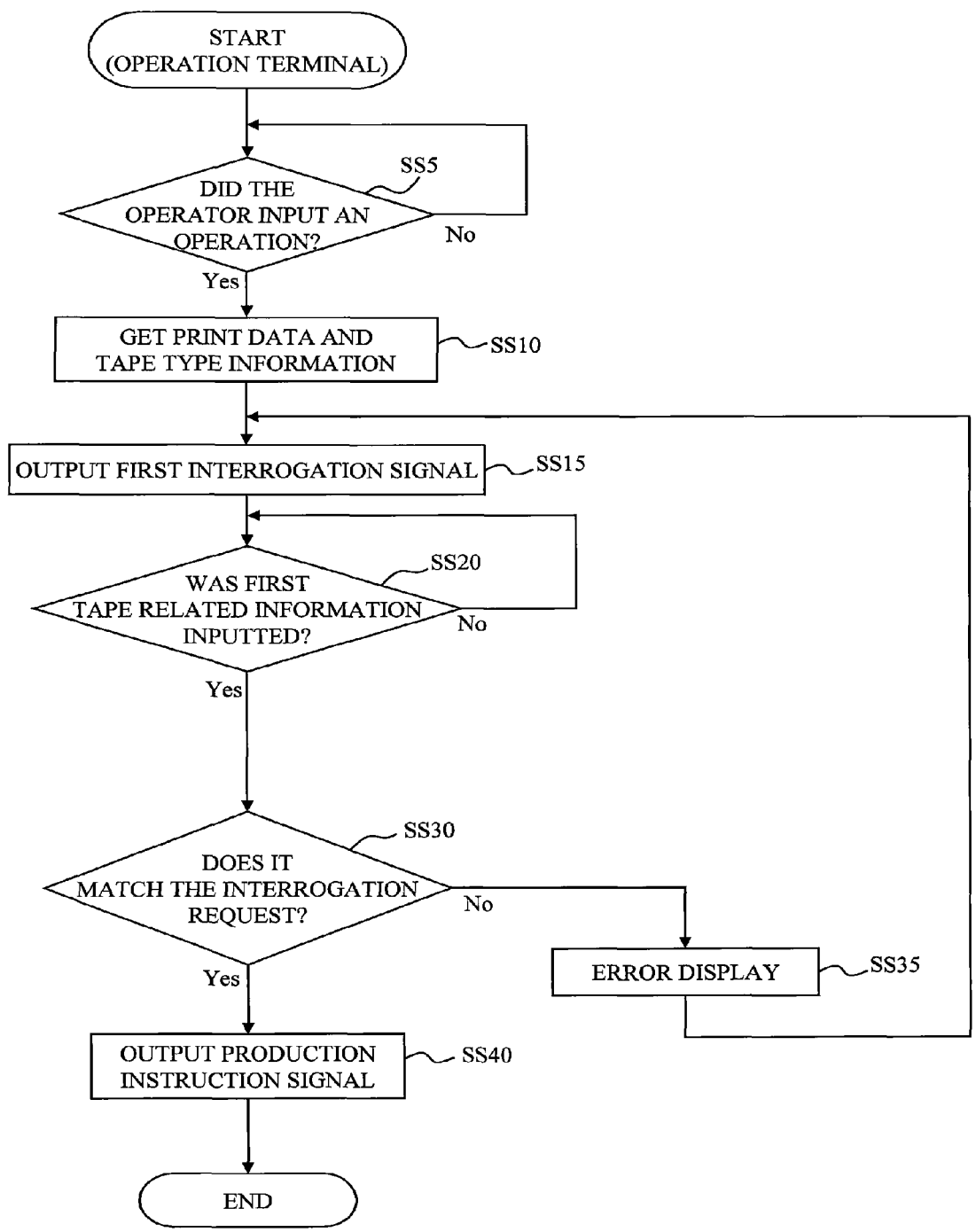
FIG. 7 is a flowchart illustrating the control contents executed by the control circuit of the operation terminal.

In FIG. 7, the flow is started ("START" position) when the operator turns ON the power of the operation terminal 400, for example.

First, in step SS5, the control circuit determines whether or not an operator inputted print data (such as "Nagoya Taro" for example) indicating the print contents of the print label L and the tape width (such as tape width "24 mm" for example) via the operation part 402. Until the print data and tape type are inputted, the condition is not satisfied and the control circuit enters a wait loop. Then, once the print data and tape type are inputted, the decision is made that the condition is satisfied and the flow proceeds to step SS10.

In step SS10, the control circuit acquires the print data and tape type information inputted via the operation part 402 by the operator, and stores the information in memory (not shown) provided by the operation terminal 400.

Subsequently, in step SS15, the control circuit generates a first interrogation signal (that includes the information of the tape type acquired in the above-described step SS10, such as "Requested tape width: 24 mm") that specifies the tape type to be used in label production, and outputs the first interrogation signal to the label producing apparatus 100 via the communication cable 9a.

Then, in step SS20, the control circuit determines whether or not first tape related information (details described later) outputted from the label producing apparatus 100 in step SA40 or step SA50 of FIG. 8 described later was inputted in accordance with the first interrogation signal outputted in the above-described step SS15. Until the first tape related information is inputted from the label producing apparatus 100, the condition is not satisfied and the control circuit enters a wait loop. Then, once the first tape related information is inputted from the label producing apparatus 100, the decision is made that the condition is satisfied and the flow proceeds to step SS30.

In step SS30, the control circuit determines whether or not the type of the cover film 11 contained in the cartridge 10 mounted to the cartridge holder 27 of the label producing apparatus 100 (hereinafter suitably omitted and referred to as "the type of the cover film 11 related to the label producing apparatus 100"; for example, "tape width 36 mm"), or the type of the cover film 11 contained in the cartridge 10 mounted to the cartridge holder 27 of the label producing apparatus 200 (hereinafter suitably omitted and referred to as the "type of the cover film 11 of the label producing apparatus 200"; for example, "tape width 24 mm" or "cartridge not mounted") matches the tape type acquired in the above-described step SS10, based on the first tape related information inputted in the above-describe step SS20. In a case where neither of the two matches, the decision is made that the condition is not satisfied and the flow proceeds to step SS35.

For example, assume that the tape width (requested tape width) specified by the first interrogation signal generated and outputted in the above-described step SS15 is 24 mm, the tape width of the cover film 11 related to the label producing apparatus 100 is 36 mm, and the cartridge 10 is not mounted to the label producing apparatus 200. In such a case, neither of the tape widths of the cover films 11 related to the label producing apparatuses 100 and 200 matches the requested tape width, resulting in the decision that the condition of the above-described step SS30 is not satisfied.

In step SS35, the control circuit outputs a display signal to the display part 401, and a predetermined error display [such as, "The correct cartridge is not inserted in either of the label producing apparatuses. (Insert a cartridge having a 24 mm tape width into either of the label producing apparatuses.)"] is displayed. Subsequently, the flow returns to the above-described step SS15, and the same procedure is repeated.

On the other hand, in a case where, in the above-described step SS30, either the type of the cover film 11 related to the label producing apparatus 100 or the type of the cover film 11 related to the label producing apparatus 200 matches the tape type acquired in the above-described step SS10, the decision is made that the condition of step SS30 is satisfied and the flow proceeds to step SS40.

For example, assume that the above-described requested tape width of the first interrogation signal generated and outputted in the above-described step SS15 is 24 mm, the tape width of the cover film 11 related to the label producing apparatus 100 is 36 mm, and the tape width of the cover film 11 of the label producing apparatus 200 is 24 mm. In such a case, the tape width of the cover film 11 related to the label producing apparatus 200 matches the requested tape width, resulting in the decision that the condition of the above-described step SS30 is satisfied.

In step SS40, the control circuit outputs a production instruction signal that includes the print data acquired in the above-described step SS10 and information on the production destination of the print label L determined based on the first tape related information inputted in the above-described step SS20 to the label producing apparatus 100 via the communication cable 9a. This process then terminates here.

The control contents executed by the control circuit 40 of the label producing apparatus 100 will now be described with reference to FIG. 8.

Figure 8:
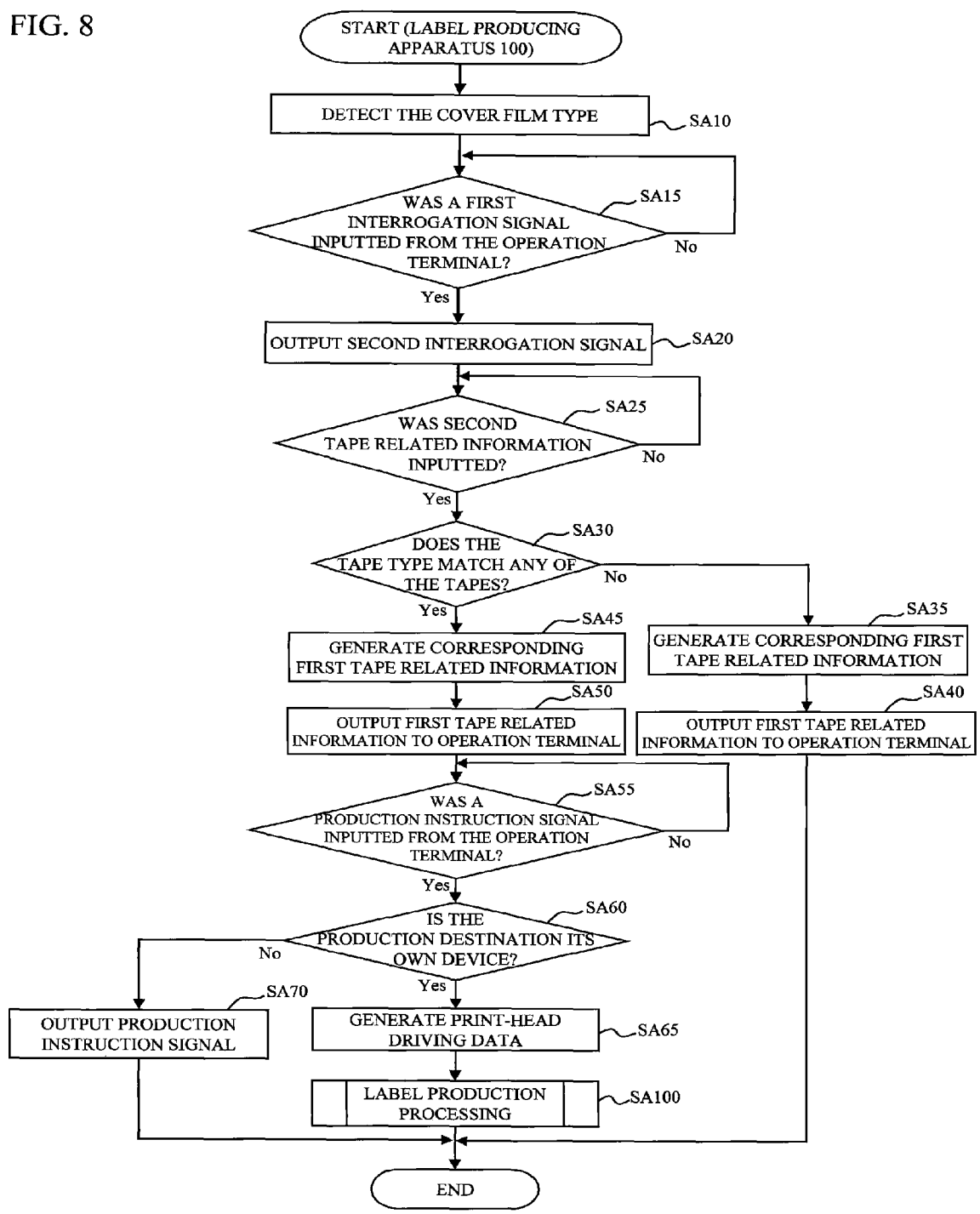
FIG. 8 is a flowchart illustrating the control contents executed by the control circuit of the label producing apparatus.

In FIG. 8, the flow is started ("START" position) when the operator turns ON the power of the label producing apparatus 100, for example.

First, in step SA10, the control circuit 40 outputs a control signal to the cartridge sensor 37 of the label producing apparatus 100, causing the cartridge sensory 37 to detect the type of the cartridge 10 mounted to the above-described cartridge holder 27 and store the detection result (in a case where the cartridge 10 is not mounted, that information) in the RAM 48, for example. Note that the detection result of the cartridge sensor 37 may be continually inputted and then stored in the RAM 48 based on this timing. Thus, by having the cartridge sensor 37 detect the type of the cartridge 10, it is possible to indirectly detect the type of the cover film 11 provided to the cartridge 10.

Then, in step SA15, the control circuit 40 determines whether or not the above-described first interrogation signal outputted from the operation terminal 400 in the above-described step SS15 of FIG. 7 was inputted via the communication cable 9a. Until the first interrogation signal is inputted from the operation terminal 400, the condition is not satisfied and the control circuit 40 enters a wait loop. Then, once the first interrogation signal is inputted from the operation terminal 400, the decision is made that the condition is satisfied and the flow proceeds to step SA20.

In step SA20, the control circuit 40 generates a second interrogation signal (that includes information on the tape type acquired in step SS10 of the above-described FIG. 7, such as "requested tape width: 24 mm") that specifies the tape type to be used in label production, and outputs the second interrogation signal to the label producing apparatus 200 via the communication cable 9b.

Subsequently, in step SA25, the control circuit 40 determines whether or not second tape related information (details described later) outputted from the label producing apparatus 200 in step SB30 or step SB40 of FIG. 10 described later was inputted via the communication cable 9b in accordance with the second interrogation signal outputted in the above-described step SA20. Until the second tape related information is inputted from the label producing apparatus 200, the condition is not satisfied and the control circuit 40 enters a wait loop. Then, once the second tape related information is inputted from the label producing apparatus 200, the decision is made that the condition is satisfied and the flow proceeds to step SA30.

In step SA30, the control circuit 40 determines whether or not the detection result (including information related to the type of the cover film 11 of the label producing apparatus 100) of the cartridge sensor 37 acquired in the above-described step SA10, or the second tape related information (the detection result of the cartridge sensor 37 of the label producing apparatus 200, i.e., including information related to the type of the cover film 11 of the label producing apparatus 200) matches the tape type specified by the first interrogation signal inputted in the above-described step SA15. In a case where neither of the two matches, the decision is made that the condition is not satisfied and the flow proceeds to step SA35.

For example, assume that the above-described requested tape width of the first interrogation signal inputted in the above-described step SA15 is 24 mm, the tape width of the cover film 11 related to the label producing apparatus 100 is 36 mm, and the cartridge 10 is not mounted to the label producing apparatus 200. In such a case, neither of the tape widths of the cover films 11 of the label producing apparatuses 100 and 200 matches the requested tape width, resulting in the decision that the condition of the above-described step SA30 is not satisfied.

In step SA35, the control circuit 40 generates corresponding first tape related information in accordance with the determination result of the above-described step SA30 (in accordance with the second tape related information and the detection result of the cartridge sensor 37 of the label producing apparatus 100). The first tape related information includes information indicating that the tape type specified by the above-described first interrogation signal does not match either of the types of the cover films 11 related to the above-described label producing apparatuses 100 and 200 (or information indicating the types of the above-described cover films 11 that do not match).

Then, in step SA40, the control circuit 40 outputs the first tape related information generated in the above-described step SA35 (such as "No match. The current tape width of the label producing apparatus 100 is 36 mm, and there is currently no cartridge mounted to the label producing apparatus 200.") to the operation terminal 400 via the communication cable 9a. This process then terminates here.

On the other hand, in a case where, in the above-described step SA30, the tape type specified by the first interrogation signal inputted in the above-described step SA15 matches either the detection result of the cartridge sensor 37 acquired in the above-described step SA10 or the second tape related information inputted in the above-described step SA25, the decision is made that the condition of step SA30 is satisfied and the flow proceeds to step SA45.

For example, assume that the above-described requested tape width of the first interrogation signal inputted in the above-described step SA15 is 24 mm, the tape width of the cover film 11 related to the label producing apparatus 100 is 36 mm, and the tape width of the cover film 11 of the label producing apparatus 200 is 24 mm. In such a case, the tape width of the cover film 11 of the label producing apparatus 200 matches the requested tape width, resulting in the decision that the condition of the above-described step SA30 is satisfied.

In step SA45, the control circuit 40 generates the corresponding first tape related information in accordance with the determination result of the above-described step SA30. The first tape related information includes information indicating that the tape type specified by the above-described first interrogation signal matches one of the types of the cover films 11 of the above-described label producing apparatuses 100 and 200 (or information indicating the type of the above-described cover film 11 that matches).

Subsequently, in step SA50, the control circuit 40 outputs the first tape related information generated in the above-described step SA45 (such as "Match. The current tape width of the label producing apparatus 100 is 36 mm, and the current tape width of the label producing apparatus 200 is 24 mm.") to the operation terminal 400 via the communication cable 9a.

Then, in step SA55, the control circuit 40 determines whether or not the production instruction signal outputted from the operation terminal 400 in step SS40 of the above-described FIG. 7 was inputted via the communication cable 9a in accordance with the first tape related information outputted in the above-described step SA50. Until the production instruction signal is inputted from the operation terminal 400, the condition is not satisfied and the control circuit 40 enters a wait loop. Then, once the production instruction signal is inputted from the operation terminal 400, the decision is made that the condition is satisfied and the print data included in the production instruction signal are stored in the text memory 48A and the flow proceeds to step SA60.

In step SA60, the control circuit 40 determines whether or not the production destination of the print label L is its own device, i.e., the label producing apparatus 100, based on the information on the above-described production destination included in the production instruction signal inputted in the above-described step SA55. If the production destination is the label producing apparatus 100, the decision is made that the condition is satisfied, and the flow proceeds to step SA65.

In step SA65, the print data stored in the text memory 48A in the above-described step SA55 are read and subjected to predetermined conversion, for example, to generate the dot pattern data (=print-head driving data) corresponding to the contents to be printed on the cover film 11. Then, the dot pattern data are stored in the print buffer 48B.

Subsequently, in step SA100, the control circuit 40 executes the label production process (for the detailed procedure, refer to FIG. 9 described later) for producing the print label L on which desired printing is performed. This process then terminates here.

On the other hand, in a case where the production destination of the print label L is not its own device, i.e., is not the label producing apparatus 100, in the above-described step SA60, the decision is made that the condition of step SA60 is not satisfied and the flow proceeds to step SA70.

In step SA70, the control circuit 40 outputs the above-described production instruction signal to the label producing apparatus 200 via the communication cable 9b. This process then terminates here.

Figure 9:
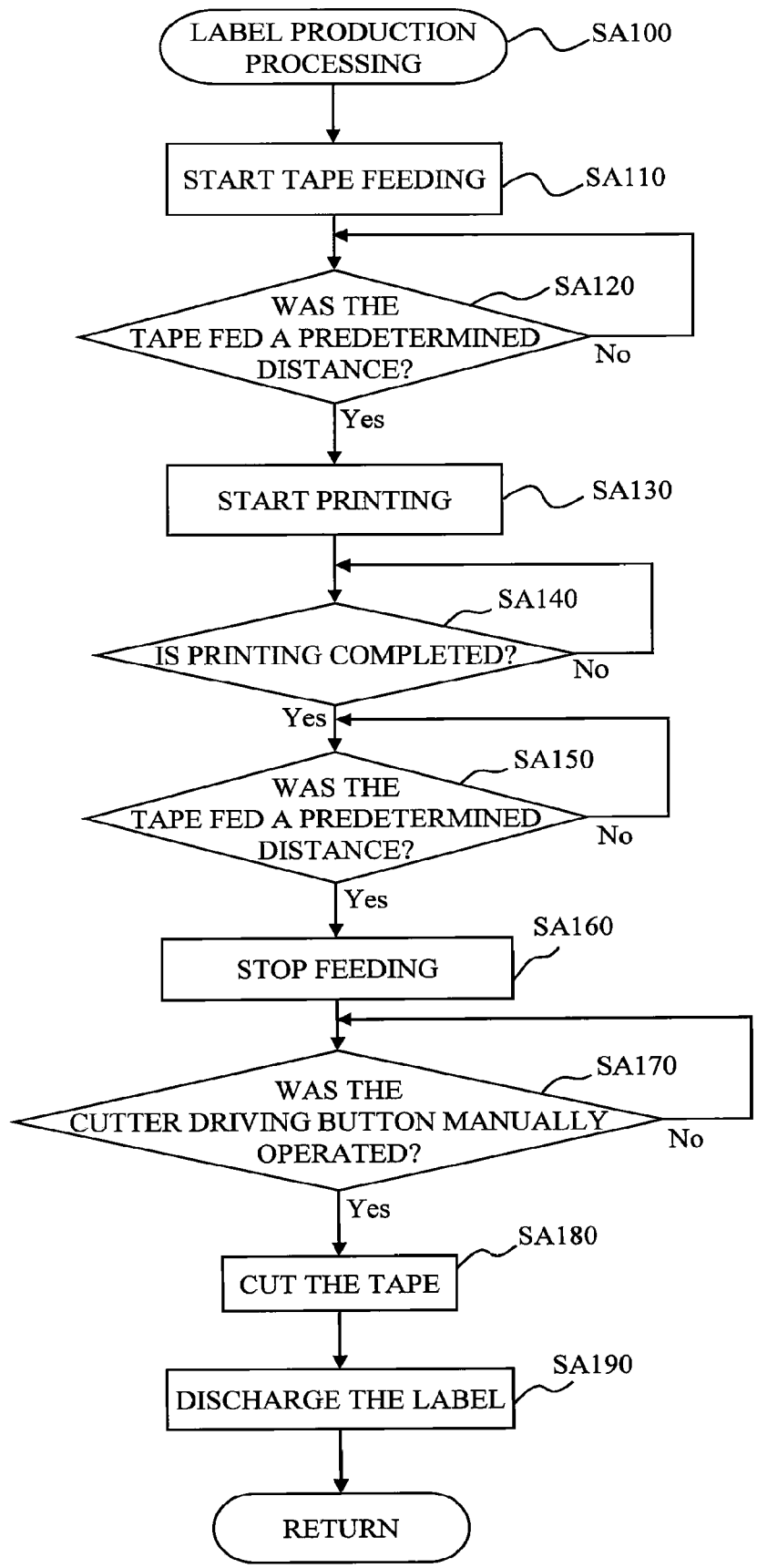
FIG. 9 is a flowchart illustrating the detailed procedure of step SA100.

The detailed procedure of step SA100 of the above-described FIG. 8 will now be described with reference to FIG. 9.

First, in step SA110, the control circuit 40 outputs a control signal to the feeding motor driving circuit 34, and the feeding motor 33 drives the feeding roller driving shaft 30 and the ribbon take-up roller driving shaft 31. As a result, the feed-out of the base tape 16 from the base tape roll 17 and the feed-out of the cover film 11 from the cover film roll 12 is started, and the feeding of the base tape 16, the cover film 11, and the label tape 23 with print (hereinafter collectively simply referred to as "base tape 16, etc.") is started.

Subsequently, in step SA120, the control circuit 40 determines whether or not the base tape 16, etc., have been fed a predetermined distance. This predetermined distance is a feeding distance (so-called front margin length) required for the top edge of the print area of the cover film 11 to arrive at a position substantially opposite the print head 19. This feeding distance may be determined by simply the detection of a marking provided on the base tape 16, for example, using a known tape sensor (not shown). Until the base tape 16, etc., have been fed the predetermined distance, the condition is not satisfied and the control circuit 40 enters a wait loop. Then, once the base tape 16, etc., are fed the predetermined distance, the decision is made that the condition is satisfied and the flow proceeds to step SA130.

In step SA130, the control circuit 40 outputs a control signal to the print-head driving circuit 32, causing the print head 19 to start printing in accordance with the print-head driving data in the print area of the cover film 11.

Then, in step SA140, the control circuit 40 determines whether or not all of the printing in the above-described print area of the cover film 11 is completed. Until all of the printing is completed, the condition is not satisfied and the control circuit 40 enters a wait loop. Then, once all of the printing is completed, the decision is made that the condition is satisfied and the flow proceeds to step SA150.

In step SA150, the control circuit 40 determines whether or not the base tape 16, etc., have been further fed a predetermined distance (such as a feeding distance required for the entire print area to pass the cutter 28 by a predetermined length; the so-called rear margin length). At this time, this feeding distance may simply be determined in the same manner as in the above-described step SA120. Until the base tape 16, etc., are fed the predetermined distance, the condition is not satisfied and the control circuit 40 enters a wait loop. Then, once the base tape 16, etc., are fed the predetermined distance, the decision is made that the condition is satisfied and the flow proceeds to step SA160.

In step SA160, the control circuit 40 outputs a control signal to the feeding motor driving circuit 34, and stops the driving of the feeding roller driving shaft 30 and the ribbon take-up roller driving shaft 31 by the feeding motor 33, thereby stopping the feed-out of the base tape 16 and the cover film 11 from the base tape roll 17 and the cover film roll 12 as well as the feeding of the base tape 16, etc.

Subsequently, in step SA170, the control circuit 40 determines whether or not the above-described cutter driving button 38 was manually operated by the operator. Until the cutter driving button 38 is manually operated, the condition is not satisfied and the control circuit 40 enters a wait loop. Then, once the cutter driving button 38 is manually operated, the decision is made that the condition is satisfied and the flow proceeds to step SA180.

Then, in step SA180, the control circuit 40 outputs a control signal to the solenoid driving circuit 36 to drive the solenoid 35, causing the label tape 23 with print to be cut by the cutter 28. At this moment, as described above, the entire label tape 23 with print, including the above-described print area, sufficiently passes the cutter 28, and the cutting of the cutter 28 forms a print label L on which printing in accordance with the print-head driving data was performed.

Subsequently, in step SA190, the control circuit 40 outputs a control signal to a discharging motor (not shown) configured to drive a discharging roller (not shown) separately provided, and the print label L formed into a label shape in the above-described step SA180 is discharged to outside the apparatus. Note that in a case where the print label L can be manually discharged to the outside without a discharging motor, the step SA190 may be omitted. This routine then terminates here.

The control contents executed by the control circuit 40 of the label producing apparatus 200 will now be described with reference to FIG. 10.

Figure 10:
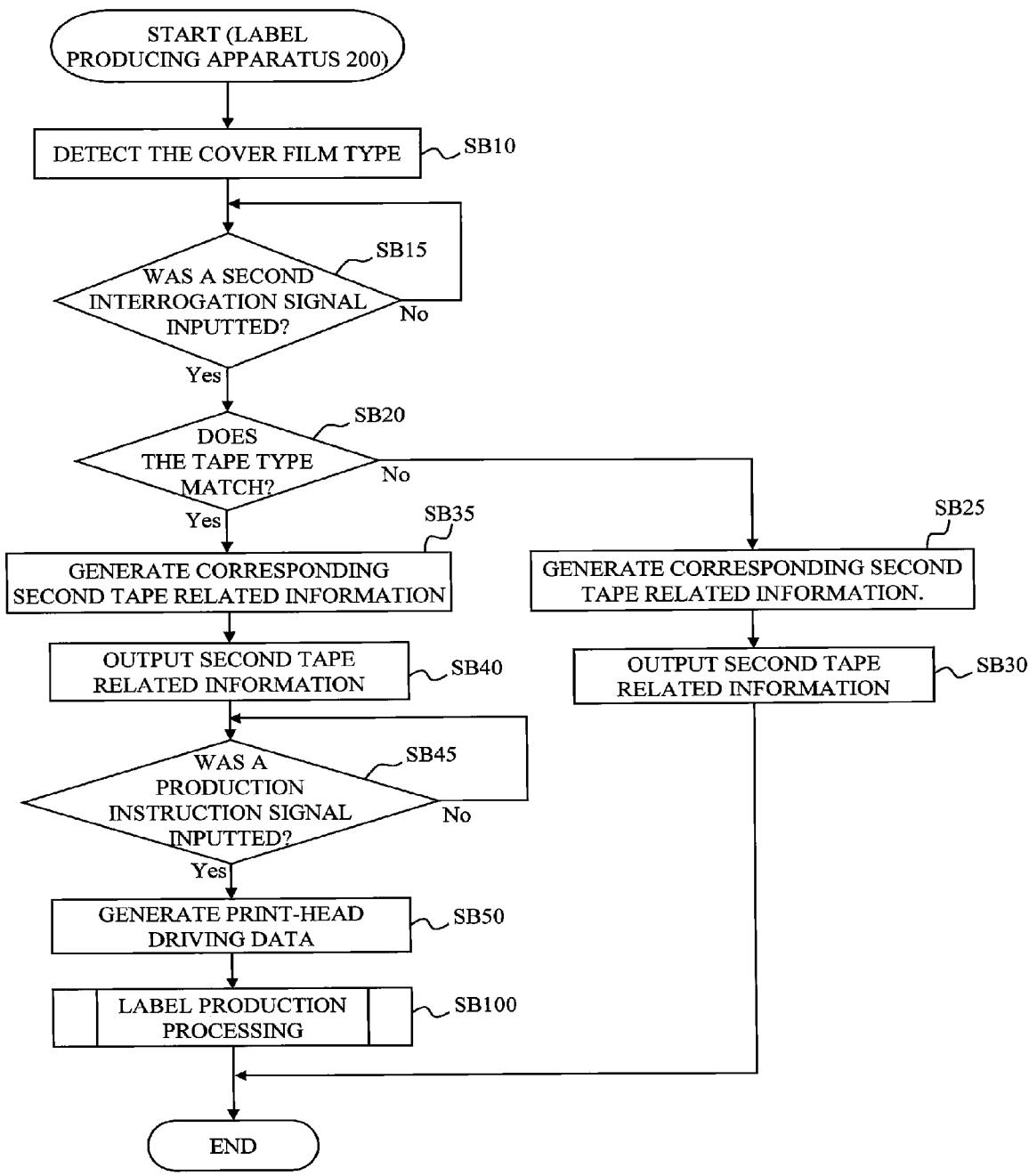
FIG. 10 is a flowchart illustrating the control contents executed by the control circuit of the label producing apparatus.

In FIG. 10, the flow is started ("START" position) when the operator turns ON the power of the label producing apparatus 200, for example.

First, in step SB10, the control circuit 40 outputs a control signal to the cartridge sensor 37 of the label producing apparatus 200, causing the cartridge sensor 37 to detect the type of the cartridge 10 mounted to the above-described cartridge holder 27 and store the detection result (in a case where the cartridge 10 is not mounted, that information) in the RAM 48, for example. Note that, similar to the above, the detection result of the cartridge sensor 37 may be continually inputted and then stored in the RAM 48 based on this timing.

Then, in step SB15, the control circuit 40 determines whether or not the second interrogation signal outputted from the label producing apparatus 100 in step SA20 of the above-described FIG. 8 was inputted via the communication cable 9b. Until the second interrogation signal is inputted from the label producing apparatus 100, the condition is not satisfied and the control circuit 40 enters a wait loop. Then, once the second interrogation signal is inputted from the label producing apparatus 100, the decision is made that the condition is satisfied and the flow proceeds to step SB20.

In step SB20, the control circuit 40 determines whether or not the detection result (including the information related to the type of the cover film 11 of the label producing apparatus 200) of the cartridge sensor 37 acquired in the above-described step SB10 matches the tape type specified by the second interrogation signal inputted in the above-described step SB15. In a case where the detection result does not match, the decision is made that the condition is not satisfied and the flow proceeds to step SB25.

Assume, for example, that the above-described requested tape width of the second interrogation signal inputted in the above-described step SB15 is 24 mm, and the cartridge 10 is not mounted to the label producing apparatus 200. In such a case, the tape width of the cover film 11 related to the label producing apparatus 200 does not match the requested tape width, resulting in the decision that the condition of the above-described step SB20 is not satisfied.

In step SB25, the control circuit 40 generates corresponding second tape related information in accordance with the determination result of the above-described step SB20 (in accordance with the detection result of the cartridge sensor 37 of the label producing apparatus 200). The second tape related information includes information indicating that the tape type specified by the above-described second interrogation signal does not match the type of the cover film 11 related to the label producing apparatus 200 (or information indicating the type of the cover film 11 that does not match).

Subsequently, in step SB30, the second tape related information (such as "No match. A cartridge is currently not mounted.") generated in the above-described step SB25 is outputted to the label producing apparatus 100 via the communication cable 9b. This process then terminates here.

On the other hand, in a case where, in the above-described step SB20, the tape type specified by the second interrogation signal inputted in the above-described step SB15 matches the detection result of the cartridge sensor 37 acquired in the above-described step SB10, the decision is made that the condition of step SB20 is satisfied and the flow proceeds to step SB35.

Assume, for example, that the above-described requested tape width of the second interrogation signal inputted in the above-described step SB15 is 24 mm, and the tape width of the cover film 11 of the label producing apparatus 200 is 24 mm. In such a case, the tape width of the cover film 11 related to the label producing apparatus 200 matches the requested tape width, resulting in the decision that the condition of the above-described step SB20 is satisfied.

In step SB35, the control circuit 40 generates the corresponding second tape related information in accordance with the determination result of the above-described step SB20. The second tape related information includes information indicating that the tape type specified by the above-described second interrogation signal matches the type of the cover film 11 related to the label producing apparatus 200 (or information indicating the type of the cover film 11 that matches).

Then, in step SB40, the second tape related information (such as "Match. The current tape width is 24 mm.") generated in the above-described step SB35 is outputted to the label producing apparatus 100 via the communication cable 9b.

Subsequently, in step SB45, the control circuit 40 determines whether or not the production instruction signal outputted from the label producing apparatus 100 in step SA70 of the above-described FIG. 8 was inputted via the communication cable 9b in accordance with the second tape related information outputted in the above-described step SB40. Until the production instruction signal is inputted from the label producing apparatus 100, the condition is not satisfied and the control circuit 40 enters a wait loop. Then, once the production instruction signal is inputted from the label producing apparatus 100, the decision is made that the condition is satisfied and the print data included in the production instruction signal are stored in the text memory 48A and the flow proceeds to step SB50.

In step SB50, the print data stored in the text memory 48A in the above-described step SB45 are read and subjected to predetermined conversion, for example, to generate the dot pattern data (=print-head driving data) corresponding to the contents to be printed on the cover film 11. Then, the dot pattern data are stored in the print buffer 48B.

Then, in step SB100, the control circuit 40 executes the label production process (for the detailed procedure, refer to the aforementioned FIG. 9) for producing the print label L on which desired printing has been performed. This process then terminates here.

In the label producing system LS of this embodiment thus described, the first connector 9H of the communication cable 9a is mounted to the third host socket 403H of the operation terminal 400, and the second connector 9T of the communication cable 9a is mounted to the first target socket 105T of the label producing apparatus 100. With this arrangement, the operation terminal 400 functions as a host device, and the label producing apparatus 100 functions as a target device. Further, the first connector 9H of the communication cable 9b is mounted to the first host socket 105H of the label producing apparatus 100, and the second connector 9T of the communication cable 9b is mounted to the second target socket 205T of the label producing apparatus 200. With this arrangement, the label producing apparatus 100 functions as a host device, and the label producing apparatus 200 functions as a target device.

At this time, in the label producing apparatus 100, when the cartridge 10 is mounted to the cartridge holder 27, the type of the cover film 11 provided in the mounted cartridge 10 is detected by the cartridge sensor 37, and the first tape related information corresponding to the detection result is generated. Further, similar to the case of the above-described label producing apparatus 100, in the label producing apparatus 200 as well, when the cartridge 10 is mounted to the cartridge holder 27, the type of the cover film 11 provided in the mounted cartridge 10 is detected by the cartridge sensor 37. Then, the second tape related information is generated in accordance with the detection result of the cartridge sensor 37 of the label producing apparatus 200, and the second tape related information thus generated is outputted to the label producing apparatus 100 via the communication cable 9b (refer to step SB30 and step SB40 of FIG. 10).

Then, in the label producing apparatus 100, the first tape related information is generated based on the aforementioned detection result (including information related to the type of the cover film 11 of the label producing apparatus 100) of the cartridge sensor 37 and the second tape related information (including information related to the type of the cover film 11 of the label producing apparatus 200) inputted from the above-described label producing apparatus 200 (refer to step SA35 and step SA45 in FIG. 8). Then, the first tape related information thus generated is outputted to the operation terminal 400 via the communication cable 9a (refer to step SA40 and step SA50 in FIG. 8).

With the two label producing apparatuses 100 and 200 connected in the order of the operation terminal 400, the label producing apparatus 100, and the label producing apparatus 200 via the communication cables 9a and 9b, the operation terminal 400 is capable of aggregating the types of cover films 11 related to the label producing apparatuses 100 and 200. With such a sequential aggregation method oriented toward the operation terminal 400 side, the operation terminal 400 simply needs to recognize only the label producing apparatus 100 arranged closest to and directly connected with the operation terminal 400. That is, the operation terminal 400 does not need to individually recognize other label producing apparatuses (the single label producing apparatus 200 in this example), and can simply display only the label producing apparatus 100 on the display part 401, for example. Then, the operation terminal 400 simply needs to acquire only the information transmitted from the label producing apparatus 100 and not directly acquire the information from the other label producing apparatus 200. Then, based only on the information acquired from the label producing apparatus 100, the operation terminal 400 can identify if either of the tape types of the above-described cover films 11 is suitable for the label production intended by the operator.

As a result, in a case where the cover film 11 related to the label producing apparatus 100 is suitable, the cover film 11 can be used to execute label production (refer to step SA100 of FIG. 8). In a case where the cover film 11 related to the label producing apparatus 200 is suitable, that cover film 11 can be used to execute label production (refer to step SB100 of FIG. 10). Further, in a case where neither of the cover films 11 is suitable, the operator can be reliably made aware of that fact (refer to step SS35 of FIG. 7). At this time, as a result of the above-described aggregation method, the operator does not need to be separately aware of or individually select or operate the plurality of label producing apparatuses 100 and 200 using the operation terminal 400. Further, the operator does not need to be aware of the number (in this case two) of connected label producing apparatuses 100 and 200. That is, the operator simply needs to perform operations, such as the label production instruction, only on the one label producing apparatus 100 that appears on the display part 401 of the operation terminal 400. For example, even if the cartridge 10 that includes the cover film 11 that matches the form desired by the operator is mounted to the label producing apparatus 200, the operator simply performs operations on the one label producing apparatus 100 that is displayed on the display part 401. The operations performed automatically produce the print label L in a form corresponding to the operator's intentions on the label producing apparatus 200 as described above.

As a result of the above, when the operator wants to suitably use the two label producing apparatuses 100 and 200 to produce labels of an intended form, the operator can produce the desired print labels L by simply connecting the label producing apparatuses 100 and 200 via simple connections of the communication cables 9a and 9b. This makes it possible to simply and easily configure the system without use of a network that employs LAN cables or wireless LAN, enabling support of environments that have an intricately constructed network as well. Additionally, without obstacles such as recognition errors or communication errors caused by the effects of the communication environment, which may occur with network connection, the system can be easily operated even by an operator of a normal skill level.

Thus, according to the above-described embodiment, it is possible to alleviate the labor burden of the operator and not demand that the operator have the increased skill level required when working with a network system. As a result, operator convenience is improved.

Particularly, in the embodiment, the label producing apparatus 100 comprises the first host socket 105H on the front surface part 109 of the housing 101s (refer to FIG. 1A). With the host socket 105H thus provided on the front surface part 109, it is possible to simply and clearly execute connections on the front surface so that the label producing apparatus 100 functions as the host device and another apparatus (the label producing apparatus 200 in this example) functions as the target device.

Further, particularly in this embodiment, the label producing apparatus 100 comprises the first target socket 105T on the rear surface part 110 of the housing 101s, and the label producing apparatus 200 comprises the second target socket 205T on the rear surface part 210 of the housing 201s (refer to FIG. 1B). With the target socket 105T thus provided on the rear surface part 110 of the label producing apparatus 100, it is possible to execute connections that make the label producing apparatus 100 function as the target device of another device (the operation terminal 400 in this example) on the device rear side in an inconspicuous manner. Particularly, in the case of the label producing apparatus 100, the connection that makes the label producing apparatus 100 function as the host device and the other apparatus (the label producing apparatus 200 in this example) function as the target device is provided on the front surface part 109 as described above, thereby clearly differentiating the two connection locations (the connection location of the target device and the connection location of the host device). Further, with the target socket 205T thus provided on the rear surface part 210 of the label producing apparatus 200, it is possible to execute connections that make the label producing apparatus 200 function as the target device of another device (the label producing apparatus 100 in this example) on the device rear side in an inconspicuous manner.

Note that various modifications may be made according to the present embodiment without departing from the spirit and scope of the disclosure, in addition to the above embodiment. Description will be made below regarding such modifications.

(1-1) When a Plurality of Label Producing Apparatuses is Connected in Series Via the Communication Cable While the above-described embodiment has been described in connection with an illustrative scenario in which the two label producing apparatuses 100 and 200 are provided, the present disclosure is not limited thereto. That is, three or more label producing apparatuses may be provided and connected in series via the cable 9.

The configuration of the label producing system of this exemplary modification will now be described with reference to FIGS. 11A and 11B.

Figure 11A:
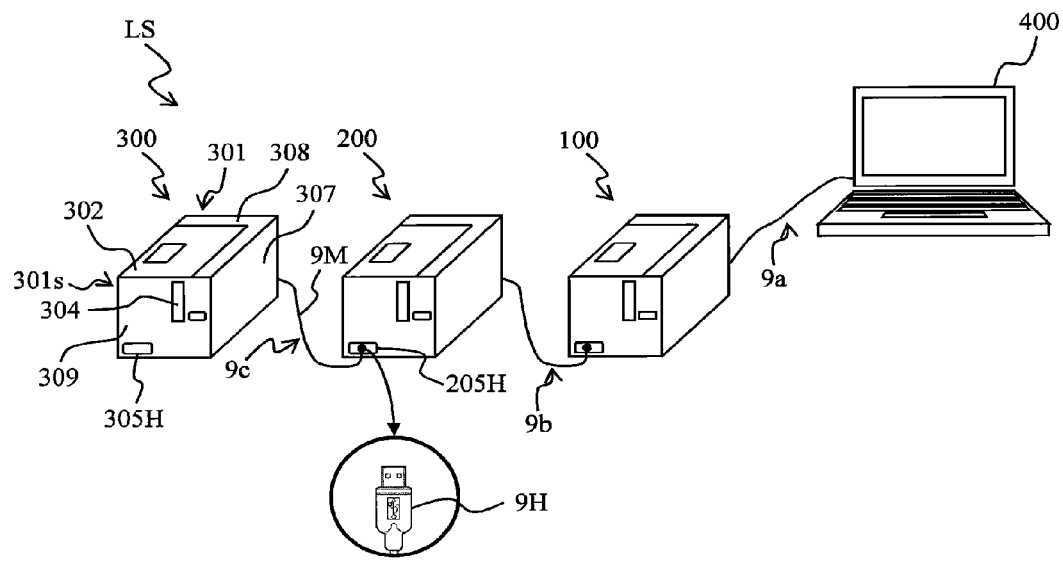
FIGS. 11A and 11B are system configuration diagram illustrating the label producing system of an exemplary modification wherein a plurality of label producing apparatuses is connected in series to one another via a communication cable.
Figure 11B:
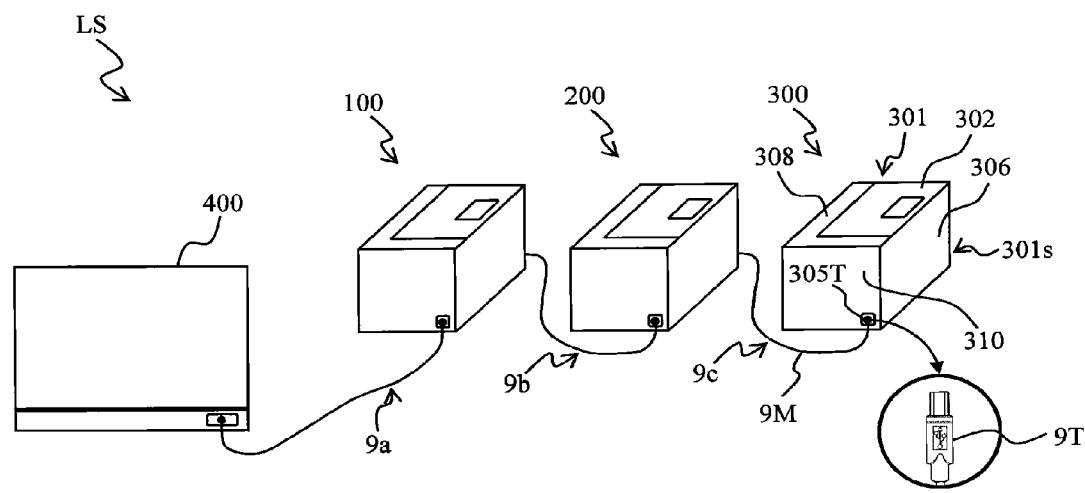

In FIG. 11A and FIG. 11B, the label producing system LS of this exemplary modification comprises the label producing apparatus 100, the label producing apparatus 200, a label producing apparatus 300, the operation terminal 400, and the plurality of communication cables 9 (three communication cables 9a, 9b, and 9c in this example).

The configurations of the label producing apparatus 100, the label producing apparatus 200, the operation terminal 400, and the communication cables 9a and 9b are the same as those in the aforementioned FIG. 1A and FIG. 1B, and descriptions thereof will be omitted.

The label producing apparatus 300 comprises an apparatus main body 301, and a housing 301s of an overall rectangular shape as an outer shell comprising an upper surface part 308, a lower surface part (not shown), a front surface part 309, a rear surface part 310, and both left and right side surface parts 306 and 307.

On the upper surface part 308 is provided an opening/closing lid 302 provided in a manner that enables opening and closing (or in a detachable manner).

On the front surface part 309 (refer to FIG. 11A) are provided a tape discharging exit 304 (similar to the aforementioned tape discharging exit 104), and a fourth host socket 305H that detachably mounts the first connector 9H of the communication cable 9.

On the rear surface part 310 (refer to FIG. 11B) is provided a third target socket 305T that detachably mounts the second connector 9T of the above-described communication cable 9.

The communication cable 9c has the same structure (uses the same articles) as the above-described communication cables 9a and 9b, and comprises the above-described first connector 9H, the above-described second connector 9T, and the above-described cable main body 9M (refer to each enlarged view in FIG. 11A and FIG. 11B). In this example, the communication cable 9c is designed so that the first connector 9H is mounted to the second host socket 205H of the above-described label producing apparatus 200, and the second connector 9T is mounted to the third target socket 305T of the above-described label producing apparatus 300. Thus, the functional relationship between the label producing apparatus 200 and the label producing apparatus 300 is one wherein the label producing apparatus 200 functions as the host device, and the label producing apparatus 300 functions as the target device.

All other components are the same as those of the label producing system LS of the above-described embodiment, and descriptions thereof will be omitted. Note that the functional components of the label producing apparatus 300 other than those shown in the above-described FIG. 11 are the same as those of the label-producing apparatus 200 (refer to the aforementioned FIG. 2 to FIG. 4), and descriptions thereof will be omitted.

Also note that another second label producing apparatus may be connected to the label producing apparatus 300 and another second label producing apparatus may be connected in series to the other second label producing apparatus via the communication cable 9, so that the devices are connected in series as follows: operation terminal 400→label producing apparatus 100→label producing apparatus 200→label producing apparatus 300→second label producing apparatus→second label producing apparatus→ . . . .

In the following, the control procedure for executing each operation performed by the operation terminal 400, the label producing apparatus 100, the label producing apparatus 200, and the label producing apparatus 300 of the exemplary modification will be described with reference to FIG. 12, FIG. 13, FIG. 14, and FIG. 15.

The control contents executed by the control circuit of the operation terminal 400 of this exemplary modification will now be described with reference to FIG. 12. Note that the steps identical to those in FIG. 7 are denoted using the same reference numerals, and descriptions thereof will be suitably omitted.

Figure 12:
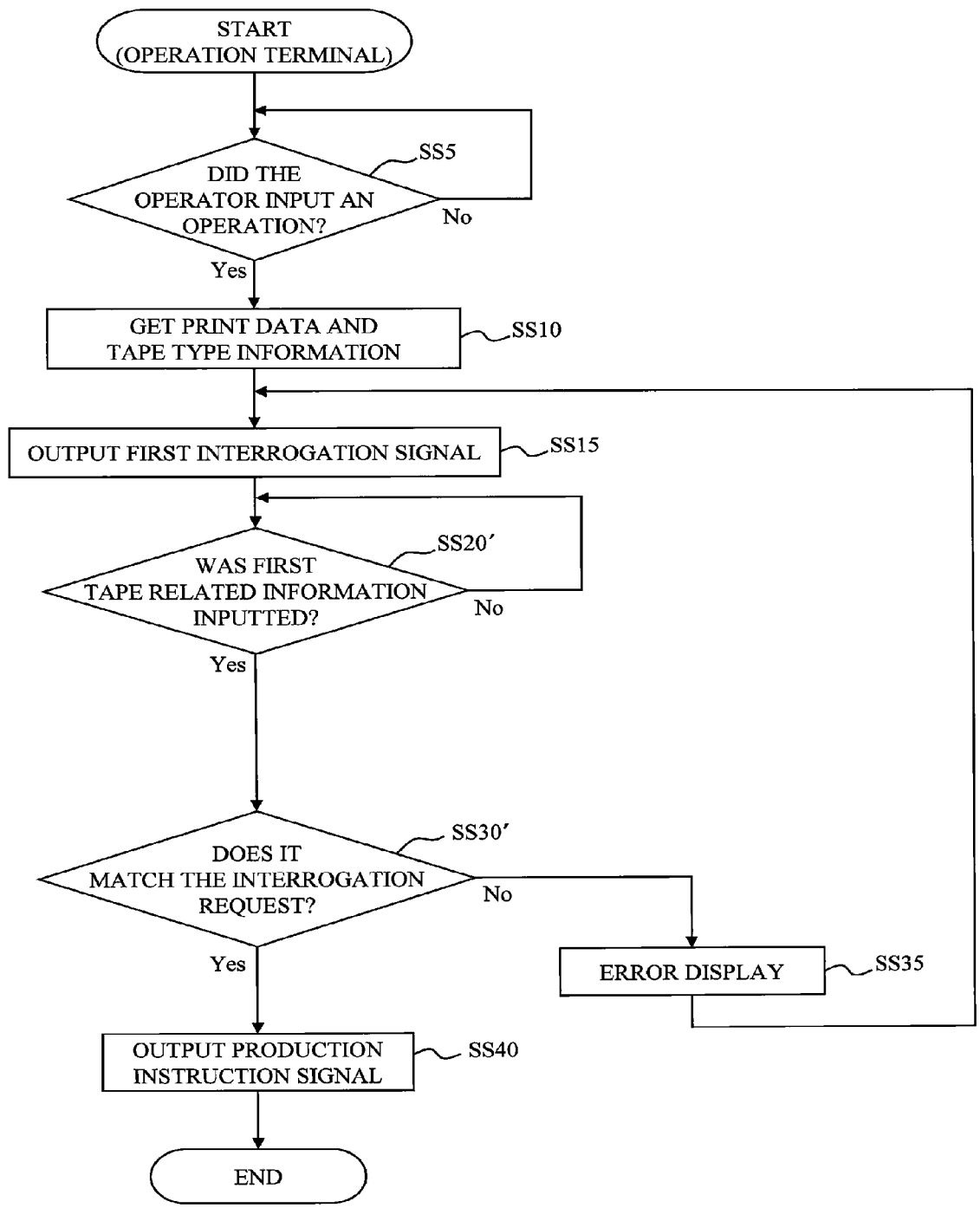
FIG. 12 is a flowchart illustrating the control contents executed by the control circuit of the operation terminal.

In FIG. 12, the differences from the aforementioned FIG. 7 are as follows: step SS20 and step SS30 are replaced with step SS20' and step SS30'.

That is, step SS5 to step SS15 are the same as those in the aforementioned FIG. 7 and, after the control circuit determines whether or not the print data and tape type have been inputted by the operator, acquires the inputted print data and tape type information, and outputs the above-described first interrogation signal to the label producing apparatus 100, the flow proceeds to step SS20' provided in place of step SS20.

Then, in step SS20', the control circuit determines whether or not the first tape related information (details described later) outputted from the label producing apparatus 100 in step SA40' or step SA50' of FIG. 13 described later was inputted via the communication cable 9a in accordance with the first interrogation signal outputted in the aforementioned step SS15. Until the first tape related information is inputted from the label producing apparatus 100, the condition is not satisfied and the control circuit enters a wait loop. Then, once the first tape related information is inputted from the label producing apparatus 100, the decision is made that the condition is satisfied and the flow proceeds to step SS30' provided in place of step SS30.

In step SS30', the control circuit determines whether or not either the type of the cover film 11 related to the label producing apparatus 100, the type of the cover film 11 related to the label producing apparatus 200, or the type of the cover film 11 provided to the cartridge 10 mounted to the cartridge holder 27 of the label producing apparatus 300 (hereinafter suitably omitted and referred to as the "type of the cover film 11 related to the label producing apparatus 300"; for example "tape width 18 mm") matches the tape type acquired in the aforementioned step SS10. If none of the types match, the decision is made that the condition is not satisfied and the flow proceeds to step SS35. If one of the types matches, the decision is made that the condition is satisfied and the flow proceeds to step SS40.

Step SS35 and step SS40 are the same as those in the aforementioned FIG. 7, and descriptions thereof will be omitted.

The control contents executed by the control circuit 40 of the label producing apparatus 100 in this exemplary modification will now be described with reference to FIG. 13. Note that the steps identical to those in FIG. 8 are denoted using the same reference numerals, and descriptions thereof will be suitably omitted.

Figure 13:
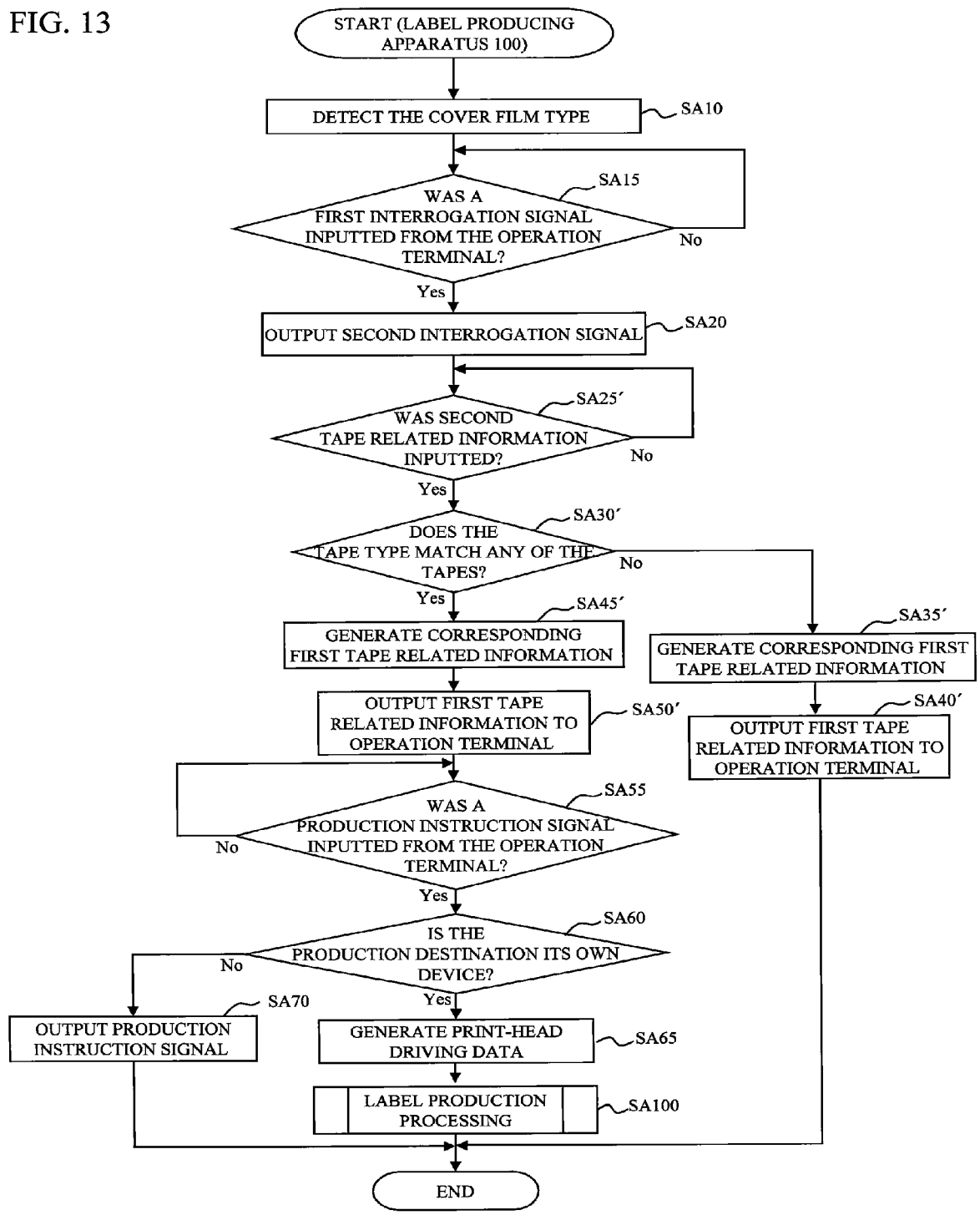
FIG. 13 is a flowchart illustrating the control contents executed by the control circuit of the label producing apparatus.

In FIG. 13, the differences from the aforementioned FIG. 8 are as follows: step SS25 to step SS50 are replaced with step SA25' to step SA50'.

That is, step SA10 to step SA20 are the same as those in the aforementioned FIG. 8. In step SA20, after the second interrogation signal is outputted to the label producing apparatus 200, the flow proceeds to step SA25' provided in place of step SA25.

In step SA25', the control circuit 40 determines whether or not the second tape related information (details described later) outputted from the label producing apparatus 200 in step SB30' or step SB40' of FIG. 14 described later was inputted via the communication cable 9b in accordance with the second interrogation signal outputted in the above-described step SA20. Until the second tape related information is inputted from the label producing apparatus 200, the condition is not satisfied and the control circuit 40 enters a wait loop. Then, once the second tape related information is inputted from the label producing apparatus 200, the decision is made that the condition is satisfied and the flow proceeds to step SA30' provided in place of step SA30.

In step SA30', the control circuit 40 determines whether or not the detection result (including information related to the type of the cover film 11 of the label producing apparatus 100) of the cartridge sensor 37 acquired in the aforementioned step SA10, or the second tape related information (the detection result of each of the cartridge sensors 37 of the label producing apparatuses 200 and 300, i.e., including information related to the type of each of the cover films 11 of the label producing apparatuses 200 and 300) inputted in the above-described step SA25' matches the tape type specified by the first interrogation signal inputted in the aforementioned step SA15. If none of the types matches, the decision is made that the condition is not satisfied and the flow proceeds to step SA35' provided in place of step SA35.

In step SA35', the control circuit 40 generates corresponding first tape related information in accordance with the determination result of the above-described step SA30' (in accordance with the second tape related information and the detection result of the cartridge sensor 37 of the label producing apparatus 100). The first tape related information includes information indicating that the tape type specified by the above-described first interrogation signal does not match any of the types of the cover films 11 of the above-described label producing apparatuses 100, 200, and 300 (or information indicating the types of the above-described cover films 11 that do not match).

Then, in step SA40' provided in place of step SA40, the control circuit 40 outputs the first tape related information generated in the above-described step SA35' (such as "No match. The current tape width of the label producing apparatus 100 is 36 mm, a cartridge is currently not mounted to the label producing apparatus 200, and the current tape width of the label producing apparatus 300 is 18 mm.") to the operation terminal 400 via the communication cable 9a. This process then terminates here.

On the other hand, in a case where, in the above-described step SA30', the tape type specified by the first interrogation signal inputted in the aforementioned step SA15 matches either the detection result of the cartridge sensor 37 acquired in the aforementioned step SA10 or the second tape related information inputted in the above-described step SA25', the decision is made that the condition of step SA30' is satisfied and the flow proceeds to step SA45' provided in place of step SA45.

In step SA45', the control circuit 40 generates the corresponding first tape related information in accordance with the determination result of the above-described step SA30'. The first tape related information includes information indicating that the tape type specified by the above-described first interrogation signal matches one of the types of the cover films 11 of the above-described label producing apparatuses 100, 200, and 300 (or information indicating the type of the above-described cover film 11 that matches).

Subsequently, in step SA50' provided in place of step SA50, the control circuit 40 outputs the first tape related information generated in the above-described step SA45' (such as "Match. The current tape width of the label producing apparatus 100 is 36 mm, the current tape width of the label producing apparatus 200 is 24, and the current tape width of the label producing apparatus 300 is 18 mm.") to the operation terminal 400 via the communication cable 9a.

The subsequent step SA55 to step SA70 and step SA100 are the same as those in the aforementioned FIG. 8, and descriptions thereof will be omitted.

The control contents executed by the control circuit 40 of the label producing apparatus 200 in this exemplary modification will now be described with reference to FIG. 14. Note that the procedures identical to those in FIG. 10 are denoted using the same reference numerals, and descriptions thereof will be omitted.

Figure 14:
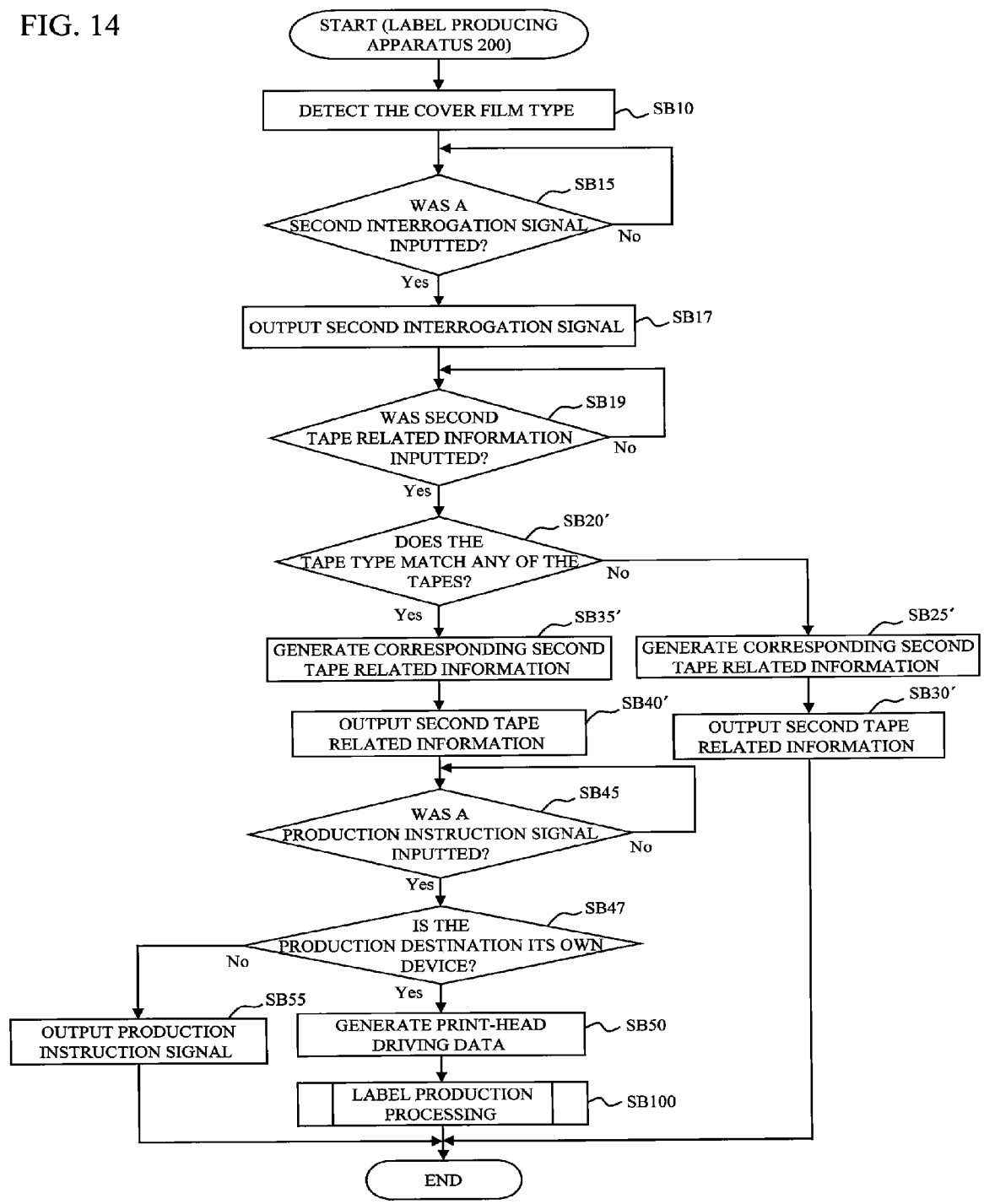
FIG. 14 is a flowchart illustrating the control contents executed by the control circuit of the label producing apparatus.

In FIG. 14, the differences from the aforementioned FIG. 10 are as follows: step SB20' to step SB40' are provided in place of step SB20 to step SB40, step SB17 and step SB19 are newly provided between step SB15 and step SB20' provided in place of step SB20, step SB47 is newly provided between step SB45 and step SB50, and step SB55 is newly provided.

That is, step SB10 and step SB15 are the same as those in the aforementioned FIG. 10. In step SB15, after the second interrogation signal is inputted from the label producing apparatus 100, the flow proceeds to the newly provided step SB17.

In step SB17, the control circuit 40 generates the above-described second interrogation signal, and outputs the second interrogation signal thus generated to the label producing apparatus 300 via the communication cable 9c.

Then, in the newly provided step SB19, the control circuit 40 determines whether or not the second tape related information (details described later) outputted from the label producing apparatus 300 in step SC30 or step SC40 of FIG. 15 described later was inputted via the communication cable 9c in accordance with the second interrogation signal outputted in the above-described step SB17. Until the second tape related information is inputted from the label producing apparatus 300, the condition is not satisfied and the control circuit 40 enters a wait loop. Then, once the second tape related information is inputted from the label producing apparatus 300, the decision is made that the condition is satisfied and the flow proceeds to step SB20' provided in place of step SB20.

In step SB20', the control circuit 40 determines whether or not the detection result (including information related to the type of the cover film 11 of the label producing apparatus 200) of the cartridge sensor 37 acquired in the aforementioned step SB10, or the second tape related information (the detection result of the cartridge sensor 37 of the label producing apparatus 300, i.e., including information related to the type of the cover film 11 of the label producing apparatus 300) matches the tape type specified by the second interrogation signal inputted in the above-described step SB15. If neither of the types matches, the decision is made that the condition is not satisfied and the flow proceeds to step SB25' provided in place of step SB25.

In step SB25', the control circuit 40 generates new second tape related information in accordance with the determination result of the above-described step SB20' (in accordance with the second tape related information inputted from the label producing apparatus 300 and the detection result of the cartridge sensor 37 of the label producing apparatus 200). The new second tape related information includes information indicating that the tape type specified by the second interrogation signal inputted in the above-described step SB15 does not match either of the types of the cover films 11 of the above-described label producing apparatuses 200 and 300 (or information indicating the types of the above-described cover films 11 that do not match).

Subsequently, in step SB30' provided in place of step SB30, the control circuit 40 outputs the new second tape related information (such as "No match. A cartridge is currently not mounted in the label producing apparatus 200, and the current tape width of the label producing apparatus 300 is 18 mm.") generated in the above-described step SB25' to the label producing apparatus 100 via the communication cable 9b. This process then terminates here.

On the other hand, in a case where the tape type specified by the second interrogation signal inputted in the above-described step SB15 matches either the detection result of the cartridge sensor 37 acquired in the aforementioned step SB10 or the second tape related information inputted in the above-described step SB19, the decision is made that the condition of step SB20' is satisfied and the flow proceeds to step SB35' provided in place of step SB35.

In step SB35', the control circuit 40 generates new second tape related information in accordance with the determination result of the above-described step SB20'. The new second tape related information includes information indicating that the tape type specified by the second interrogation signal inputted in the above-described step SB15 matches one of the types of the cover films 11 of the above-described label producing apparatuses 200 and 300 (or information indicating the type of the above-described cover film 11 that matches).

Then, in the step SB40' provided in place of step SB40, the control circuit 40 outputs the new second tape related information (such as "Match. The current tape width of the label producing apparatus 200 is 24 mm, and the current tape width of the label producing apparatus 300 is 18 mm.") generated in the above-described step SB35' to the label producing apparatus 100 via the communication cable 9b.

The subsequent step SB45 is the same as that in the aforementioned FIG. 10 and, after the control circuit 40 determines whether or not the production instruction signal outputted from the label producing apparatus 100 was inputted and inputs the production instruction signal from the label producing apparatus 100, the decision is made that the condition is satisfied and the flow proceeds to the newly provided step SB47.

In step SB47, the control circuit 40 determines whether or not the production destination of the print label L is its own device, i.e., the label producing apparatus 200, based on the information on the above-described production destination included in the production instruction signal inputted in the above-described step SB45. If the production destination is the label producing apparatus 200, the decision is made that the condition is satisfied, and the flow proceeds to step SB50.

Step SB50 and step SB100 are the same as those in the aforementioned FIG. 10, and descriptions thereof will be omitted.

On the other hand, in a case where the production destination of the print label L is not the label producing apparatus 200 in the above-described step SB47, the decision is made that the condition of step SB47 is not satisfied and the flow proceeds to the newly provided step SB55.

In step SB55, the control circuit 40 outputs the above-described production instruction signal to the label producing apparatus 300 via the communication cable 9c. This process then terminates here.

The control contents executed by the control circuit 40 of the label producing apparatus 300 in this exemplary modification will now be described with reference to FIG. 15.

Figure 15:
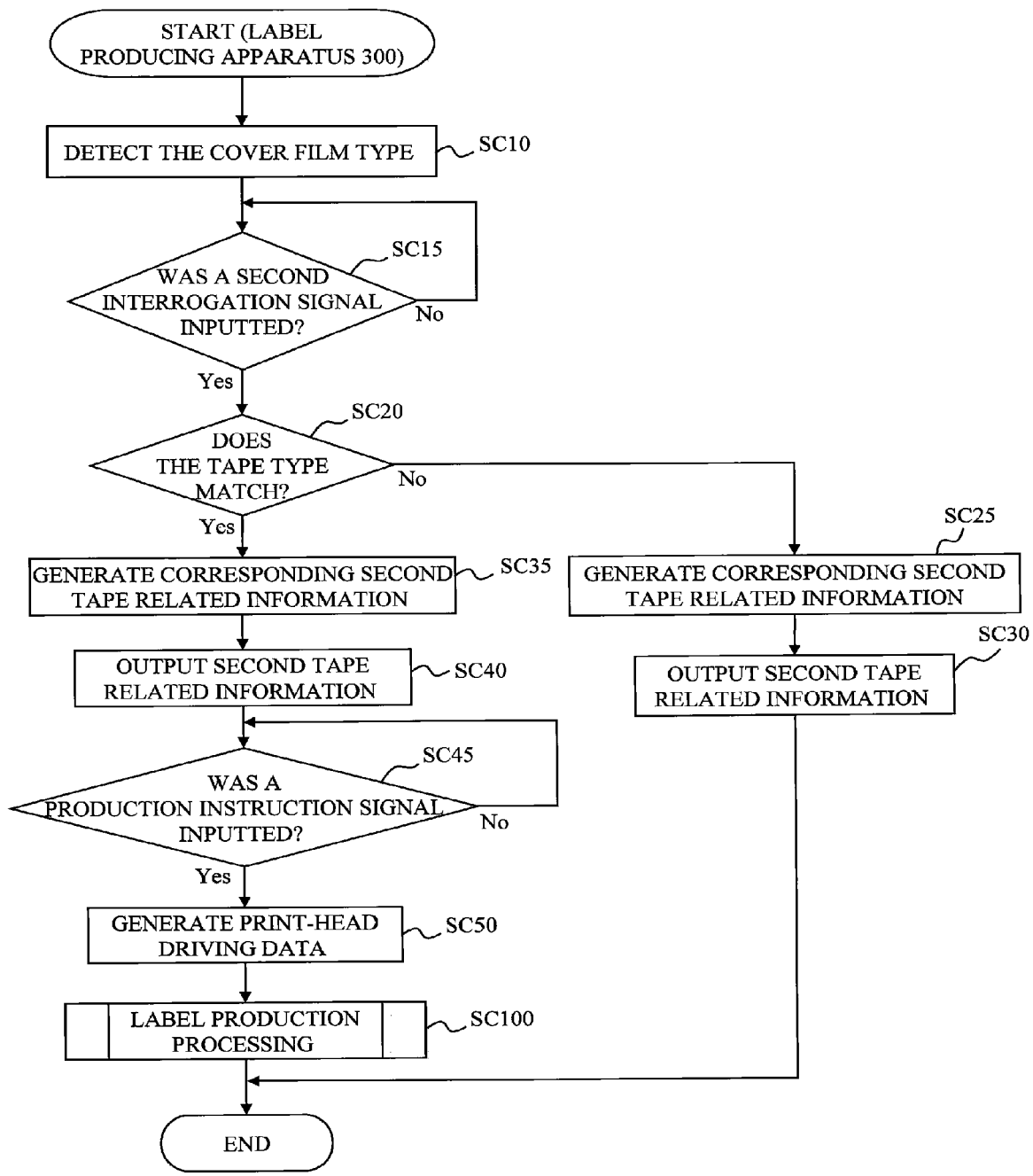
FIG. 15 is a flowchart illustrating the control contents executed by the control circuit of the label producing apparatus.

In FIG. 15, the flow is started ("START" position) when the operator turns ON the power of the label producing apparatus 300, for example.

First, in step SC10, the control circuit 40 outputs a control signal to the cartridge sensor 37 of the label producing apparatus 300, causing the cartridge sensor 37 to detect the type of the cartridge 10 mounted to the above-described cartridge holder 27 and store the detection result (in a case where the cartridge 10 is not mounted, that information) in the RAM 48, for example. Note that, similar to the above, the detection result of the cartridge sensor 37 may be continually inputted and then stored in the RAM 48 based on this timing.

Then, in step SC15, the control circuit 40 determines whether or not the second interrogation signal outputted from the label producing apparatus 200 in step SB17 of the above-described FIG. 14 was inputted via the communication cable 9c. Until the second interrogation signal is inputted from the label producing apparatus 200, the condition is not satisfied and the control circuit 40 enters a wait loop. Then, once the second interrogation signal is inputted from the label producing apparatus 200, the decision is made that the condition is satisfied and the flow proceeds to step SC20.

In step SC20, the control circuit 40 determines whether or not the detection result (including the information related to the type of the cover film 11 of the label producing apparatus 300) of the cartridge sensor 37 acquired in the above-described step SC10 matches the tape type specified by the second interrogation signal inputted in the above-described step SC15. In a case where the two do not match, the decision is made that the condition is not satisfied and the flow proceeds to step SC25.

In step SC25, the control circuit 40 generates corresponding second tape related information in accordance with the determination result of the above-described step SC20 (in accordance with the detection result of the cartridge sensor 37 of the label producing apparatus 300). The second tape related information includes information indicating that the tape type specified by the above-described second interrogation signal does not match the type of the cover film 11 related to the label producing apparatus 300 (or information indicating the type of the cover film 11 that does not match).

Subsequently, in step SC30, the second tape related information (such as "No match. The current tape width is 18 mm.") generated in the above-described step SC25 is outputted to the label producing apparatus 200 via the communication cable 9c. This process then terminates here.

On the other hand, in a case where, in the above-described step SC20, the tape type specified by the second interrogation signal inputted in the above-described step SC15 matches the detection result of the cartridge sensor 37 acquired in the above-described step SC10, the decision is made that the condition of step SC20 is satisfied and the flow proceeds to step SC35.

In step SC35, the control circuit 40 generates the corresponding second tape related information in accordance with the determination result of the above-described step SC20. The second tape related information includes information indicating that the tape type specified by the above-described second interrogation signal matches the type of the cover film 11 related to the label producing apparatus 300 (or information indicating the type of the cover film 11 that matches).

Then, in step SC40, the second tape related information (such as "Match. The current tape width is 24 mm.") generated in the above-described step SC35 is outputted to the label producing apparatus 200 via the communication cable 9c.

Subsequently, in step SC45, the control circuit 40 determines whether or not the production instruction signal outputted from the label producing apparatus 200 in step SB55 of the above-described FIG. 14 was inputted via the communication cable 9c in accordance with the second tape related information outputted in the above-described step SC40. Until the production instruction signal is inputted from the label producing apparatus 200, the condition is not satisfied and the control circuit 40 enters a wait loop. Then, once the production instruction signal is inputted from the label producing apparatus 200, the decision is made that the condition is satisfied and the print data included in the production instruction signal are stored in the text memory 48A and the flow proceeds to step SC50.

In step SC50, the print data stored in the text memory 48A in the above-described step SC45 are read and subjected to predetermined conversion, for example, to generate the dot pattern data (=print-head driving data) corresponding to the contents to be printed on the cover film 11. Then, the dot pattern data are stored in the print buffer 48B.

Then, in step SC100, the control circuit 40 executes the label production process (for the detailed procedure, refer to the aforementioned FIG. 9) for producing the print label L on which desired printing has been performed. This process then terminates here.

Note that a new second label producing apparatus may be further connected to the label producing apparatus 300 via the communication cable 9 as well. In such a case, the label producing apparatus 300 generates new second tape related information in accordance with the second tape related information outputted from the new second label producing apparatus and inputted via the communication cable 9, and the detection result of its own cartridge sensor 37. Then, the new second tape related information thus generated is outputted to the above-described label producing apparatus 200 via the above-described cable 9c.

As described above, in the label producing system LS of this exemplary modification, the two label producing apparatuses 200 and 300 are connected in series via the communication cable 9c. To connect the two label producing apparatuses 200 and 300 to each other, the first connector 9H of the communication cable 9c is connected to the second host socket 205H of the label producing apparatus 200, and the second connector 9T of the communication cable 9c is connected to the third target socket 305T of the label producing apparatus 200. With this arrangement, the label producing apparatus 200 functions as a host device, and the label producing apparatus 300 functions as a target device. As a result, it is possible to reliably realize a system configuration wherein the label producing apparatus 100 and the two label producing apparatuses 200 and 300 are connected in series via the communication cable 9 in the order of the operation terminal 400, the label producing apparatus 100, the label producing apparatus 200, and the label producing apparatus 300.

In a case such as described above, the second tape related information corresponding to the detection result of the cartridge sensor 37 of the label producing apparatus 300 is outputted to the label producing apparatus 200 via the communication cable 9c (refer to step SC30 and step SC40 of FIG. 15). In the label producing apparatus 200, the new second tape related information is generated based on the above-described second tape related information (corresponding to the detection result of the cartridge sensor 37 of the label producing apparatus 300) thus inputted and the detection result of its own cartridge sensor 37, and outputted to the label producing apparatus 100 (refer to step SB40' and step SB30' of FIG. 14). Thus, the plurality of label producing apparatuses 200 and 300 connected in the order of the label producing apparatus 200 and the label producing apparatus 300 via the communication cable 9c are eventually connected to the operation terminal 400 via the label producing apparatus 100 (the same holds true for a case where a plurality of second label producing apparatuses are newly connected in series via the communication cable 9 to the label producing apparatus 300).

As a result, substantially the same advantages as those of the above-described embodiment are achieved according to this exemplary modification as well. That is, with use of the consecutive aggregation method oriented toward the operation terminal 400 as described above, the operation terminal 400 needs to only recognize the label producing apparatus 100 and not the other individual label producing apparatuses (the two label producing apparatuses 200 and 300 in this example). Further, the operation terminal 400 only needs to acquire the information transmitted from the label producing apparatus 100 and not directly acquire the information from the other label producing apparatuses 200 and 300. Further, the operator does not need to be individually aware of, select, or operate the plurality of label producing apparatuses 100, 200, and 300 using the operation terminal 400 or be aware of the number of label producing apparatuses 100, 200, and 300, but may simply perform operations such as label production instruction operations using only the single label producing apparatus 100 that appears on the display part 401 of the operation terminal 400. Similar to the above, for example, even if the cartridge 10 that includes the cover film 11 that matches the form desired by the operator is mounted to the label producing apparatus 200 or the label producing apparatus 300, the operator simply performs operations on the one label producing apparatus 100 displayed on the display part 401. The operations performed automatically produce the print label L of the form corresponding to the operator's intentions on the label producing apparatus 200 or the label producing apparatus 300 as described above.

Thus, similar to the above-described embodiment, when the operator wants to suitably use the three label producing apparatuses 100, 200, and 300 to produce labels of an intended form, the operator can produce the desired print labels L by simply connecting the label producing apparatuses 100, 200, and 300 via simple connections of the communication cables 9a, 9b, and 9c. This makes it possible to simply and easily configure the system without use of a network that employs LAN cables or wireless LAN, enabling support of environments that have an intricately constructed network as well.

Further, similar to the label producing apparatus 100 of the above-described embodiment, the label producing apparatus 200 comprises the second host socket 205H on the front surface part 209 of the housing 201s, making it possible to simply and clearly execute connection on the front surface so that the label producing apparatus 200 functions as the host device and the other apparatus (the label producing apparatus 300 in this example) functions as the target device.

(1-2) When the Label Producing Apparatuses Perform Infrared Communication with Each Other While in the above information is transmitted and received between the first label producing apparatus and the second label producing apparatus via the communication cable 9, the present disclosure is not limited thereto. That is, information may be transmitted and received between the first label producing apparatus and the second label producing apparatus by infrared communication.

The configuration of the label producing system of this exemplary modification will now be described with reference to FIGS. 16A and 16B.

Figure 16A:
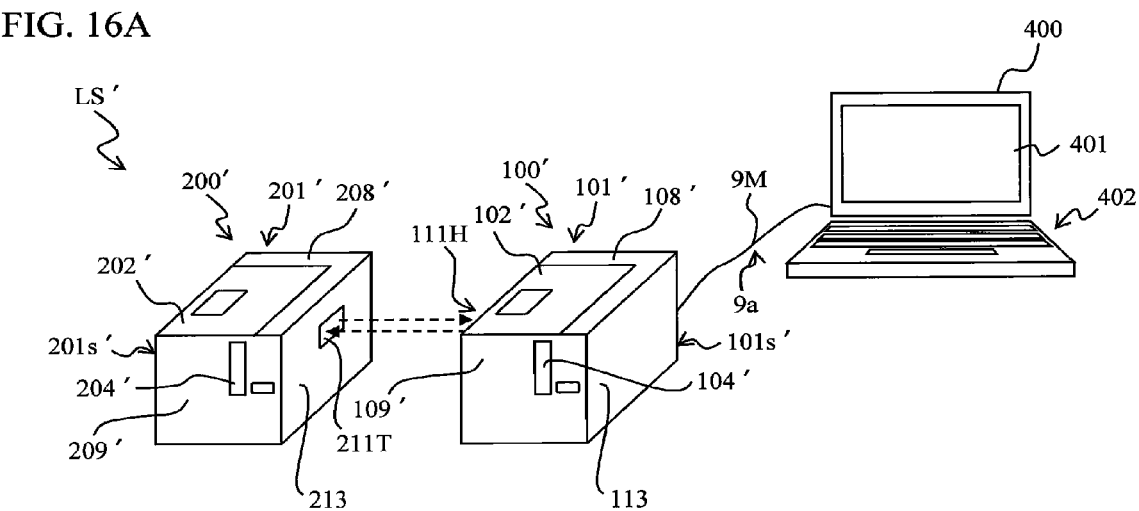
FIGS. 16A and 16B are system configuration diagram illustrating a label producing system of an exemplary modification wherein the label producing apparatuses perform infrared communication with one another.
Figure 16B:
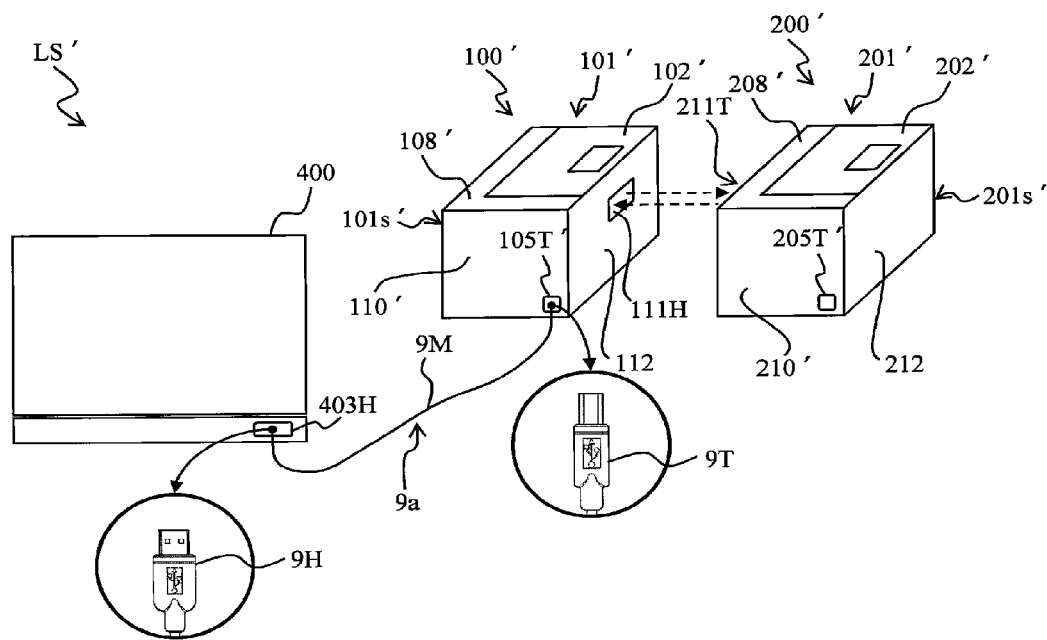

In FIG. 16A and FIG. 16B, a label producing system LS' of this exemplary modification comprises one label producing apparatus 100' and at least one (in this example, one) label producing apparatus 200' capable of producing a print label L (refer to FIG. 5) on which desired print has been printed, the operation terminal 400 for operating the above-described label producing apparatus 100', and the communication cable 9a.

The configurations of the operation terminal 400 and the communication cable 9a are the same as those in the aforementioned FIG. 1A and FIG. 1B, and descriptions thereof will be omitted.

The label producing apparatus 100' comprises an apparatus main body 101', and a housing 101s' of an overall rectangular shape as an outer shell comprising an upper surface part 108', a lower surface part (not shown), a front surface part 109', a rear surface part 109', and both left and right side surface parts 112 and 113.

On the upper surface part 108' is provided an opening/closing lid 102' provided in a manner that enables opening and closing (or in a detachable manner).

On the front surface part 109' (refer to FIG. 16A) is provided a tape discharging exit 104'. The tape discharging exit 104' discharges a produced label tape 23 with print (refer to FIG. 3).

On the rear surface part 110' (refer to FIG. 16B) is provided a fourth target socket 105T' that detachably mounts the second connector 9T of the above-described communication cable 9a.

On the left side surface part 112 (refer to FIG. 16B) is provided a first infrared communication part 111H configured to perform information transmission and reception for the functioning of the above-described label producing apparatus 200' as a host device, with a second infrared communication part 211T (described later) of the label producing apparatus 200' by infrared communication.

The label producing apparatus 200' comprises an apparatus main body 201', and a housing 201s' of an overall rectangular shape as an outer shell comprising an upper surface part 208', a lower surface part (not shown), a front surface part 209', a rear surface part 210', and both left and right side surface parts 212 and 213.

On the upper surface part 208' is provided an opening/closing lid 202' provided in a manner that enables opening and closing (or in a detachable manner).

On the front surface part 209' (refer to FIG. 16A) is provided a tape discharging exit 204' (similar to the above-described tape discharging exit 104').

On the rear surface part 210' (refer to FIG. 16B) is provided a fifth target socket 205T' (may be omitted) that detachably mounts the second connector 9T of the communication cable 9.

On the right side surface part 213 (refer to FIG. 16A) is provided a second infrared communication part 211T configured to perform information transmission and reception for the functioning of the above-described label producing apparatus 100' (or another label producing apparatus 200') as the target device, with the above-described infrared communication part 111H (or another label producing apparatus 200') by infrared communication.

In this example, the communication cable 9a is designed so that the second connector 9T is mounted to the fourth target socket 105T' of the above-described label producing apparatus 100', and the first connector 9H is mounted to the third host socket 403H of the aforementioned operation terminal 400. Thus, the functional relationship between the label producing apparatus 100' and the operation terminal 400 is one wherein the label producing apparatus 100' functions as the target device, and the operation terminal 400 functions as the host device.

The other components of the label producing apparatus 100' are the same as those in the aforementioned FIG. 2 and FIG. 3, and descriptions thereof will be omitted. Additionally, the other components of the label producing apparatus 200' are the same as those in the aforementioned FIG. 2 and FIG. 3, and descriptions thereof will be omitted.

The functional configuration of the label producing apparatus 100' of this exemplary modification will now be described with reference to FIG. 17. Note that parts similar to parts in FIG. 4 are denoted using the same reference numerals, and descriptions thereof will be suitably omitted.

Figure 17:
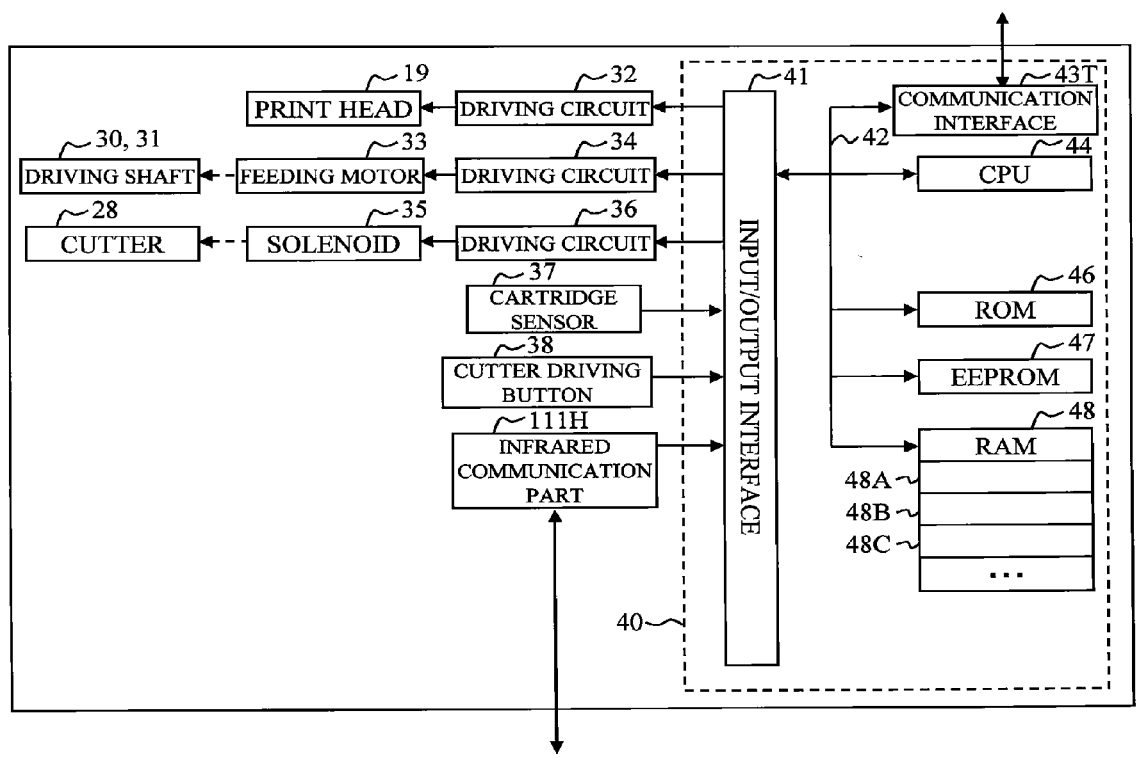
FIG. 17 is a flowchart illustrating the control contents executed by the control circuit of the operation terminal.

In FIG. 17, the differences from the aforementioned FIG. 4 are as follows: the above-described first infrared communication part 111H is connected to the aforementioned input/output interface 41, and the aforementioned communication I/F 43H is omitted. All other functional configurations are the same as those of the aforementioned FIG. 4, and descriptions thereof will be omitted.

The functional configuration of the label producing apparatus 200' is the same as that in the above-described FIG. 17 with the "first infrared communication part 111H" connected to the input/output interface 41 replaced with the "second infrared communication part 211T" (note that the communication I/F 43T may be omitted), and a description thereof will be omitted.

In the following, the control procedure for executing each operation performed by the operation terminal 400, the label producing apparatus 100', and the label producing apparatus 200' will be described with reference to FIG. 18, FIG. 19, and FIG. 20.

The control contents executed by the control circuit of the operation terminal 400 of this exemplary modification will now be described with reference to FIG. 18. Note that the procedures identical to those in FIG. 7 are denoted using the same reference numerals, and descriptions thereof will be omitted.

Figure 18:
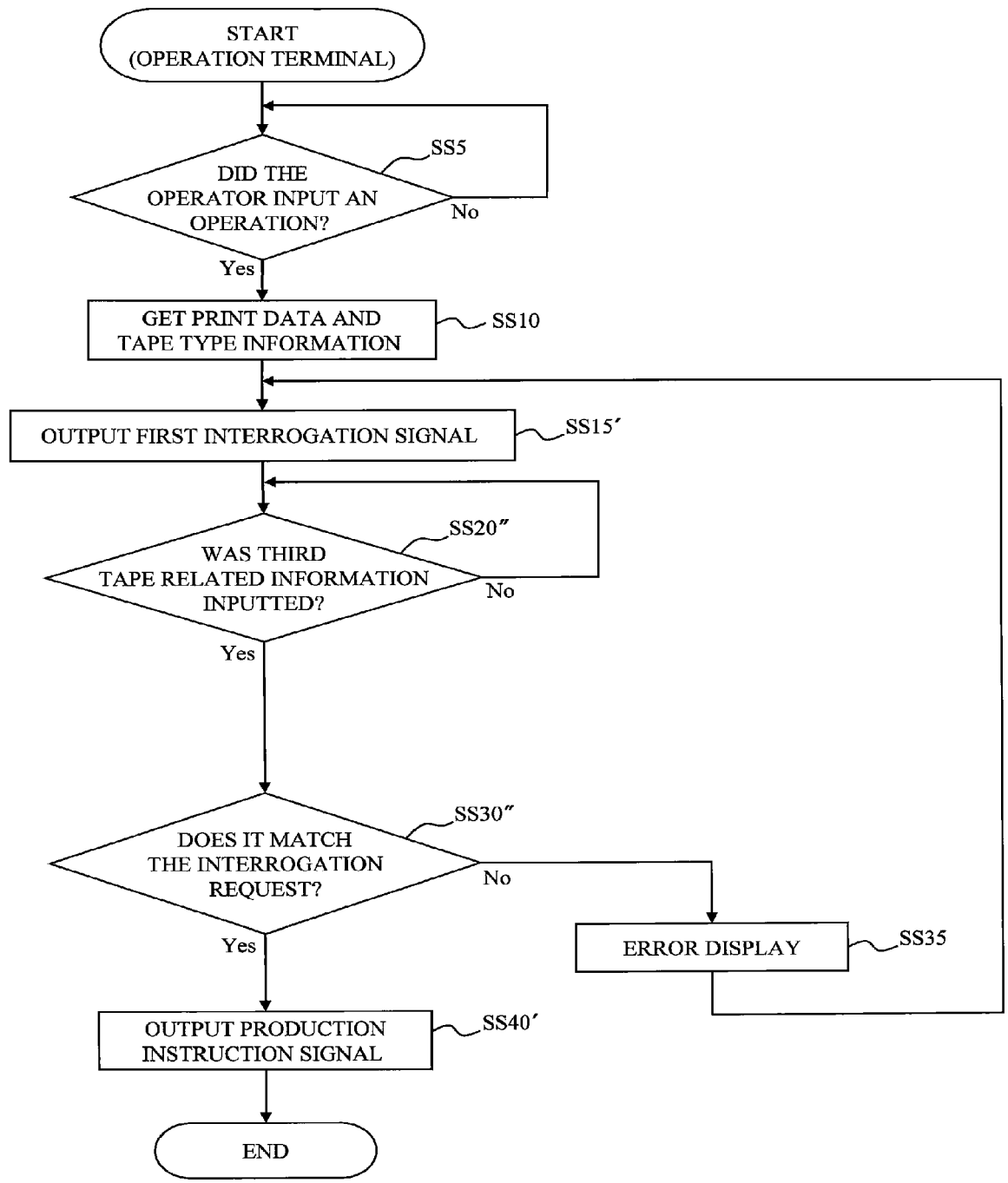
FIG. 18 is a functional block diagram illustrating the functional configuration of the label producing apparatus.

In FIG. 18, the differences from the aforementioned FIG. 7 are as follows: step SS15, step SS20, step SS30, and step SS40 are replaced with step SS15', step SS20", step SS30", and step SS40'.

That is, step SS5 and step S10 are the same as those in the aforementioned FIG. 7 and, after the control circuit determines whether or not the print data and tape type have been inputted by the operator and acquires the print data and tape type once that information is inputted, the flow proceeds to step SS15' provided in place of step SS15.

In step SS15', the control circuit generates the aforementioned first interrogation signal, and outputs the first interrogation signal thus generated to the label producing apparatus 100' via the communication cable 9a.

Then, in step SS20" provided in place of step SS20, the control circuit determines whether or not third tape related information (details described later) outputted from the label producing apparatus 100' in step SA40" or step SA50" of FIG. 19 described later was inputted via the communication cable 9a in accordance with the first interrogation signal outputted in the above-described step SS15'. Until the third tape related information is inputted from the label producing apparatus 100', the condition is not satisfied and the control circuit enters a wait loop. Then, once the third tape related information is inputted from the label producing apparatus 100', the decision is made that the condition is satisfied and the flow proceeds to step SS30" provided in place of step SS30.

In step SS30", the control circuit determines whether or not the type of the cover film 11 contained in the cartridge 10 mounted to the cartridge holder 27 of the label producing apparatus 100' (hereinafter suitably omitted and referred to as "the type of the cover film 11 related to the label producing apparatus 100'; for example, "tape width 36 mm") or the type of the cover film 11 contained in the cartridge 10 mounted to the cartridge holder 27 of the label producing apparatus 200' (hereinafter suitably omitted and referred to as the "type of the cover film 11 related to the label producing apparatus 200'; for example, "tape width 24 mm" or "cartridge not mounted") matches the tape type acquired in the aforementioned step SS10, based on the third tape related information inputted in the above-describe step SS20". In a case where neither of the two matches, the decision is made that the condition is not satisfied and the flow proceeds to step SS35.

Step SS35 is the same as that in the aforementioned FIG. 7, and a predetermined error display is displayed. Subsequently, the flow returns to the above-described step SS15', and the same procedure is repeated.

On the other hand, in a case where, in the above-described step SS30", either the type of the cover film 11 related to the label producing apparatus 100' or the type of the cover film 11 related to the label producing apparatus 200' matches the tape type acquired in the aforementioned step SS10, the decision is made that the condition of step SS30" is satisfied and the flow proceeds to step SS40' provided in place of step SS40.

In step SS40', the control circuit outputs the aforementioned production instruction signal based on the print data acquired in the aforementioned step SS10 and the third tape related information inputted in the above-described step SS20" to the label producing apparatus 100' via the communication cable 9a. This process then terminates here.

The control contents executed by the control circuit 40 of the label producing apparatus 100' in this exemplary modification will now be described with reference to FIG. 19. Note that the steps identical to those in FIG. 8 are denoted using the same reference numerals, and descriptions thereof will be suitably omitted.

Figure 19:
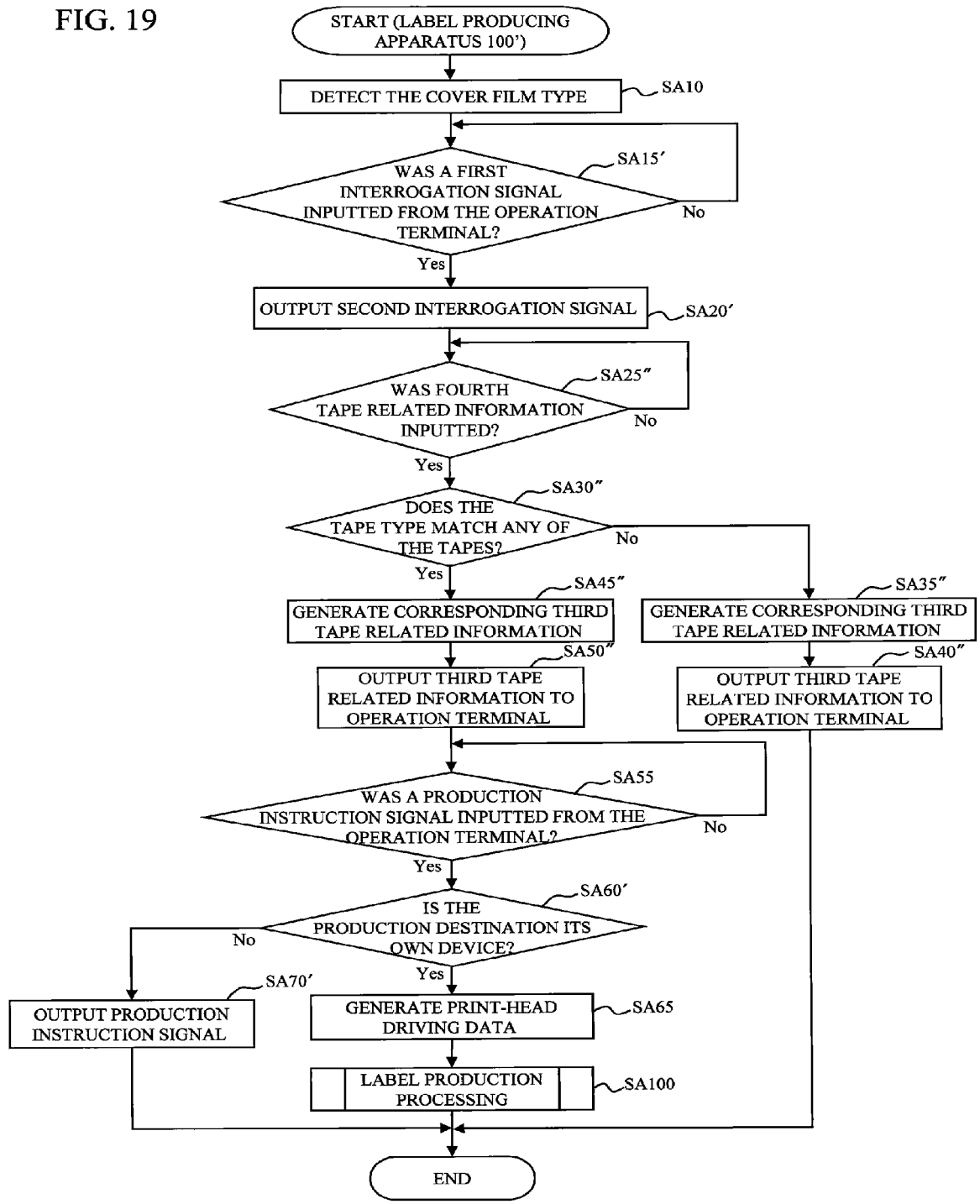
FIG. 19 is a flowchart illustrating the control contents executed by the control circuit of the label producing apparatus.

In FIG. 19, the differences from the aforementioned FIG. 8 are as follows: step SA15, step SA20, step SA25 to step SA50, step SA60, and step S70 are replaced with step SA15', step SA20', step SA25" to step SA50", step SA60', and step SA70'.

That is, step SA10 is the same as that in the aforementioned FIG. 8 and, after the type of cartridge 10 is detected, the flow proceeds to step SA15' provided in place of step SA15.

In step SA15', the control circuit 40 determines whether or not the above-described first interrogation signal outputted from the operation terminal 400 in step SS15' of the above-described FIG. 18 was inputted via the communication cable 9a. Until the first interrogation signal is inputted from the operation terminal 400, the condition is not satisfied and the control circuit 40 enters a wait loop. Then, once the first interrogation signal is inputted from the operation terminal 400, the decision is made that the condition is satisfied and the flow proceeds to step SA20' provided in place of step SA20.

In step SA20', the control circuit 40 generates the aforementioned second interrogation signal by infrared, and outputs the signal thus generated to the label producing apparatus 200' by infrared communication, via the above-described first infrared communication part 111H.

Subsequently, in step SS25" provided in place of step SA25, the control circuit 40 determines whether or not fourth tape related information (details described later) outputted from the label producing apparatus 200' in step SB30" or step SB40" of FIG. 20 described later was inputted by infrared communication via the above-described first infrared communication part 111H in accordance with the second interrogation signal outputted in the above-described step SA20'. Until the fourth tape related information is inputted from the label producing apparatus 200', the condition is not satisfied and the control circuit 40 enters a wait loop. Then, once the fourth tape related information is inputted from the label producing apparatus 200', the decision is made that the condition is satisfied and the flow proceeds to step SA30" provided in place of step SA30.

In step SB30", the control circuit 40 determines whether or not the detection result (including information related to the type of the cover film 11 related to the label producing apparatus 100') of the cartridge sensor 37 acquired in the aforementioned step SA10, or the fourth tape related information (the detection result of the cartridge sensor 37 of the label producing apparatus 200', i.e., including information related to the type of the cover film 11 related to the label producing apparatus 200') matches the tape type specified by the first interrogation signal inputted in the above-described step SA15'. If neither of the types matches, the decision is made that the condition is not satisfied and the flow proceeds to step SA35" provided in place of step SA35.

In step SA35", the control circuit 40 generates corresponding third tape related information in accordance with the determination result of the above-described step SA30" (in accordance with the fourth tape related information and the detection result of the cartridge sensor 37 of the label producing apparatus 100'). The third tape related information includes information indicating that the tape type specified by the above-described first interrogation signal does not match either of the types of the cover films 11 of the above-described label producing apparatuses 100' and 200' (or information indicating the types of the above-described cover films 11 that do not match).

Then, in step SA40" provided in place of step SA40, the control circuit 40 outputs the third tape related information generated in the above-described step SA35" (such as "No match. The current tape width of the label producing apparatus 100' is 36 mm, and a cartridge is currently not mounted to the label producing apparatus 200'.") to the operation terminal 400 via the communication cable 9a. This process then terminates here.

On the other hand, in a case where the tape type specified by the first interrogation signal inputted in the above-described step SA15' matches either the detection result of the cartridge sensor 37 acquired in the aforementioned step SA10 or the fourth tape related information inputted in the above-described step SA25", the decision is made that the condition of step SA30" is satisfied and the flow proceeds to step SA45" provided in place of step SA45.

In step SA45", the control circuit 40 generates the corresponding third tape related information in accordance with the determination result of the above-described step SA30". The third tape related information includes information indicating that the tape type specified by the above-described first interrogation signal matches one of the types of the cover films 11 related to the above-described label producing apparatuses 100' and 200' (or information indicating the type of the above-described cover film 11 that matches).

Subsequently, in step SA50" provided in place of step SA50, the control circuit 40 outputs the third tape related information generated in the above-described step SA45" (such as "Match. The current tape width of the label producing apparatus 100' is 36 mm, and the current tape width of the label producing apparatus 200' is 24 mm.") to the operation terminal 400 via the communication cable 9a.

The subsequent step SA55 is the same as that in the aforementioned FIG. 8 and, after the control circuit 40 determines whether or not the production instruction signal outputted from the operation terminal 400 has been inputted in accordance with the third tape related information outputted in the above-described step SA50" and the production instruction signal is inputted, the flow proceeds to step SA60' provided in place of step SA60.

In step SA60', the control circuit 40 determines whether or not the production destination of the print label L is its own device, i.e., the label producing apparatus 100', based on the information of the above-described production destination included in the production instruction signal inputted in the above-described step SA55. If the production destination is the label producing apparatus 100', the decision is made that the condition is satisfied, and the flow proceeds to step SA65.

Step SA65 and step SA100 are the same as those in the aforementioned FIG. 8, and descriptions thereof will be omitted.

On the other hand, in a case where the production destination of the print label L is not its own device, i.e., is not the label producing apparatus 100', in the above-described step SA60', the decision is made that the condition of step SA60' is not satisfied and the flow proceeds to step SA70' provided in place of step SA70.

In step SA70', the control circuit 40 outputs the above-described production instruction signal to the label producing apparatus 200' by infrared communication via the above-described first infrared communication part 111H. This process then terminates here.

The control contents executed by the control circuit 40 of the label producing apparatus 200' in this exemplary modification will now be described with reference to FIG. 20. Note that the steps identical to those in FIG. 10 are denoted using the same reference numerals, and descriptions thereof will be suitably omitted.

Figure 20:
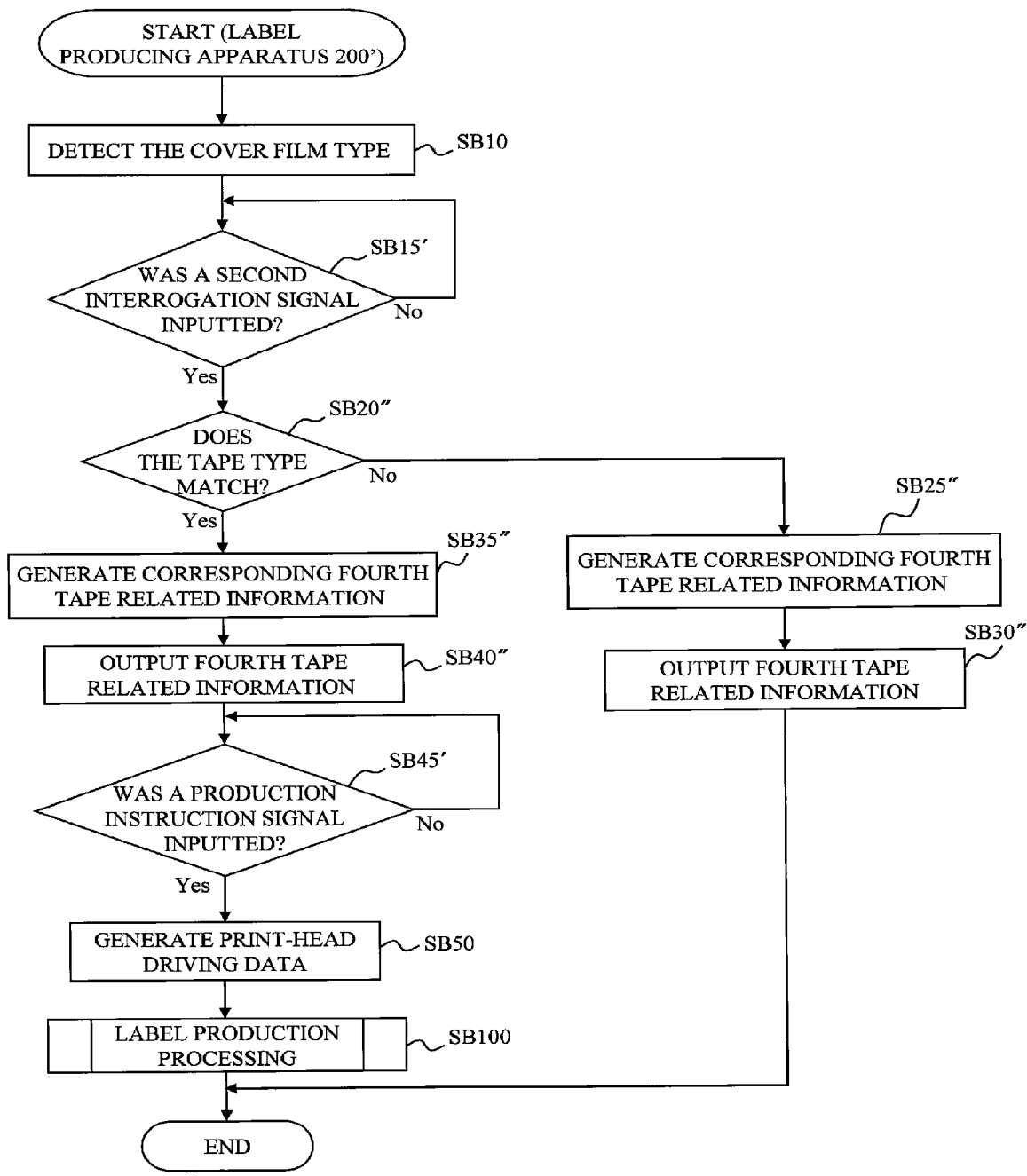
FIG. 20 is a flowchart illustrating the control contents executed by the control circuit of the label producing apparatus.

In FIG. 20, the differences from the aforementioned FIG. 10 are as follows: step SB15, step SB20 to step SB40, and step SB45 are replaced with step SB15', step SB20" to step SB40", and step SB45'.

That is, step SB10 is the same as that in the aforementioned FIG. 10 and, after the type of cartridge 10 is detected, the flow proceeds to step SB15' provided in place of step SB15.

In step SB15', the control circuit 40 determines whether or not the second interrogation signal based on infrared outputted from the label producing apparatus 100' in step SB20' of the above-described FIG. 19 has been inputted by infrared communication via the second infrared communication part 211T. Until the second interrogation signal is inputted from the label producing apparatus 100', the condition is not satisfied and the control circuit 40 enters a wait loop. Then, once the second interrogation signal is inputted from the label producing apparatus 100', the decision is made that the condition is satisfied and the flow proceeds to step SB20" provided in place of step SB20.

In step SB20", the control circuit 40 determines whether or not the detection result (including information related to the type of the cover film 11 related to the label producing apparatus 200') of the cartridge sensor 37 acquired in the aforementioned step SB10 matches the tape type specified by the second interrogation signal inputted in the above-described step SB15'. If the two do not match, the decision is made that the condition is not satisfied and the flow proceeds to step SB25" provided in place of step SB25.

In step SB25", the control circuit 40 generates corresponding fourth tape related information in accordance with the determination result of the above-described step SB20" (in accordance with the detection result of the cartridge sensor 37 of the label producing apparatus 200'). The fourth tape related information includes information indicating that the tape type specified by the above-described second interrogation signal does not match the type of the cover film 11 related to the above-described label producing apparatus 200' (or information indicating the type of the above-described cover film 11 that does not match).

Subsequently, in step SB30" provided in place of step SB30, the control circuit 40 converts the fourth tape related information (such as "No match. Currently a cartridge is not mounted.") generated in the above-described step SB25" to a form corresponding to infrared communication and then outputs the converted information to the label producing apparatus 100' by infrared communication via the second infrared communication part 211T. This process then terminates here.

On the other hand, in a case where, in the above-described step SB20", the tape type specified by the second interrogation signal inputted in the above-described step SB15' matches the detection result of the cartridge sensor 37 acquired in the aforementioned step SB10, the decision is made that the condition of step SB20" is satisfied and the flow proceeds to step SB35" provided in place of step SB35.

In step SB35", the control circuit 40 generates the corresponding fourth tape related information in accordance with the determination result of the above-described step SB20". The fourth tape related information includes information indicating that the tape type specified by the above-described second interrogation signal matches the type of the cover film 11 related to the above-described label producing apparatus 200' (or information indicating the type of the cover film 11 that matches).

Then, in step SB40" provided in place of step SB40, the control circuit 40 converts the fourth tape related information (such as "Match. The current tape width is 24 mm.") generated in the above-described step SB35" to a form corresponding to infrared communication, and outputs the information thus converted to the label producing apparatus 100' by infrared communication via the second infrared communication part 211T.

Subsequently, in step SB45' provided in place of step SB45, the control circuit 40 determines whether or not the production instruction signal based on the infrared outputted from the label producing apparatus 100' in step SA70' of the above-described FIG. 19 has been inputted by infrared communication via the second infrared communication part 211T in accordance with the fourth tape related information outputted in the above-described step SB40". Until the production instruction signal is inputted from the label producing apparatus 100', the condition is not satisfied and the control circuit 40 enters a wait loop. Then, once the production instruction signal is inputted from the label producing apparatus 100', the decision is made that the condition is satisfied and the print data included in the production instruction signal are stored in the text memory 48A and the flow proceeds to step SB50.

The subsequent step SB50 and step SB100 are the same as those in the aforementioned FIG. 10, and descriptions thereof will be omitted.

Thus, as described above, in the label producing system LS' of this exemplary modification, the operation terminal 400 and the label producing apparatus 100' are connected by the communication cable 9a, and the label producing apparatus 100' and the label producing apparatus 200' are connected by infrared communication. In the label producing apparatus 200', the fourth tape related information is generated based on the detection result (including information on the type of the cover film 11 related to the label producing apparatus 200') of its own cartridge sensor 37 as described above. Then, the fourth tape related information is outputted to the label producing apparatus 100' by infrared communication via the second infrared communication part 211T (refer to step SB30" and step SB40" of FIG. 20). In the label producing apparatus 100', the fourth tape related information outputted from the above-described label producing apparatus 200' is outputted by infrared communication via the first infrared communication part 111H. Then, the third tape related information is generated in accordance with the fourth tape related information and the detection result (including information on the type of the cover film 11 related to the label producing apparatus 100') of its own cartridge sensor 37, and the third tape related information is outputted to the operation terminal 400 via the communication cable 9a (refer to step SA40" and step SA50" of FIG. 19).

With the plurality of the label producing apparatuses 100' and 200' connected in the order of the operation terminal 400, the label producing apparatus 100', and the label producing apparatus 200' via the communication cable 9a and infrared communication, the operation terminal 400 is capable of (eventually) aggregating the types of the cover films 11 of the label producing apparatuses 100' and 200'. With this arrangement, similar to the above-described embodiment and exemplary modification (1), when the operator wants to suitably use a plurality (two in the above-described example) of the label producing apparatuses 100' and 200' to produce intended labels, the operator can execute the desired label production by simply connecting only the required plurality of label producing apparatuses 100' and 200' that need to be connected via simple cable connection and infrared communication connection.

This exemplary modification can also provide similar advantages to those of the above-described embodiment and exemplary modification (1). Further, with the communication between the label producing apparatuses 100 and 200 performed by infrared communication, the work of connecting the apparatuses using communication cables is no longer required. As a result, operator convenience is further improved.

Further, at this time, the label producing apparatus 100' comprises the first infrared communication part 111H on the left side surface part 112 of the housing 101s', and the label producing apparatus 200' comprises the second infrared communication part 211T on the right side surface part 213 of the housing 201s'. With this arrangement, as shown in FIG. 16, it is possible to align the front-back orientation of the label producing apparatus 100' and the label producing apparatus 200' that transmit and receive information between each other by infrared communication and arrange the apparatuses side by side (that is, align both label producing apparatuses so that they are facing forward).

Note that, in this exemplary modification, the above-described label producing apparatus 200' may perform infrared communication with another label producing apparatus via the second infrared communication part 211T. In this case, the label producing apparatus 200' outputs the above-described fourth tape related information to the other fourth label producing apparatus via the second infrared communication part 211T in step SB30" and step SB40" of the above-described FIG. 20.

The following describes the second embodiment of the present disclosure with reference to accompanying drawings. In this embodiment, the above-described label producing apparatus 100 has a function that determines whether or not the connection to the connected target device is suitable when the label producing apparatus 100 is used as a printer with a USB host function.

The system configuration of a print label producing system LS" that includes the label producing apparatus 100 according to this embodiment will now be described with reference to FIG. 21.

In FIGS. 1A and 1B, the print label producing system LS" comprises the label producing apparatus 100 connected to the first connector 9H (described later) of the above-described communication cable 9 (hereinafter referred to as USB cable 9) comprising a USB cable, and a target device 500 (a barcode reader in this example; hereinafter suitably referred to as "barcode reader 500") connectable to the second connector 9T (described later) of the above-described USB cable 9.

The label producing apparatus 100 comprises the housing 101s of an overall rectangular shape as an outer shell of the apparatus main body 101, and the opening and closing lid 102 provided in a manner that enables opening and closing (or in a detachable manner) to the upper surface part of the housing 101s.

On the front surface part 109 are provided an LED (Light Emitting Diode) 103, the tape discharging exit 104, the first socket 105H configured to detachably mount the first connector 9H (described later) of the above-described USB cable 9, and the cutter driving button 38.

The LED 103 is provided in the vicinity of the above-described first socket 105H of the housing 101s (on the upper part of the first socket 105H in this example), and performs illumination notifications in predetermined forms [for example, on (green), flickering (green), flickering (red), etc.; details described later].

The tape discharging exit 104 discharges the label tape 23 with print (refer to FIG. 3 described above) produced within the housing 101s to outside the housing 101s.

The cutter driving button 38 is for driving the cutter 28 (refer to FIG. 3 described above) disposed in a predetermined position within the housing 101s based on a manual operation of the operator.

The barcode reader 500 comprises a second socket 505 configured to detachably mount the second connector 9T (described later) of the above-described USB cable 9, and optically performs information reading from a plurality of barcodes BC provided on a print sampler 600. On the print sampler 600 are displayed information such as characters and typeface, for example, and the corresponding barcodes BC. The information read by the barcode reader 500 is outputted to the label producing apparatus 100 via the above-described USB cable 9.

Figure 21:
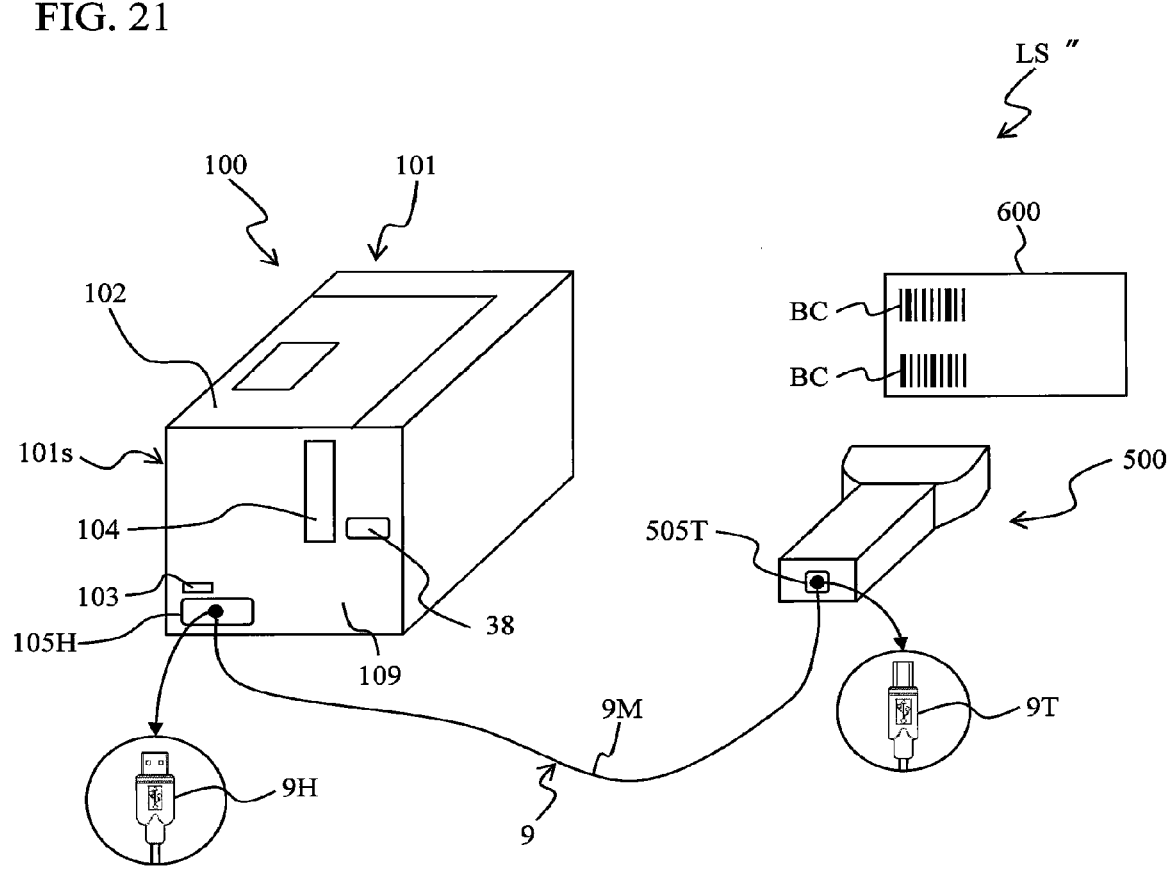
FIG. 21 is a system configuration diagram illustrating a print label producing system that includes a label producing apparatus according to embodiment 2 of the present disclosure.

The USB cable 9 comprises the first connector 9H (a USB connector that is a so-called series A plug) for connecting the label producing apparatus 100 as a host, the second connector 9T (a USB connector that is a so-called series B plug) for connecting an arbitrary target device (the barcode reader 500 in this example) as a target, and the cable main body 9M disposed between the first connector 9H and the second connector 9T, shown in an enlarged figure in the FIG. 21.

Then, the first connector 9H of the USB cable 9 is mounted (connected) to the first socket 105H of the label producing apparatus 100, and the second connector 9T of the above-described USB cable 9 is mounted to the second socket 205T of the barcode reader 500, thereby connecting the label producing apparatus 100 and the barcode reader 500 to each other in a manner that enables information transmission and reception.

Note that the above-described USB cable 9 may be integrated with the target device (the barcode reader 500 in this example). In such a case, the second socket 205T is omitted from the barcode reader 500, the second connector 9T is omitted from the USB cable 9, the USB cable 9 is integrated with the barcode reader 500, and the first connector 9H provided at the end of the USB cable 9 is detachably installable to the first socket 105H of the label producing apparatus 100. Conversely, the USB cable 9 may be designed so that it is integrated with the label producing apparatus 100. In such a case, the first socket 105H is omitted from the label producing apparatus 100, the first connector 9H is omitted from the USB cable 9, the USB cable 9 is integrated with the label producing apparatus 100, and the second connector 9T provided at the end of the USB cable 9 is detachably installable to the second socket 205T of the barcode reader 500. In either case, the USB cable 9 connects the label producing apparatus 100 as a host and the barcode reader 500 as a target.

As a feature of this embodiment, the target device connectable via the USB cable 9 to the label producing apparatus 100 is not limited to the barcode reader 500, allowing connection to various target devices (a different type of barcode reader, mouse, keyboard, etc.). (Note, however, that this does not necessarily mean that all target devices connected will be bootable, as described later.)

The configurations of the cartridge holder 27, the surrounding area thereof, and the cartridge 10 of this embodiment are the same as those in the aforementioned embodiment 1, and descriptions thereof will be omitted. Further, the functional configuration of the label producing apparatus 100 is also the same as that in FIG. 4 of the aforementioned embodiment 1, excluding the following point.

In this embodiment, driver software corresponding to specific types of the target device 500 (required for operating the specific types of the target device 500) is stored in advance in the aforementioned EEPROM 47. That is, specific types of the target device 500 for which the corresponding driver software is stored within the EEPROM 47 can be immediately operated (booted) by the host function of the label producing apparatus 100.

Further, a type information list 470 (refer to FIG. 23, etc., described later) that lists the type information (described later) of the specific types of the target device 500 for which the above-described driver software has been stored, i.e., the specific types of the target device 500 that are bootable by the label producing apparatus 100, is stored in advance in the EEPROM 47.

The input/output interface 41 is connected to the print-head driving circuit 32 for driving the above-described print head 19, the feeding motor driving circuit 34, the solenoid driving circuit 36, the above-described LED 103, and the above-described cutter driving button 38.

In the control system that has the control circuit 40 shown in the aforementioned FIG. 4 at its core, print data are stored in the text memory 48A when the print data are inputted from the specific types of the target device 500 (the target device 500 for which the driver software is already stored within the EEPROM 47) to the label producing apparatus 100 via the USB cable 9. Then, the stored print data are read once again and subjected to predetermined conversion by the converting function of the control circuit 40, thereby generating dot pattern data. These data are then stored in the print buffer 48B. The print head 19 is driven via the print-head driving circuit 32 and the above-described heat-emitting elements are selectively driven to emit heat in accordance with the print dots of one line, thereby printing the dot pattern data stored in the print buffer 48B. At the same time, the feeding motor 33 controls the feeding of the above-described cover film 11, etc., via the feeding motor driving circuit 34, eventually producing the print label L.

The type information of the target device 500 will now be described with reference to FIG. 22.

Figures 22, 23:
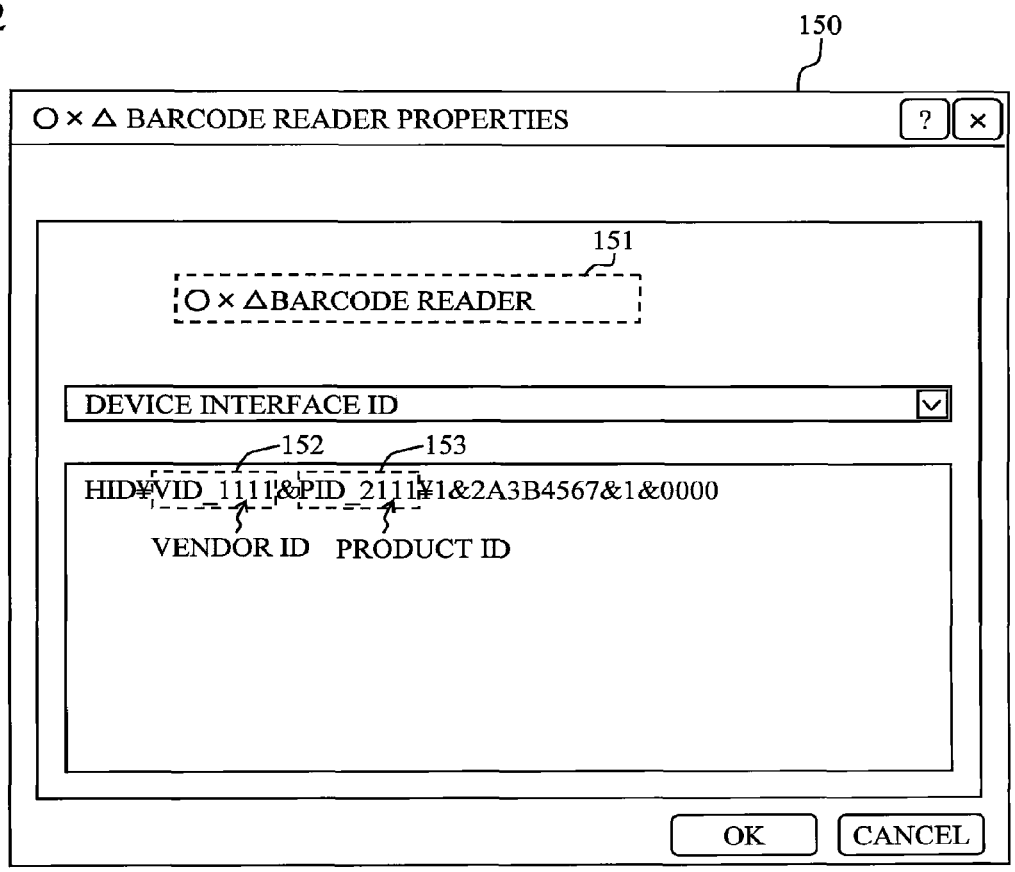
FIG. 22 is an explanatory diagram explaining the type information of the target device.
FIG. 23 is a table conceptually showing an example of a type information list stored in EEPROM.

FIG. 22 shows the above-described specific types of the target device 500 that is connected via the USB cable 9 to an operation terminal (not shown; a general-purpose personal computer that is generally commercially available, for example) wherein driver software corresponding to the target device 500 is already stored in this example, and an example of a properties screen 150 related to the above-described target device 500 displayed on a display part (not shown) of the operation terminal.

The properties screen 150 is provided with a name display area 151 for the target device 500, a vendor ID (VID) display area 152 for the target device 500, a property ID (PID) display area 153 for the target device 500, and the like.

The name of the target device 500 ("OxΔ barcode reader" in this example) is displayed in the above-described name display area 151.

The vendor ID related to the target device 500 ("1111" in this example) is displayed in the above-described VID display area 152. The vendor ID is identification information corresponding to a corporation or company.

The property ID related to the target device 500 ("2111" in this example) is displayed in the above-described PID display area 153. The property ID is identification information assigned so that a corporation or company having the above-described vendor ID does not have duplicate IDs for each of its products or models.

That is, the combination of the above-described vendor ID and property ID is unique for each target device 500. Once the vendor ID and property ID are known, it is possible to identify the target device 500 [the manufacturing company (corporation) and product (model) of the target device 500, etc.].

In this embodiment, the above-described vendor ID and product ID, which are identification information related to the target device 500, are used as the above-described type information of the target device 500. In the example shown in FIG. 22, the vendor ID and product ID of the target device 500 (OxΔ barcode reader) are "1111" and "2111".

An example of the type information list 470 stored in the EEPROM 47 will now be described with reference to FIG. 23.

In FIG. 23, the type information list 470 includes specific vendor IDs and specific product IDs of the specific types of the target device 500, and a suitable identifier indicating that the target device 500 is a genuine product for which operation is guaranteed with the label producing apparatus 100 (a star in the example shown).

Of the specific vendor IDs and specific product IDs recorded in the type information list 470, the above-described genuine product mark is associated with each specific vendor ID and specific property ID corresponding to an above-described genuine product (hereinafter suitably referred to as "first vendor ID and first product ID"). In the example shown in FIG. 23, the vendor ID and product ID combinations that fall under the category of the above-described first vendor ID and first property ID include "1111" "2111", "3333" "4111", and "4444" "5111".

On the other hand, of the specific vendor IDs and specific product IDs recorded in the type information list 470, the above-described genuine product mark is not associated with each specific vendor ID and specific property ID (hereinafter suitably referred to as "second vendor ID and second property ID") corresponding to a non-genuine product that is actually bootable from the label producing apparatus 100 but not operation guaranteed in terms of the manufacturer. In the example shown in FIG. 23, the vendor ID and product ID combinations that fall under the category of the above-described second vendor ID and second property ID include "2222" "3111", "5555" "6111", and "6666" "7111".

Thus, the specific vendor IDs and specific product IDs of the specific types of the target device 500 (a target device that is bootable with the label producing apparatus) recorded in the type information list 470 are distinguishably stored (by associating first vendor IDs and first product IDs with the above-described genuine product mark) as first vendor IDs and first product IDs corresponding to genuine products and second vendor IDs and second product IDs corresponding to non-genuine products. Then, the driver software corresponding to these specific vendor IDs and specific product IDs is stored in the above-described EEPROM 47. Note that the target device 500 having a vendor ID and product ID not recorded in the type information list 470 is a non-compliant product for which the driver software is not stored in the EEPROM 47. Thus, the target device 500 corresponding to a non-compliant product is not bootable from the label producing apparatus 100 since the driver software is not stored.

With such a basic configuration, the greatest features of this embodiment are as follows: when the label producing apparatus 100 and the arbitrary target device 500 are connected via the USB cable 9, the system (1) determines whether or not the connectability of the target device 500 to the label producing apparatus 100 is suitable, and (2) controls the LED 103 so that illumination notifications of predetermined forms are performed in accordance with the determination result.

An example of such illumination notifications of predetermined forms performed by the LED 103 will now be described with reference to FIG. 24.

Figure 24:
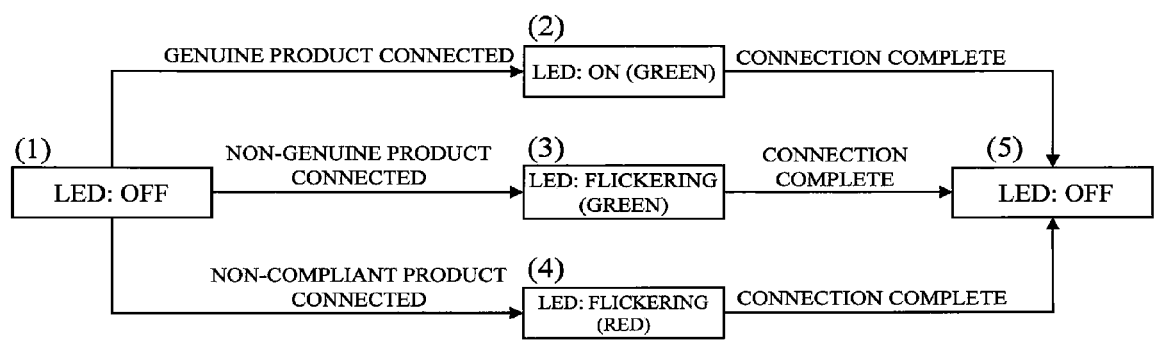
FIG. 24 is an explanatory diagram illustrating an example of illumination notifications of predetermined forms performed by an LED.

In FIG. 24, when there is no target device 500 connected to the label producing apparatus 100 via the USB cable 9, the LED 103 is in an off state and does not perform any illumination notification [state (1) in the figure].

When the target device 500 that is an above-described genuine product is connected to the label producing apparatus 100 via the USB cable 9, the LED 103 changes to "on (green)" in this example as notification that a genuine product is connected [state (2) in the figure]. Subsequently, this "on (green)" notification continues until state (5) described later.

When the target device 500 that is a non-genuine product is connected to the label producing apparatus 100 in the above-described state (1) via the USB cable 9, the LED 103 changes to a different illumination form using the same color (green) as the above-described state (2), i.e., "flickering (green)," as notification that a non-genuine product is connected [state (3) in the figure]. Subsequently, this "flickering (green)" notification continues until state (5) described later.

When the target device 500 that is an above-described non-compliant product is connected to the label producing apparatus 100 in the above-described state (1) via the USB cable 9, the LED 103 changes to a different color than the illuminated or flickered color (green) of the above-described states (2) and (3), i.e., "flickering (red)" in this example, as notification that a non-compliant product is connected [state (4) in the figure]. Subsequently, the "flickering (red)" notification continues until state (5) described later.

Then, when the connection between the label producing apparatus 100 and the target device 500 via the USB cable 9 ends in the above-described states (2), (3), and (4), the LED 103 ends the above-described notification and changes to an off state [state (5) in the figure]. That is, the state of the LED 103 returns to state (1) in the figure.

The notification processing function of the CPU 44 of the label producing apparatus 100 that realizes such forms of notification will now be described with reference to FIG. 25.

Figure 25:
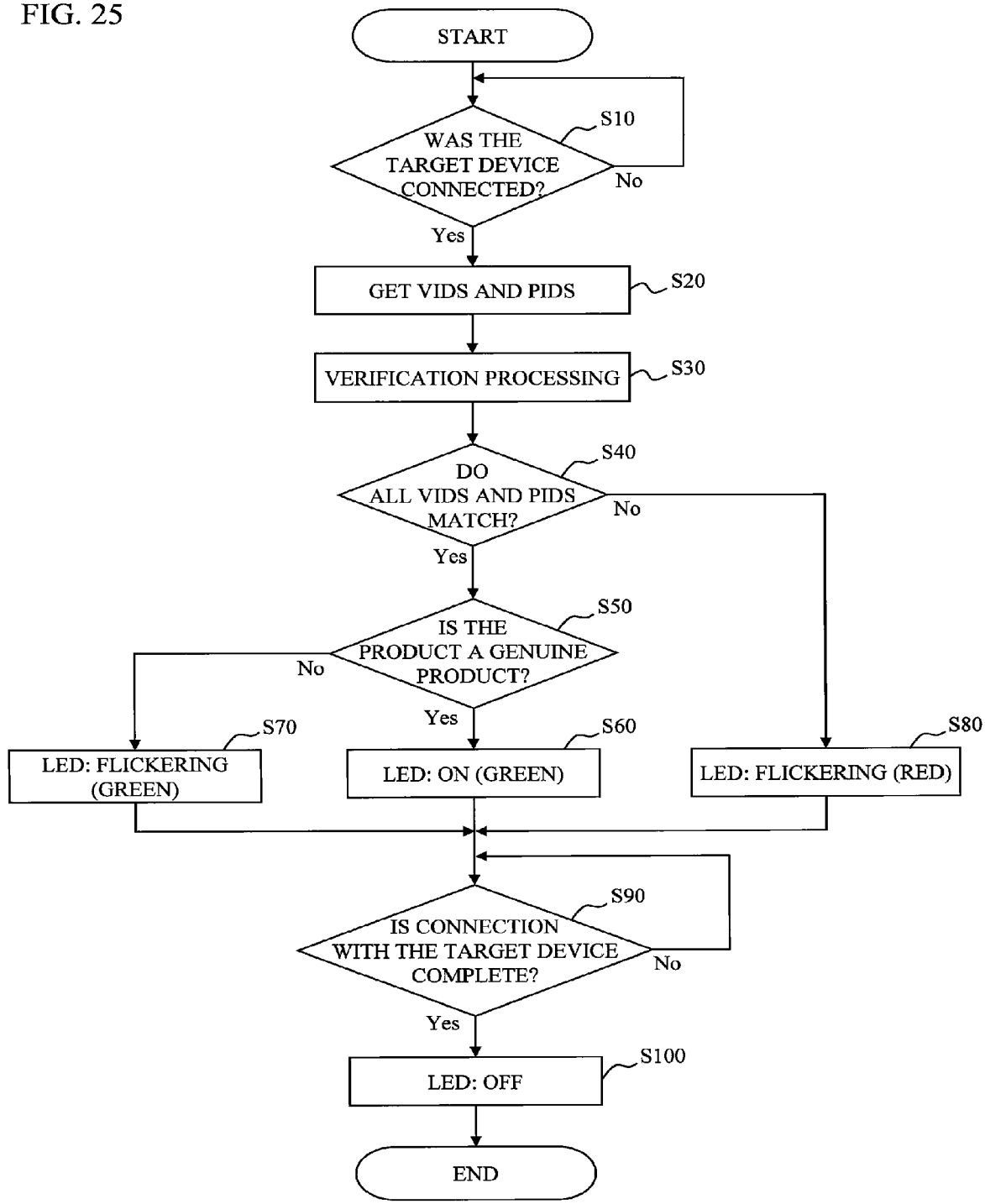
FIG. 25 is a flowchart illustrating the notification processing function of the CPU of the label producing apparatus.

In FIG. 25, the flow is started ("START" position) when the operator turns ON the power of the label producing apparatus 100, for example.

First, in step S10, the CPU 44 determines whether or not the arbitrary target device 500 has been connected via the USB cable 9 and the communication I/F 43H. Specifically, the CPU 44 determines whether or not the first connector 9H of the USB cable 9, whereby the second connector 9T is mounted to the second socket 205T of the arbitrary target device 500, is mounted to the above-described first socket 105H. Until the arbitrary target device 500 is connected, the condition is not satisfied and the CPU 44 enters a wait loop. Then, once the arbitrary target device 500 is connected, the decision is made that the condition is satisfied and the flow proceeds to step S20.

In step S20, the CPU 44 acquires the vendor ID and product ID (refer to FIG. 22) of the target device 500 from the target device 500 connected in the above-described step S10, via the USB cable 9 and the communication I/F 43H. Specifically, the CPU 44 outputs a standard request based on USB standards to the target device 500 connected in the above-described step S10 via the communication I/F 43H and the USB cable 9. Then, the CPU 44 waits until a device descriptor based on USB standards is inputted via the USB cable 9 and the communication I/F 43H from the target device 500 that responded to the above-described standard request. Then, once the above-described device descriptor is inputted, the CPU 44 acquires the vendor ID and product ID of the above-described target device 500 based on the device descriptor.

Subsequently, in step S30, the CPU 44 respectively compares the vendor ID and product ID acquired in the above-described step S20 with the specific vendor IDs and specific product IDs recorded in the above-described type information list 470 (refer to FIG. 23).

Then, in step S40, the CPU 44 determines whether or not both the vendor ID and product ID match in the comparison of the above-described step S30, i.e., determines whether or not the connectability of the target device 500 connected in the above-described step S10 is suitable for the label producing apparatus 100. If both the vendor ID and product ID match (if the above-described connectability is suitable), that is, if the vendor ID and product ID acquired in the above-described step S20 match those that exist in the above-described type information list 470, the decision is made that the condition is satisfied and the flow proceeds to step S50.

In step S50, the CPU 44 determines whether or not the vendor ID and product ID acquired in the above-described step S20 are a first vendor ID and a first product ID corresponding to an above-described genuine product (associated with the above-described genuine product mark). If the vendor ID and product ID acquired in the above-described step S20 are a first vendor ID and a first product ID, the decision is made that the condition is satisfied, the connected target device 500 is regarded as a genuine product, and the flow proceeds to step S60.

In step S60, the CPU 44 outputs a control signal to the LED 103 via the input/output interface 41, causing the LED 103 to change to "on (green)" as the corresponding notification. Note that this notification continues until the procedure of step S100 described later is executed. Subsequently, the flow proceeds to step S90 described later. In this manner, when the target device 500 that is a genuine product is connected to the label producing apparatus 100, the target device 500 is bootable by the corresponding driver software stored in advance in the EEPROM 47 as described above.

On the other hand, if the vendor ID and product ID acquired in the above-described step S20 are a second vendor ID and a second product ID corresponding to the above-described non-genuine product, the decision is made that the condition of step S50 is not satisfied, the connected target device 500 is regarded as a non-genuine product, and the flow proceeds to step S70.

In step S70, the CPU 44 outputs a control signal to the LED 103 via the input/output interface 41, causing the LED 103 to change to "flickering (green)" as the corresponding notification. Note that this notification continues until the procedure of step S100 described later is executed. Then, the flow proceeds to step S90 described later. In this manner, even when the target device 500 that is a non-genuine product is connected to the label producing apparatus 100, the target device 500 is bootable by the corresponding driver software stored in advance in the EEPROM 47 as described above. Note that, in this case, unlike the above-described case where the genuine product is connected, operation is not guaranteed.

On the other hand, when the vendor ID and/or the product ID does not match in the comparison of the above-described step S30 (when the above-described connectability is unsuitable), i.e., when the vendor ID and/or the product ID acquired in the above-described step S20 does not exist in the above-described type information list 470, the decision is made that the condition of step S40 is not satisfied, the connected target device 500 is regarded as a non-compliant product, and the flow proceeds to step S80.

In step S80, the CPU 44 outputs a control signal to the LED 103 via the input/output interface 41, causing the LED 103 to change to "flickering (red)" as the corresponding notification. Note that this notification continues until the procedure of step S100 described later is executed. In this manner, when the target device 500 that is a non-compliant product is connected to the label producing apparatus 100, the target device 500 is not bootable since the corresponding driver software is not stored in the EEPROM 47 as described above.

Then, in step S90, the CPU 44 determines whether or not the target device 500 connected via the USB cable 9 and the communication I/F 43H in the above-described step S10 is still connected. If the above-described target device 500 is still connected, the decision is made that the condition is not satisfied and the CPU 44 enters a wait loop. Then, when the connection with the above-described target device 500 ends, that is, when the first connector 9H of the USB cable 9 is disconnected from the first socket 105 of the label producing apparatus 100, or when the second connector 9T of the USB cable 9 is disconnected from the second socket 205T of the target device 500, the decision is made that the condition is satisfied and the flow proceeds to step S100.

In step S100, the CPU 44 outputs a control signal to the LED 103 via the input/output interface 41, and ends the notification of the above-described step S60, step S70, or step S80 (turns off the illuminated or flickering light). This process then terminates here. Note that this flow is continuously repeated during the period in which the power of the label producing apparatus 100 is ON or until a predetermined exit operation is executed, for example.

As described above, in this embodiment, the label producing apparatus 100 is connected to the first socket 9H of the USB cable 9H, and various target devices 500 are connectable to the second socket 9T of the USB cable 9. Then, when the arbitrary target device 500 is connected to the USB cable 9, the connectability of the connected target device 500 is determined (refer to step S30 to step S50). In a case where the decision is made that the above-described connectability is suitable, a notification corresponding to the suitable state is performed by the LED 103 ["on (green) or flickering (green) in the above-described example; refer to step S60 and step S70]. With this arrangement, the operator can recognize that the target device 500 is suitable for connection with the label producing apparatus 100. Conversely, in a case where the decision is made that the above-described connectability is unsuitable, a notification corresponding to the unsuitable state is performed by the LED 103 ["flickering (red)" in the above-described example; refer to step 80]. With this arrangement, the operator can recognize that the target device 500 is unsuitable for connection with the label producing apparatus 100.

As described above, by simply connecting the target device 500 to the label producing apparatus 100 via the USB cable 9, the operator can visually recognize at a glance whether the target device 500 is suitable or unsuitable for connection (specifically, whether or not the target device 500 is bootable) without performing any further special operations. As a result, operator convenience is improved.

Further, particularly in this embodiment, the driver software corresponding to the specific types of the target device 500 (corresponding to the specific vendor IDs and specific product IDs in the above-described example) and the specific vendor IDs and specific product IDs associated with the specific types of the target device 500 are stored in advance in the EEPROM 47 (refer to FIG. 23). Then, when the arbitrary target device 500 is connected via the USB cable, the vendor ID and the product ID of the connected target device 500 are acquired (refer to step S20). Then, the above-described acquired vendor ID and product ID and the specific vendor IDs and specific product IDs (corresponding to the types of stored driver software) stored in advance in the type information list 470 of the EEPROM 47 are compared.

When the above-described comparison indicates a match (when both the vendor ID and the product ID match), the LED 103 executes notification that corresponds to that match ["on (green)" or "flickering (green)" in the above-described example]. With this arrangement, the operator can recognize that the driver software corresponding to the connected target device 500 had been stored in advance in the label producing apparatus 100, and that the connected target device 500 can be immediately booted. Conversely, when the above-described comparison indicates a mismatch (when the vendor ID and/or the product ID does not match in the above-described example), the LED 103 executes notification corresponding to the mismatch ["flickering (red)" in the above-described example]. With this arrangement, the operator can recognize that the driver software corresponding to the connected target device 500 is not provided in the label producing apparatus 100, and that the connected target device 500 is not bootable as is. Note that detailed booting and non-booting settings may be set for each model of the target device 500 in the label producing apparatus 100 by using the vendor ID and product ID to identify whether the target device 500 is bootable or not bootable, as described above.

Further, particularly in this embodiment, when the above-described comparison indicates that both the vendor ID and product ID match (when the decision is made that the condition of step S40 is satisfied), the CPU 44 determines whether the acquired vendor ID and product ID are a first vendor ID and a first product ID corresponding to an above-described genuine product, or a second vendor ID and a second product ID corresponding to an above-described non-genuine product (refer to step S50). Then, the CPU 44 controls the LED 103 so that notifications are executed in different forms (on or flickering in the above-described example) according to whether the above-described acquired vendor ID and product ID are a first vendor ID and a first product ID or a second vendor ID and a second product ID (in accordance with the determination of step S50). With this arrangement, the CPU 44 distinguishes and enables the operator to visually recognize whether the bootable target device 500 for which driver software is provided is a genuine product that is operation guaranteed or a non-genuine product that is not operation guaranteed. As a result, operator convenience is further improved.

Further, the CPU 44 controls the LED 103 so that a common color (green in the above-described example) is used with different forms of illumination (on and flickering in the above-described example) to notify the operator when the above-described acquired vendor ID and product ID are a first vendor ID and a first product ID (when the condition of step S50 is satisfied) or a second vendor ID and a second product ID (when the condition of step S50 is not satisfied). With this arrangement, the common color (green in the above-described example) makes it possible for the operator to first quickly recognize that the connected target device 500 is bootable. Subsequently, the operator can secondarily recognize whether the connected target device 500 is a genuine product or a non-genuine product by discerning the illumination form of that color. As a result, operator convenience is reliably improved.

Further, particularly in this embodiment, the CPU 44 controls the LED 103 so that a color (red in the above-described example) different from the above-described common color (green in the above-described example) is used for notifying the operator that a non-compliant product for which driver software is not stored in the EEPROM 47 (the vendor ID and product ID are not recorded in the type information list 470) is connected to the label producing apparatus 100. With this arrangement, the different color (red in the above-described example) makes it possible for the operator to immediately recognize that the connected target device 500 is not bootable as is. As a result, operator convenience is reliably improved.

Further, particularly in this embodiment, the above-described first socket 105H and the LED 103 are provided on the front surface part 109 of the housing 101s, and the above-described LED 103 is provided in the vicinity (upper part in the above-described example) of the above-described first socket 105H of the housing 101s (refer to FIG. 21). With this arrangement, after the operator connects the second connector 9T of the USB cable 9 to the second connector 205T of the target device 500, the operator can easily mount the first connector 9H of the USB cable 9 to the front surface side of the label producing apparatus 100. Then, when the first connector 9H of the USB cable 9 is thus mounted to the first socket 105H, the operator can easily recognize whether the connectability of the target device 500 is suitable or unsuitable (specifically whether or not the target device 500 is bootable) by viewing the LED 103 near (in this example, on the upper part of) the mounted location on the front surface side thereof. As a result, operator convenience is further improved.

Note that various modifications may be made according to the present embodiment without departing from the spirit and scope of the disclosure, in addition to the above embodiment. Description will be made below regarding such modifications.

(2-1) When Class Information, Sub-Class Information, and Protocol Information are Used as Type Information While a vendor ID and product ID, which are identification information, were used as the type information in the above-described embodiment, the present disclosure is not limited thereto. That is, class information, sub-class information, and protocol information of the class, sub-class, and protocol grouped for each function of the target device 500 based on USB standards may be used as the type information.

The classes of the target device 500 will now be described with reference to FIG. 26.

Figures 26, 27, 28:
FIG. 26 is a table explaining the classes of target devices in an exemplary modification that uses class information, sub-class information, and protocol information as type information.
FIG. 27 is a table conceptually showing the class information, sub-class information, and protocol information of a target device.
FIG. 28 is a table conceptually showing an example of a type information list stored in EEPROM.

As shown in FIG. 26, a class code ("1" to "9"), corresponding class name ("Audio", "Communication," and the like; refer to the table), and corresponding class information ("0x01" to "0x09") are established for each function of the target device 500 based on USB standards. For example, the class code "3", the class name "Human Interface Device (HID)", and the class information "0x03" are established for each of the target devices 500 that is operated by a human, such as the barcode reader 500 (refer to FIG. 21), keyboard, mouse, or the like.

Note that, while not shown, for sub-classes as well, a sub-class code, corresponding sub-class name, and corresponding sub-class information are established for each function of the target device 500 that is more detailed than the function related to the above-described class, based on USB standards. Further, for the protocol as well, a protocol code, corresponding protocol name, and corresponding protocol information are established for each function that is more detailed than that related to the above-described class and sub-class, based on USB standards. An example of such class information, sub-class information, and protocol information of the target device 500 will now be described with reference to FIG. 27.

FIG. 27 shows the respective class information, sub-class information, and protocol information of a keyboard and mouse as examples of the target device 500 in this example. That is, for the keyboard, the class information is "0x03" (class name: "HID"), the sub-class information is "0x01", and the protocol information is "0x01". Further, for the mouse, the class information is "0x03" (class name: "HID"), the sub-class information is "0x01", and the protocol information is "0x02". This class information, sub-class information, and protocol information are the same for each of the target devices 500 having identical functions based on USB standards, even if the manufacturers and models differ (for example, even for a mouse that is a new model manufactured by Company A and a mouse that is an existing model manufactured by Company B).

In this exemplary modification, as shown in FIG. 28, a type information list 470' that includes specific class information ("0x03" in the example in the table), specific sub-class information ("0x01" in the example in the table), and specific protocol information ("0x01" in the example in the table) is stored in advance as the type information of the specific types of the target device 500 in the EEPROM 47 (refer to FIG. 4).

Further, the driver software corresponding to the above-described specific class information, specific sub-class information, and specific protocol information, i.e., required for operating the specific types of the target device 500, are stored in the EEPROM 47.

That is, the target device 500 that has class information, sub-class information, and protocol information that all match the specific class information, specific sub-class information, and specific protocol information recorded in the type information list 470' is a compliant product for which driver software is stored in the EEPROM 47. Each of the specific types of the target device 500 that is a compliant product is immediately bootable by the host function of the label producing apparatus 100 using the corresponding driver software stored in the above-described EEPROM 47.

On the other hand, the target device 500 that has class information, sub-class information, and/or protocol information that does not match the specific class information, specific sub-class information, and specific protocol information recorded in the type information list 470' is a non-compatible product for which driver software is not stored in the EEPROM 47. Thus, the target device 500 of a type that is a non-compliant product is not bootable by the label producing apparatus 100 since the corresponding driver software is not stored.

In this exemplary modification, a standard request based on USB standards is outputted to the target device 500 when the target device 500 is connected to the label producing apparatus 100 via the USB cable 9. Then, when the interface descriptor based on USB standards is inputted from the target device 500 in response to the above-described standard request, the class information, sub-class information, and protocol information of the target device 500 are acquired based on this interface descriptor. A comparison is then performed to see if the acquired class information, sub-class information, and protocol information correspond to the above-described specific class information, the above-described specific sub-class information, and the above-described specific protocol information included in the type information list 470' of the above-described EEPROM 47. Then, an illumination notification by the LED 103 is performed in a form corresponding to the comparison result.

An example of the illumination notifications of predetermined forms performed by the LED 103 in this exemplary modification will now be described with reference to FIG. 29. In this example, an illustrative scenario based on the type information list 470' shown in the aforementioned FIG. 28, i.e., only the specific class information "0x03", specific sub-class information "0x01", and specific protocol information "0x01", is described.

Figure 29:
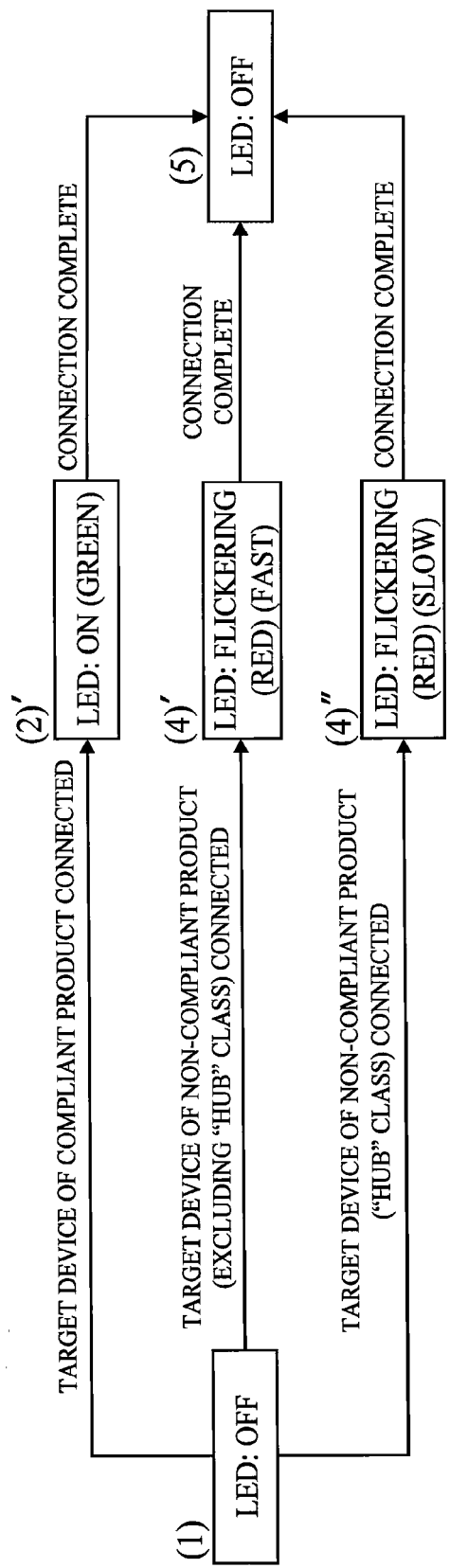
FIG. 29 is an explanatory diagram illustrating an example of illumination notifications of predetermined forms performed by an LED.

In FIG. 29, when there is no target device 500 connected to the label producing apparatus 100 via the USB cable 9, the LED 103 is in an off state and does not perform any illumination notification [state (1) in the figure].

At this time, a specific type of the target device 500 that is an above-described compliant product corresponding to the above-described specific class information "0x03", specific sub-class information "0x01" and specific protocol information "0x01" is sometimes connected to the label producing apparatus 100 via the USB cable 9. In such a case, the LED 103 changes to "on (green)" as described above as notification that a compliant product is connected [state (2)' in FIG. 29]. Subsequently, this "on (green)" notification continues until state (5) described later.

In the above described state (1), the target device 500 of a type that is an above-described non-compliant product not corresponding to the above-described specific class information "0x03", specific sub-class information "0x01", and specific protocol information "0x01" is sometimes connected to the label producing apparatus 100 via the USB cable 9. In such a case, the LED 103 changes to a color that differs from the color (green) illuminated in the above-described state (2)' as notification that a non-compliant product is connected. In this example, the LED 103 therefore changes to "flickering (red) (fast)," repeatedly flickering the color red based on a 1.2-second cycle (red 0.6 seconds→off 0.6 seconds) [state (4)' in FIG. 29]. Subsequently, this "flickering (red) (fast)" notification continues until state (5) described later.

Further, in the above-described state (1), the target device 500 of a type that is an above-described non-compliant product particularly of the "Hub" class, i.e., the target device 500 that has "0x09" (class name "Hub"; refer to FIG. 26) as its class information, is sometimes connected to the label producing apparatus 100 via the USB cable 9. In such a case, the LED 103 changes to a color that differs from the color (green) illuminated in the above-described state (2)' and to a form that differs from "flickering (red) (fast)" of the above-described state (4)'. In this example, therefore, the LED 103 changes to "flickering (red) (slow)," repeatedly flickering the color red based on a two-second cycle (red 1 second→off 1 second) [state (4)" in FIG. 29]. Subsequently, this "flickering (red) (slow)" notification continues until state (5) described later.

Then, when the connection between the label producing apparatus 100 and the target device 500 via the USB cable 9 ends in the above-described states (2)', (3)', and (4)', the LED 103 ends the above-described notification and changes to an off state [state (5) in the figure]. That is, the state of the LED 103 returns to state (1) in the figure.

The notification processing function of the CPU 44 of the label producing apparatus 100 which realizes such forms of notification in this exemplary modification will now be described with reference to FIG. 30. Note that sequences similar to those in FIG. 25 are denoted using the same reference numerals, and descriptions thereof will be omitted.

Figure 30:
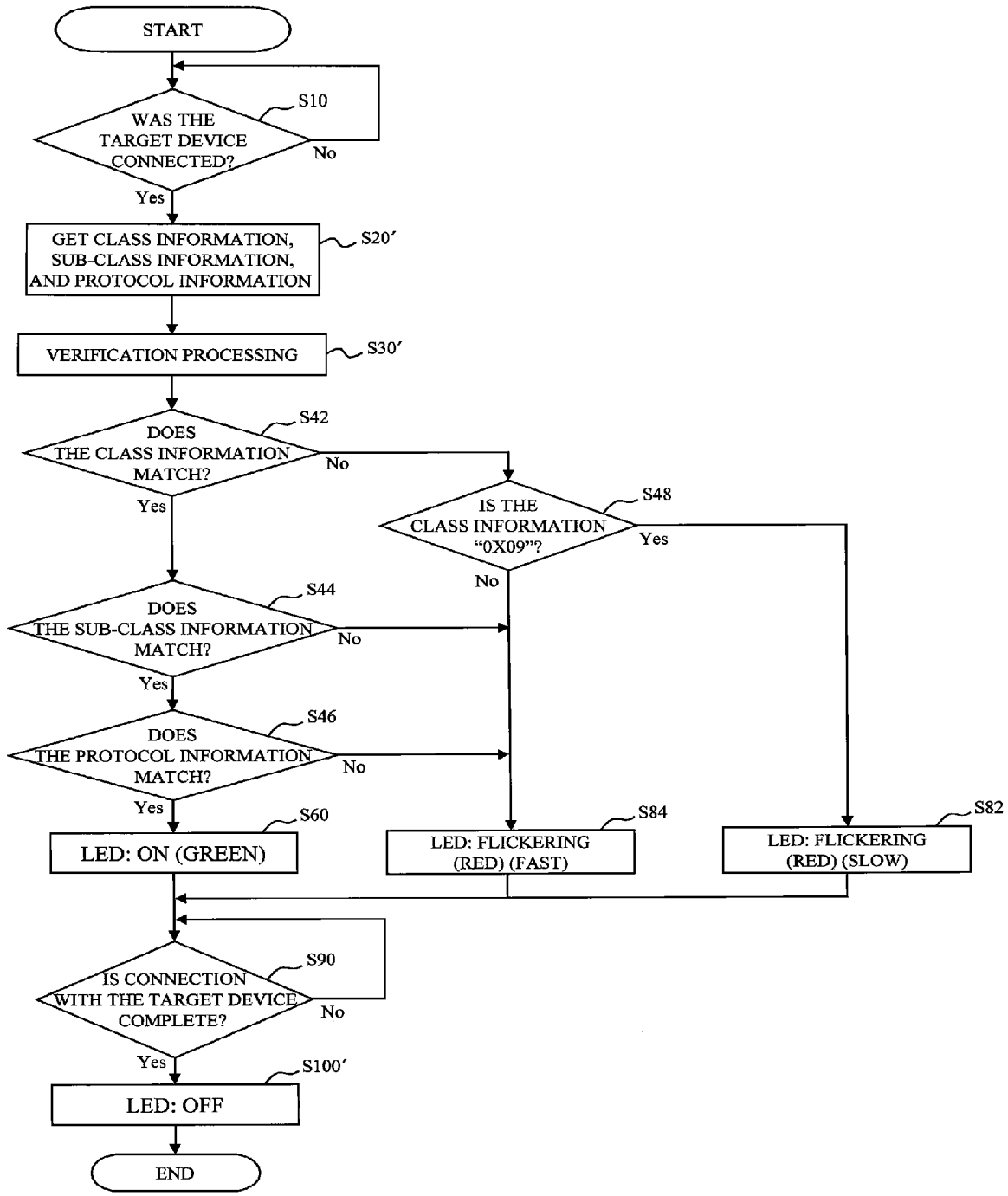
FIG. 30 is a flowchart illustrating the notification processing function of the CPU of the label producing apparatus.

In FIG. 30, unlike the aforementioned FIG. 25, step S20', step S30', and step S100' are provided in place of step S20, step S30, and step S100. Further, in FIG. 30, step S40, step S50, step S70, and step S80 of the aforementioned FIG. 25 are omitted, and step S42, step S44, step S46, step S48, step S82, and step S84 are newly provided.

That is, step S10 is the same as that in the aforementioned FIG. 25 and, after the CPU 44 determines whether or not the arbitrary target device 500 is connected and the decision is made that the condition is satisfied once the arbitrary target device 500 is connected, the flow proceeds to step S20' provided in place of step S20.

In step S20', the CPU 44 acquires the class information, sub-class information, and protocol information (refer to FIG. 27) of the target device 500 from the target device 500 connected in the above-described step S10, via the USB cable 9 and the communication I/F 43H. Specifically, the CPU 44 outputs a standard request based on USB standards to the target device 500 connected in the above-described step S10 via the communication I/F 43H and the USB cable 9. Then, the CPU 44 waits until an interface descriptor based on USB standards is inputted via the USB cable 9 and the communication I/F 43H from the target device 500 that responded to the above-described standard request. Then, once the above-described interface descriptor is inputted, the CPU 44 acquires the class information, sub-class information, and protocol information of the above-described target device 500 based on the interface descriptor.

Subsequently, in step S30' provided in place of step S30, the CPU 44 respectively compares the class information, sub-class information, and protocol information acquired in the above-described step S20' with the specific class information, specific sub-class information, and specific protocol information recorded in above-described type information list 470' (refer to FIG. 28).

Then, in the newly provided step S42, the CPU 44 determines whether or not the class information matches in the comparison of the above-described step S30'. If the class information matches, the decision is made that the condition is satisfied and the flow proceeds to the newly provided step S44.

In step S44, the CPU 44 determines whether or not the sub-class information matches in the comparison of the above-described step S30'. If the sub-class information matches, the decision is made that the condition is satisfied and the flow proceeds to the newly provided step S46.

In step S46, the CPU 44 determines whether or not the protocol information matches in the comparison of the above-described step S30'. If the protocol information matches, that is, if the class information, sub-class information, and protocol information all match in the comparison of the above-described step S30', the decision is made that the condition is satisfied (that the aforementioned connectability is suitable), and the flow proceeds to step S60.

Step S60 is the same as that in the aforementioned FIG. 25 and, after the CPU 44 outputs a control signal to the LED 103, causing the LED 103 to change to the above-described "on (green)" as the corresponding notification, the flow proceeds to step S90.

On the other hand, if the class information does not match in the comparison of the above-described step S30', the decision is made that the condition of step S42 is not satisfied (the aforementioned connectability is unsuitable), and the flow proceeds to the newly provided step S48.

In step S48, the CPU 44 determines whether or not the class information acquired in the above-described step S20' is "0x09" (refer to FIG. 26), in other words, whether or not the above-described connected target device 500 is a target device 500 of the "Hub" class. If the class information acquired in the above-described step S20' is "0x09" (if the connected target device 500 is a target device 500 of the "Hub" class), the decision is made that the condition is satisfied and the flow proceeds to the newly provided step S82.

In step S82, the CPU 44 outputs a control signal to the LED 103 via the input/output interface 41, causing the LED 103 to change to the above-described "flickering (red) (slow)" as the corresponding notification. Note that this notification continues until the procedure of step S100' described later is executed. Subsequently, the flow proceeds to step S90. In this manner, when the target device 500 of the "Hub" class is connected to the label producing apparatus 100, the target device 500 is an above-described non-compliant product and therefore is not bootable since the corresponding driver software is not stored in the EEPROM 47, as described above.

On the other hand, if the sub-class information does not match in the comparison of the above-described step S30' and the decision is made that the condition of step S44 is not satisfied (if the decision is made that the aforementioned connectability is unsuitable), and if the protocol information does not match in the comparison of the above-described step S30' and the decision is made that the condition of step S46 is not satisfied (if the decision is made that the aforementioned connectability is unsuitable), and if the class information acquired in the above-described step S20' is not "0x03" and the decision is made that the condition of step S48 is not satisfied, the flow proceeds to the newly provided step S84.

In step S84, the CPU 44 outputs a control signal to the LED 103 via the input/output interface 41, causing the LED 103 to change to the above-described "flickering (red) (fast)" as the corresponding notification. Note that this notification continues until the procedure of step S100 described later is executed. Subsequently, the flow proceeds to step S90. In this manner, when the target device 500 of a type that is a non-compliant product is connected to the label producing apparatus 100, the target device 500 is not bootable since the corresponding driver software is not stored in the EEPROM 47, as described above.

Step S90 is the same as that in the aforementioned FIG. 25 and, after the CPU 44 determines whether or not the target device 500 connected in the above-described step S10 is still connected and the decision is made that the condition is satisfied when the connection with the above-described target device 500 ends, the flow proceeds to step S100' provided in place of step S100.

In step S100', the CPU 44 outputs a control signal to the LED 103 via the input/output interface 41, ending the notification of the above-described step S60, step S82, or step S84 (turning off the illuminated or flickering light). This process then terminates here.

As described above, in this exemplary modification, when the target device 500 is connected to the label producing apparatus 100 via the USB cable 9, class information, sub-class information, and protocol information are acquired from the target device 500. Then, the acquired class information, sub-class information, and protocol information are respectively compared with the specific class information, specific sub-class information, and specific protocol information recorded in advance in the type information list 470' (refer to FIG. 28) of the EEPROM 47. Then, in a case where all of the class information, sub-class information, and protocol information match in the comparison, the LED 103 executes the corresponding notification ["on (green)" in the above-described example]. Further, in a case where at least one of the class information, sub-class information, or protocol information does not match in the comparison, the LED 103 executes the corresponding notification ["flickering (red) (fast)" or "flickering (red) (slow)" in the above-described example].

In this manner, in this exemplary modification, general-purpose class information, sub-class information, and protocol information grouped and standardized by the function of the target device 500 are used to identify whether the target device 500 is bootable or not bootable. With this arrangement, it is possible to distinguish the target devices 500 that are bootable from those that are not bootable for each of the above-described functions (for example: a barcode reader is bootable, but all others are not bootable), and distinguish the target devices 500 that are bootable from those that are not bootable for each model, thereby eliminating the need to store such information in advance in the label producing apparatus 100. As a result, operator convenience is further improved.

(2-2) When Corresponding Notifications are Performed in Accordance with Overcurrent Detection/Non-Detection While in the above the CPU 44 determined whether or not the connectability to the label producing apparatus 100 was suitable in accordance with the type information of the target device 500 and executed notification accordingly, the present disclosure is not limited thereto. That is, the CPU 44 may determine whether the above-described connectability is suitable or unsuitable and execute notification in accordance with a detection result of overcurrent flowing to the USB cable 9 when the target device 500 is connected.

The detailed configuration of the communication I/F 43H (refer to FIG. 4) of the label producing apparatus 100 of this exemplary modification will now be described with reference to FIG. 31.

Figure 31:
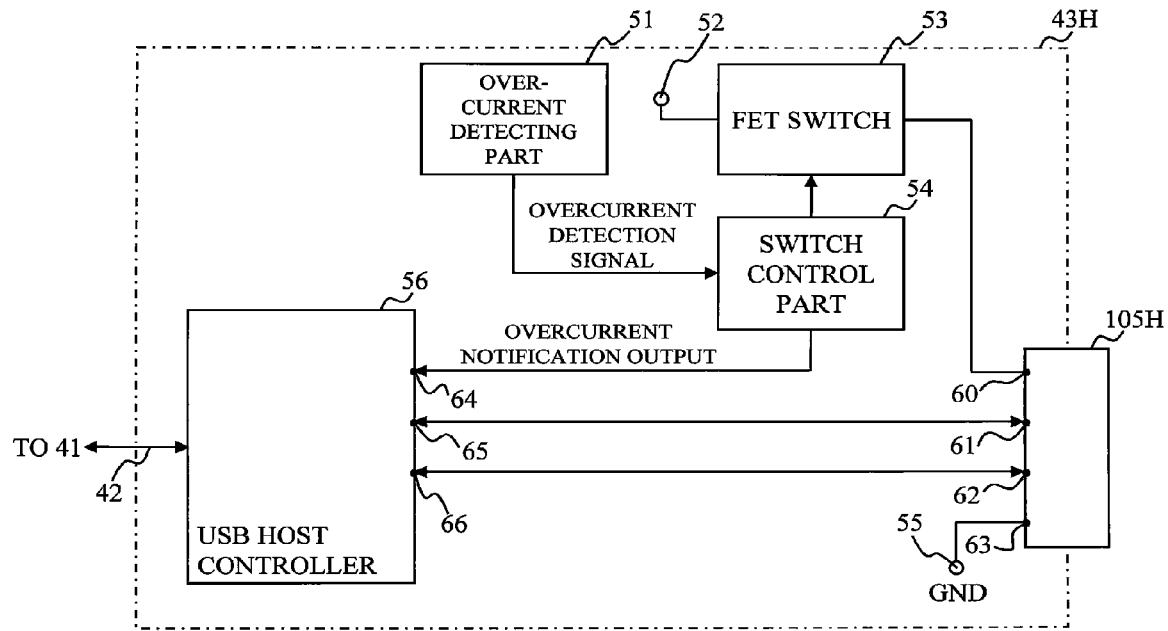
FIG. 31 is a functional block diagram illustrating the detailed configuration of the communication interface of the label producing system.

In FIG. 31, the communication I/F 43H of this exemplary modification comprises an overcurrent detecting part 51, a power source 52, a field effect transistor (FET) switch 53, a switch control part 54, a ground (GND) 55, and a host controller 57 comprising an OC terminal 64, a D+ terminal 65, and a D− terminal 66.

The first socket 105H comprises a $V_{BUS}$ terminal 60, a D+ terminal 61, a D− terminal 62, and a GND terminal 63.

The power source 52 supplies power current (so-called USB bus power) to the target device 500 via the FET switch 53, the first socket 105H (specifically, the $V_{BUS}$ terminal 60 of the first socket 105H), and the USB cable 9 [specifically, a $V_{BUS}$ line (not shown) of the USB cable 9] when the above-described FET switch 53 changes to an ON state (described later). Note that, in USB standards, the supplied voltage is defined as 5±5% [V] and the current consumption is defined as up to 500 [mA].

The FET switch 53 switches the supply of the above-described power current ON (conduction) and OFF (shutoff). With the FET switch 53 in an ON state, power current flows to the target device 500. With the FET switch 53 in an OFF state, the power current that flows to the target device 500 is shut off.

The switch control part 54 controls the ON/OFF switching of the above-described FET switch 53.

When the arbitrary target device 500 is connected via the USB cable 9, the overcurrent detecting part 51 detects whether or not the power current that flows to the USB cable 9 (specifically the above-described $V_{BUS}$ line) exceeds a predetermined permissible value (500 [mA] for example). That is, the power detecting part 51 detects whether or not overcurrent deviant from the normal range is flowing to the above-described $V_{BUS}$ line.

The USB host controller 56 controls the communication I/F 43H in general. Further, the USB host controller 56 controls the input and output of information between the label producing apparatus 100 and the target device 500 via the input/output interface 41, the data bus 42, the D+ terminal 65, the D− terminal 66, the D+ terminal 61 and D− terminal 62 of the first socket 105H, and the D+ line (not shown) and D− line (not shown) of the USB cable 9.

With such a structure of the above-described communication I/F 43H, when the arbitrary target device 500 is connected via the USB cable 9, the power source 52 supplies power current to the target device 500 via the FET switch 53, the above-described $V_{BUS}$ terminal 60, and the above-described $V_{BUS}$ line. At this time, when power current (overcurrent) exceeding the above-described permissible value flows to the above-described $V_{BUS}$ line, the overcurrent detecting part 51 detects the above-described overcurrent. Then, a predetermined overcurrent detection signal is outputted from the overcurrent detecting part 51 to the switch control part 54.

When the overcurrent detection signal is thus inputted to the switch control part 54, the FET switch 53 is turned OFF by the switch control part 54 once a predetermined amount of time (20 [ms] for example; the so-called overcurrent blanking time) has elapsed since the above-described target device 500 was connected [or since the power source (not shown) of the label producing apparatus 100 was turned ON]. When the FET switch 53 is thus turned OFF, the power current that flowed to the target device 500 from the power source 52 via the FET switch 53, the above-described $V_{BUS}$ terminal 60, and the above-described $V_{BUS}$ line is shut off. Note that, during the period in which the above-described overcurrent blanking time is not satisfied, the above-described overcurrent detection signal outputted to the switch control part 54 is masked and the above-described power current shutoff is not performed.

Further, when the overcurrent detection signal is thus inputted to the switch control part 54 and the FET switch 53 changes to a shutoff state, a predetermined overcurrent notification output for notification of the detected overcurrent state is outputted from the switch control part 54 to the USB host controller 56 via the above-described OC terminal 64. Then, when this overcurrent notification output is inputted to the USB host controller 56, the above-described overcurrent notification output is outputted to the CPU 44 via the data bus 42 and the input/output interface 41, and the corresponding notification is executed by the LED 103.

Note that the system may be recovered from the above-described power current shutoff state by, for example, removing the above-described connected target device 500, turning OFF the power source of the label producing apparatus 100, and then turning back ON the power source of the label producing apparatus 100 (i.e., rebooting) [and notification may be made accordingly by the display part, etc., (not shown), for example].

An example of the illumination notifications of predetermined forms performed by the LED 103 in this exemplary modification will now be described with reference to FIG. 32.

Figure 32:
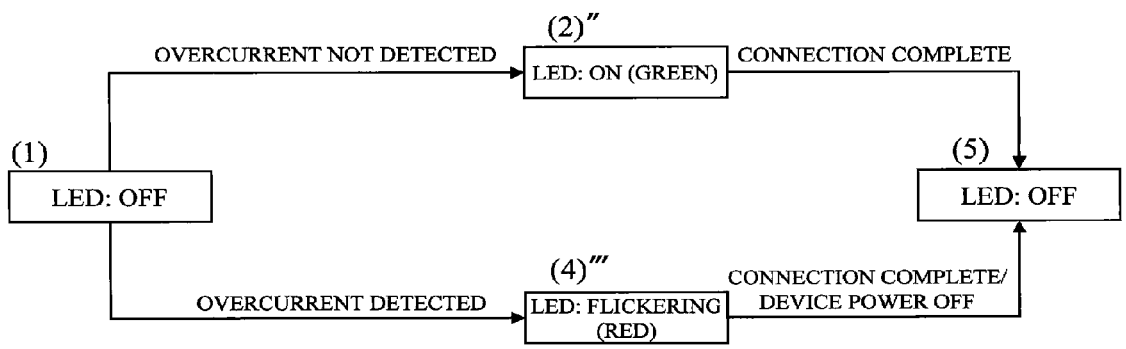
FIG. 32 is an explanatory diagram illustrating an example of illumination notifications of predetermined forms performed by an LED.

In FIG. 32, when there is no target device 500 connected to the label producing apparatus 100 via the USB cable 9, the LED 103 is in an off state and does not perform any illumination notification [state (1) in the figure].

At this time, when the arbitrary target device 500 is connected to the label producing apparatus 100 via the USB cable 9, the overcurrent detecting part 51 detects whether or not overcurrent is flowing to the $V_{BUS}$ line of the USB cable 9, as described above.

If the above-described overcurrent is not detected, the decision is made that the above-described connectability is suitable. That is, in this example, the LED 103, changes to "on (green)" [state (2)" in FIG. 32], which is similar to state (2) in the aforementioned FIG. 24 and state (2)' in the aforementioned FIG. 29, as notification that the connectability is suitable. Subsequently, this "on (green)" notification continues until state (5) described later.

Then, when the connection between the label producing apparatus 100 and the target device 500 via the USB cable 9 ends in the above-described state (2)", the LED 103 ends the above-described notification and changes to an off state [state (5) in the figure]. That is, the state of the LED 103 returns to state (1) in the figure.

On the other hand, if the above-described overcurrent is detected, the decision is made that the above-described connectability is unsuitable and the LED 103 changes to a color different from that in the above-described state (2)" as notification that the connectability is unsuitable. In this example, therefore, the LED 103 changes to "flickering (red)", repeatedly flickering red based on a 0.6-second cycle (red 0.3 seconds→off 0.3 seconds) [state (4)'" in FIG. 32]. Subsequently, the "flickering (red)" notification continues until state (5) described later.

Then, when the connection between the label producing apparatus 100 and the target device 500 via the USB cable 9 ends in the above-described state (4)'", the LED 103 ends the above-described notification and changes to an off state [state (5) in the figure]. In this case, when the power source is turned ON once again, the state returns to state (1) in the figure.

The notification processing function of the CPU 44 of the label producing apparatus 100 which realizes such forms of notification in this exemplary modification will now be described with reference to FIG. 33. Note that sequences similar to those in FIG. 25 are denoted using the same reference numerals, and descriptions thereof will be omitted.

Figure 33:
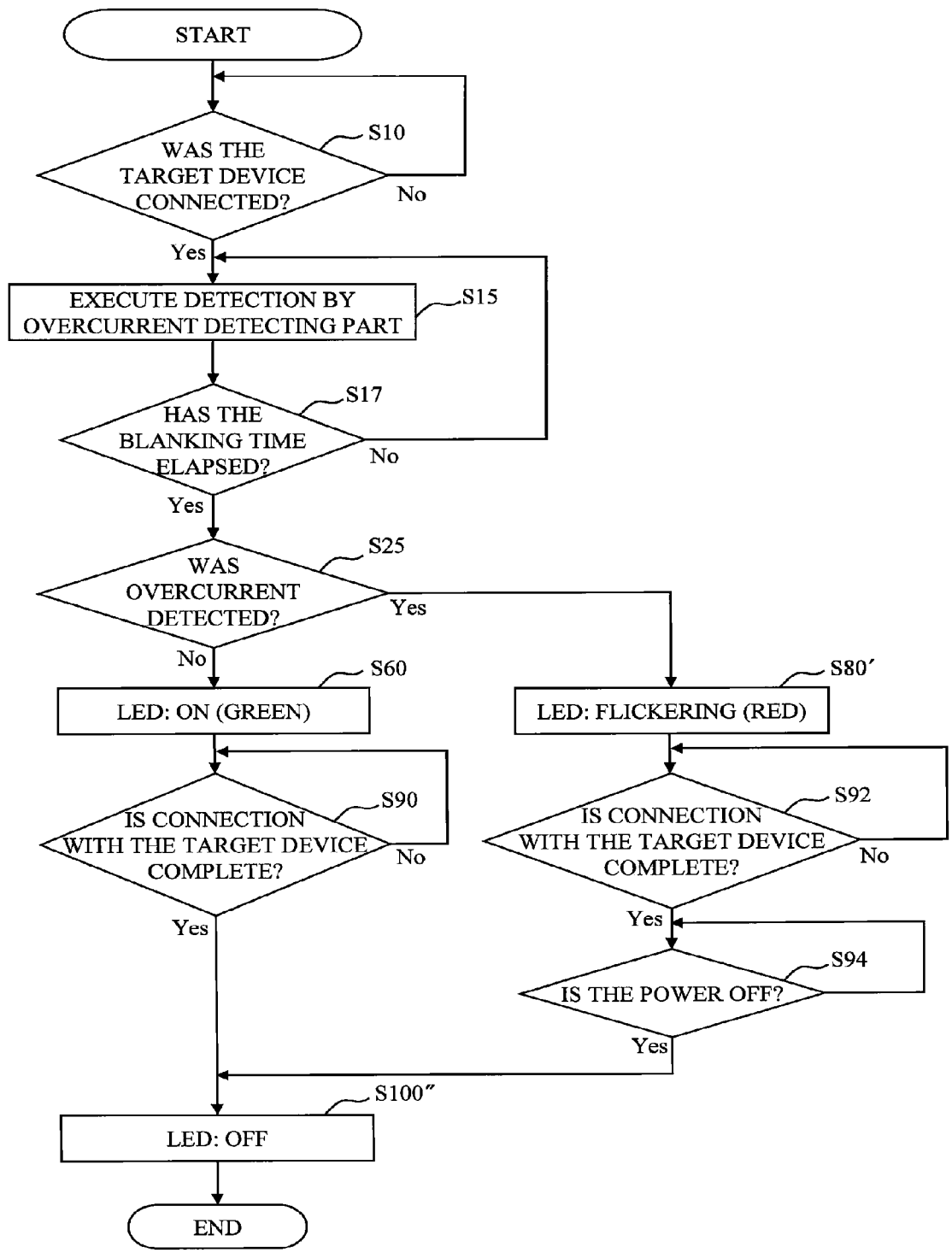
FIG. 33 is a flowchart illustrating the notification processing function of the CPU of the label producing apparatus.

In FIG. 33, similar to the aforementioned FIG. 25, the flow is started ("START" position) when the operator turns ON the power of the label producing apparatus 100.

Step S10 is the same as that in the aforementioned FIG. 25 and, after the CPU 44 determines whether or not the arbitrary target device 500 is connected and the decision is made that the condition is satisfied once the arbitrary target device 500 is connected, the flow proceeds to step S15.

In step S15, the CPU 44 outputs a control signal to the overcurrent detecting part 51 via the input/output interface 41 and the USB host controller 56, causing the overcurrent detecting part 51 to determine whether or not overcurrent is flowing to the above-described USB cable 9. Specifically, the overcurrent detecting part 51 detects whether or not the power current that flows to the $V_{BUS}$ line of the USB cable 9 exceeds the above-described permissible value (500 [mA] for example).

Then, in step S17, the CPU 44 determines whether or not the aforementioned overcurrent blanking time has elapsed. If the overcurrent blanking time has not elapsed, the decision is made that the condition is not satisfied, the flow returns to the above-described step S15, and the same procedure is repeated. If the overcurrent blanking time has elapsed, the decision is made that the condition is satisfied and the flow proceeds to step S25.

In step S25, the CPU 44 determines whether or not the overcurrent detecting part 51 detected an overcurrent state in the above-described step S15. This decision may be simply made by determining whether or not the above-described overcurrent notification output was inputted via the switch control part 54, the USB host controller 56, and the input/output interface 41. If an overcurrent state was not detected (if the overcurrent notification output was not inputted), the decision is made that the condition of step S25 was not satisfied, the aforementioned connectability is regarded as suitable, and the flow proceeds to step S60

Step S60 is the same as that in the aforementioned FIG. 25 and, after the CPU 44 outputs a control signal to the LED 103, causing the LED 103 to change to the above-described "on (green)" as the corresponding notification, the flow proceeds to step S90.

Step S90 is the same as that in the aforementioned FIG. 25 and, after the CPU 44 determines whether or not the target device 500 connected in the above-described step S10 is still connected and the decision is made that the condition is satisfied when the connection with the above-described target device 500 ends, the flow proceeds to step S100" described later.

On the other hand, if an overcurrent state was detected (if the overcurrent notification output was inputted) in the above-described step S15, the decision is made that the condition of step S25 is satisfied, the aforementioned connectability is regarded as unsuitable, and the flow proceeds to step S80'.

In step S80', the CPU 44 outputs a control signal to the LED 103 via the input/output interface 41, causing the LED 103 to change to "flickering (red)" as the corresponding notification. Note that this notification continues until the procedure of step S100" described later is executed.

The subsequent step S92 is the same as the above-described step S90 in which the CPU 44 determines whether or not the target device 500 connected in the above-described step S10 is still connected. If the above-described target device 500 is still connected, the decision is made that the condition is not satisfied, and the CPU 44 enters a wait loop. Then, when the connection with the above-described target device 500 ends, the decision is made that the condition is satisfied and the flow proceeds to step S94.

In step S94, the CPU 44 determines whether or not the power source of the label producing apparatus 100 has been turned OFF. Until the power source is turned OFF, the condition is not satisfied and the CPU 44 enters a wait loop. Then, once the power source is turned OFF, the decision is made that the condition is satisfied and the flow proceeds to step S100".

In step S100", the CPU 44 outputs a control signal to the LED 103 via the input/output interface 41, ending the notification of the above-described step S60 or step S80' (turning off the illuminated or flickering light). This process then terminates here.

Thus, as described above, in this exemplary modification, when the arbitrary target device 500 is connected to the USB cable 9, the overcurrent detecting part 51 detects whether or not the power current that flows to the $V_{BUS}$ line of the USB cable 9 exceeds the above-described permissible value (500 [mA] for example) (whether or not overcurrent is flowing to the $V_{BUS}$ line). Then, if the power current value is less than or equal to the permissible value (if overcurrent is not detected), the decision is made that the above-described connectability is suitable. And, if the power current value exceeds the above-described permissible value (if overcurrent is detected) the decision is made that the above-described connectability is unsuitable.

At this time, if the decision is made that the connectability is suitable, the corresponding notification ["on (green)" in the above-described example] is performed by the LED 103. With this arrangement, the operator can recognize that, with the connected target device 500, current that is in the normal range is flowing to the USB cable 9 in the connected state and no excessive load is being applied to the label producing apparatus 100. Conversely, if the decision is made that the connectability is unsuitable, the corresponding notification ["flickering (red)" in the above-described example] is performed by the LED 103. With this arrangement, the operator can recognize that, with the connected target device 500, overcurrent that has deviated from the normal range is flowing to the USB cable 9 in the connected state and excessive load is being applied to the label producing apparatus 100, making connection as is not preferable.

As a result, according to this exemplary modification is well, similar to the above-described embodiment, the operator can simply connect the target device 500 to the label producing apparatus 100 via the USB cable 9 and visually recognize at a glance whether or not the current conduction characteristics are suitable for connection to the target device 500 (without performing any other special operation). As a result, operator convenience is improved.

Further, according to this exemplary modification, the communication I/F 43H comprises the FET switch 53 configured to shut off the power current that flows to the target device 500 via the USB cable 9 when the above-described overcurrent detecting part 51 detects overcurrent. With this arrangement, it is possible to prevent the overcurrent from continuously flowing to the connected target device 500, thereby preventing residual damage to the label producing apparatus 100.

Note that while the above first and second embodiments have been described in connection with illustrative scenarios in which the label tape 23 with print on which printing has been completed is cut by the cutter 28 to form the print label L, the present disclosure is not limited thereto. That is, in a case where a label mount (a so-called die cut label) separated in advance to a predetermined size corresponding to the label is continuously disposed on the tape fed out from the roll, the present disclosure may also be applied to a case where the label is not cut by the cutter 28 but rather the label mount (a label mount on which corresponding printing has been performed) only is peeled from the tape after the tape has been discharged from the tape discharging exit 38 so as to form the print label L.

Further, while the above has been described in connection with an illustrative scenario of a method where printing is performed on the cover film 11 separate from the base tape 16 and then the two are bonded together, the present disclosure is not limited thereto, allowing for a (non-bonding) method where printing is performed on a print-receiving tape layer (a thermal layer comprising a thermal material capable of producing color when heated and forming print, an image-transferring layer comprising an image-transferring material capable of forming print by heat transfer from the ink ribbon, or an image-receiving layer comprising an image-receiving material capable of forming print by applying ink).

Furthermore, while the above has been described in connection with an illustrative scenario in which the base tape 16, etc., are wound around a spool so as to form a roll, and the roll is disposed within the cartridge 10 so as to feed out the base tape 16, etc., the present disclosure is not limited thereto. For example, an arrangement can be made as follows. Namely, a long-length or rectangular tape or sheet (including tape cut to a suitable length after being supplied from a roll) is stacked (laid flat and layered into a tray shape, for example) in a predetermined housing part so as to form a cartridge. The cartridge is then mounted to the cartridge holder provided to the label producing apparatus 100. Then, the tape or sheet is supplied or fed from the above-described housing part, and printing is performed so as to produce print labels L.

Further, a configuration in which the above-described roll is directly detachably mounted to the label producing apparatus 100, etc., or a configuration in which a long-length or rectangular tape or sheet is fed by a predetermined feeder mechanism one sheet at a time from outside the label producing apparatus 100, etc., and supplied to inside the label producing apparatus 100, etc., are also conceivable. In each of these cases as well, the same advantages are achieved. Note that the present disclosure is not limited to a device such as the cartridge 10 that is detachably mounted to the main body side of the label producing apparatus 100, etc., allowing for the provision of a roll as a so-called installation type or integrated type that is not detachably mounted to the main body side. In such a case as well, the advantage that the system can be simply and easily configured without use of a network that employs a LAN cable or wireless LAN is achieved.

Note that the arrow shown in each figure, such as FIG. 4 and FIG. 17, in the above denotes an example of signal flow, but the signal flow direction is not limited thereto.

Also note that the present disclosure is not limited to the procedures shown in the flowcharts of FIG. 7 to FIG. 10, FIG. 12 to FIG. 15, FIG. 18 to FIG. 20, FIG. 25, FIG. 30, FIG. 33, etc., and procedure additions and deletions as well as sequence changes may be made without departing from the spirit and scope of the disclosure.

Additionally, other than those previously described, methods according to the above-described embodiment and modification examples may be utilized in combination as appropriate.

What is claimed is:

1. A printer comprising:
a host communication device that performs information transmission and reception by wired or wireless communication for the functioning as a host device of a target device; and
a target processing portion that performs predetermined processing in accordance with target device information acquired from said target device when said host communication device performs information transmission and reception with said target device,
said host communication device performing information transmission and reception with said target device via a USB bus, and
said target processing portion further including:
a suitability determination portion configured, in a case where an arbitrary USB target device is connected as said target device to a target side of said USB bus, to determine whether or not the connectability of said USB target device to said printer is suitable;
a notification device that performs illumination notification of a predetermined form in accordance with a determination result of said suitability determination portion;
a notification control portion that controls said notification device so that a corresponding first notification is performed when said suitability determination portion determines that the connectability is suitable, and a corresponding second notification is performed when said suitability determination portion determines that the connectability is unsuitable;
a driver storage device that stores in advance driver software corresponding to specific types of a USB target device that is connectable to a target side of said USB bus;
a type information storage device that stores in advance type information of said specific types of the USB target device for which said driver software is stored in said driver storage device; and
a type information acquisition portion that acquires type information of an arbitrary USB target device via said USB bus when the USB target device is connected to said USB bus,
said suitability determination portion including a type information comparison portion that compares type information acquired by said type information acquisition portion with type information stored in advance in said type information storage device, and
said notification control portion controlling said notification device so that said first notification is performed when a comparison performed by said type information comparison portion indicates a match, and said second notification is performed when a comparison performed by said type information comparison portion indicates a mismatch, said type information storage device storing specific vendor IDs and specific product IDs, as type information of said specific types of the USB target device,
said driver storage device storing the driver software corresponding to said specific vendor IDs and specific product IDs,
said type information acquisition portion acquiring a vendor ID and product ID of said connected USB target device as said type information,
said type information comparison portion respectively comparing said vendor ID and said product ID acquired by said type information acquisition portion with said specific vendor IDs and said specific product IDs stored in advance in said type information storage device,
said notification control portion controlling said notification device so that said first notification is performed when both vendor ID and product ID match, and said second notification is performed when at least one of vendor ID and product ID does not match, as a result of a comparison of said type information comparison portion,
said target processing portion further including an overcurrent detecting device that detects whether or not a power current that flows to said USB bus exceeds a predetermined permissible value when an arbitrary USB target device is connected to said USB bus, and
said suitability determination portion determining that the connectability is suitable when overcurrent is not detected by said overcurrent detecting device, and unsuitable when said overcurrent is detected by said overcurrent detecting device,
said target processing portion further includes a field effect transistor switch that shuts off the power current that flows to said USB target device via said USB bus when said overcurrent is detected by said overcurrent detecting device, and
said USB target device is removed as well as the power source of said printer is turned OFF in a state that the power current is shutoff by said field effect transistor switch, and then said printer is recovered to a power current supply state by rebooting the printer.

2. The printer according to claim 1, wherein:
said type information storage device distinguishably stores said specific vendor IDs and said specific product IDs as first vendor IDs and first product IDs for operation guaranteed genuine products, and second vendor IDs and second product IDs for other products;
said type information comparison portion includes a type information determination portion that determines whether or not said acquired vendor ID and product ID are said first vendor ID and said first product ID or said second vendor ID and said second product ID when both vendor ID and product ID match as a result of said comparison; and
said notification control portion controls said notification device so that said first notification is performed in different forms in accordance with whether the vendor ID and product ID are said first vendor ID and said first product ID or said second vendor ID and said second product ID.

3. The printer according to claim 2, wherein:
said notification control portion controls said notification device so that said first notification is performed using a common color but different illumination forms for a case where the vendor ID and product ID are said first vendor ID and said first product ID, and a case where the vendor ID and product ID are said second vendor ID and said second product ID.

4. The printer according to claim 3, wherein:
said notification control portion controls said notification device so that said second notification is performed using a color that differs from said common color.

* * * * *